(12) United States Patent
Kohno

(10) Patent No.: US 6,400,515 B1
(45) Date of Patent: Jun. 4, 2002

(54) TAKING OPTICAL SYSTEM, IMAGE TAKING APPARATUS, AND METHOD FOR CONVERTING FRAME-FORMAT IN A TAKING OPTICAL SYSTEM

(75) Inventor: Tetsuo Kohno, Suita (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/493,605

(22) Filed: Jan. 28, 2000

(30) Foreign Application Priority Data

Feb. 1, 1999 (JP) ............................................. 11-023420
Feb. 1, 1999 (JP) ............................................. 11-023433

(51) Int. Cl.⁷ ......................... G02B 15/02; G02B 15/14
(52) U.S. Cl. ......................... 359/675; 359/673; 359/675
(58) Field of Search .......................... 359/673, 675, 359/672, 676, 683; 360/48

(56) References Cited

U.S. PATENT DOCUMENTS

| | | | | |
|---|---|---|---|---|
| 4,264,151 A | * | 4/1981 | Okano | 359/675 |
| 4,394,071 A | | 7/1983 | Yamada | 359/675 |
| 4,422,734 A | * | 12/1983 | Tanaka et al. | 359/675 |
| 4,749,263 A | * | 6/1988 | Taniguchi et al. | 359/675 |
| 4,840,466 A | | 6/1989 | Yamada et al. | 359/672 |
| 4,913,537 A | | 4/1990 | Takase | 359/672 |
| 5,602,682 A | * | 2/1997 | Ito et al. | 359/737 |
| 5,726,809 A | * | 3/1998 | Griffith | 359/675 |
| 5,963,377 A | * | 10/1999 | Okada et al. | 359/686 |

FOREIGN PATENT DOCUMENTS

| | | |
|---|---|---|
| JP | 6-230279 | 8/1994 |
| JP | 6-303469 | 10/1994 |
| JP | 7-199067 | 8/1995 |
| JP | 8-114742 | 5/1996 |
| JP | 9-329743 | 12/1997 |
| JP | 9-329744 | 12/1997 |
| JP | 10-123416 | 5/1998 |
| JP | 10-319314 | 12/1998 |

* cited by examiner

Primary Examiner—Jordan M. Schwartz
(74) Attorney, Agent, or Firm—Burns, Doane, Swecker & Mathis, LLP

(57) ABSTRACT

A method of converting a frame-format in a taking optical system comprises steps of arranging a plurality of lens units constituting the taking optical system except for the lens unit disposed at the object-side end or at the image-side end and determining the configuration of the lens unit disposed at the object-side end or at the image-side end based on the desired frame-format.

29 Claims, 24 Drawing Sheets

FNO=2.28
[W]
— d
---- SC
-0.2  0.2
SPHERICAL SINE
ABERRATION CONDITION

Y'=3.1
---- DM
—— DS
-0.2  0.2
ASTIGMATISM

Y'=3.1
-5.0  5.0
DISTORTION%

FNO=2.51
[M]
— d
---- SC
-0.2  0.2
SPHERICAL SINE
ABERRATION CONDITION

Y'=3.1
---- DM
—— DS
-0.2  0.2
ASTIGMATISM

Y'=3.1
-5.0  5.0
DISTORTION%

FNO=2.88
[T]
— d
---- SC
-0.2  0.2
SPHERICAL SINE
ABERRATION CONDITION

Y'=3.1
---- DM
—— DS
-0.2  0.2
ASTIGMATISM

Y'=3.1
-5.0  5.0
DISTORTION%

FNO=2.93

[W]

— d
---- SC

-0.2  0.2
SPHERICAL SINE
ABERRATION CONDITION

Y'=4.0

---- DM
— DS

-0.2  0.2
ASTIGMATISM

Y'=4.0

-5.0  5.0
DISTORTION%

FNO=3.24

[M]

— d
---- SC

-0.2  0.2
SPHERICAL SINE
ABERRATION CONDITION

Y'=4.0

---- DM
— DS

-0.2  0.2
ASTIGMATISM

Y'=4.0

-5.0  5.0
DISTORTION%

FNO=3.72

[T]

— d
---- SC

-0.2  0.2
SPHERICAL SINE
ABERRATION CONDITION

Y'=4.0

---- DM
— DS

-0.2  0.2
ASTIGMATISM

Y'=4.0

-5.0  5.0
DISTORTION%

FNO=2.28
[W]
—— d
---- SC
-0.2  0.2
SPHERICAL SINE
ABERRATION CONDITION

Y'=3.1
---- DM
—— DS
-0.2  0.2
ASTIGMATISM

Y'=3.1
-5.0  5.0
DISTORTION%

FNO=2.51
[M]
—— d
---- SC
-0.2  0.2
SPHERICAL SINE
ABERRATION CONDITION

Y'=3.1
---- DM
—— DS
-0.2  0.2
ASTIGMATISM

Y'=3.1
-5.0  5.0
DISTORTION%

FNO=2.88
[T]
—— d
---- SC
-0.2  0.2
SPHERICAL SINE
ABERRATION CONDITION

Y'=3.1
---- DM
—— DS
-0.2  0.2
ASTIGMATISM

Y'=3.1
-5.0  5.0
DISTORTION%

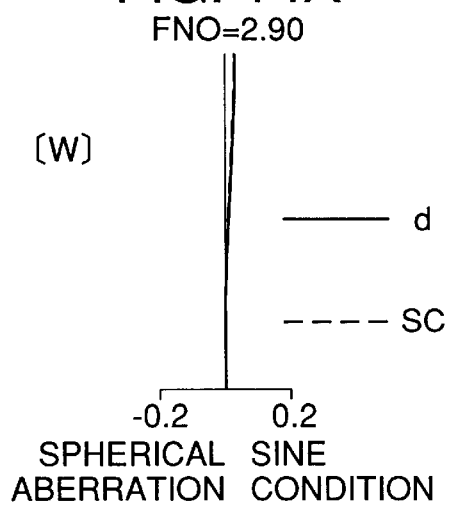
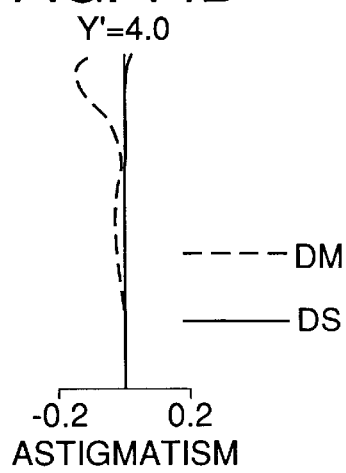
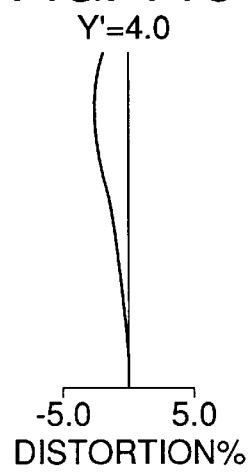
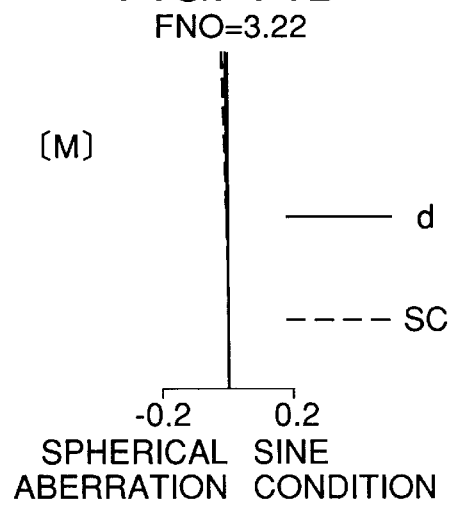
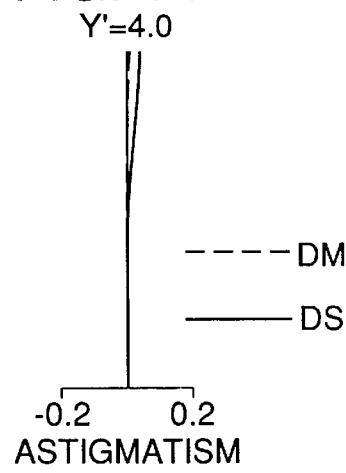
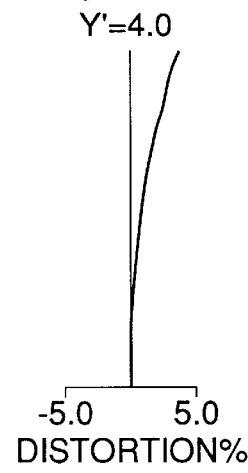
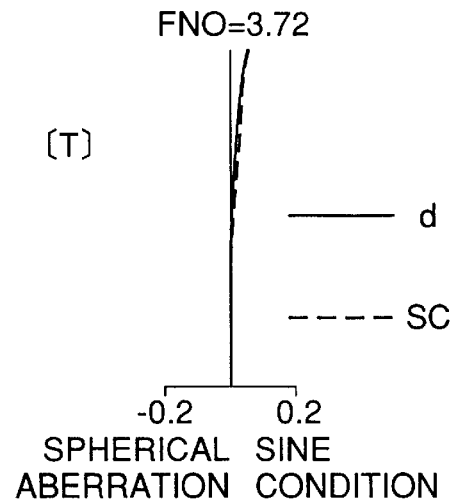
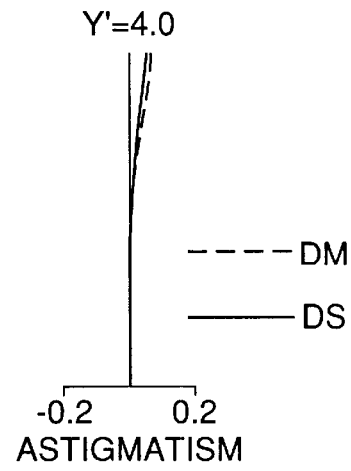
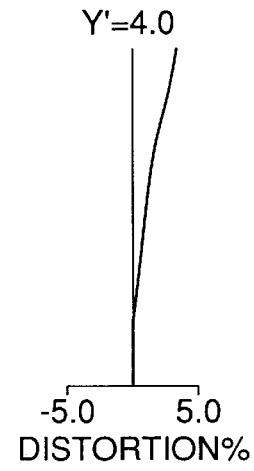

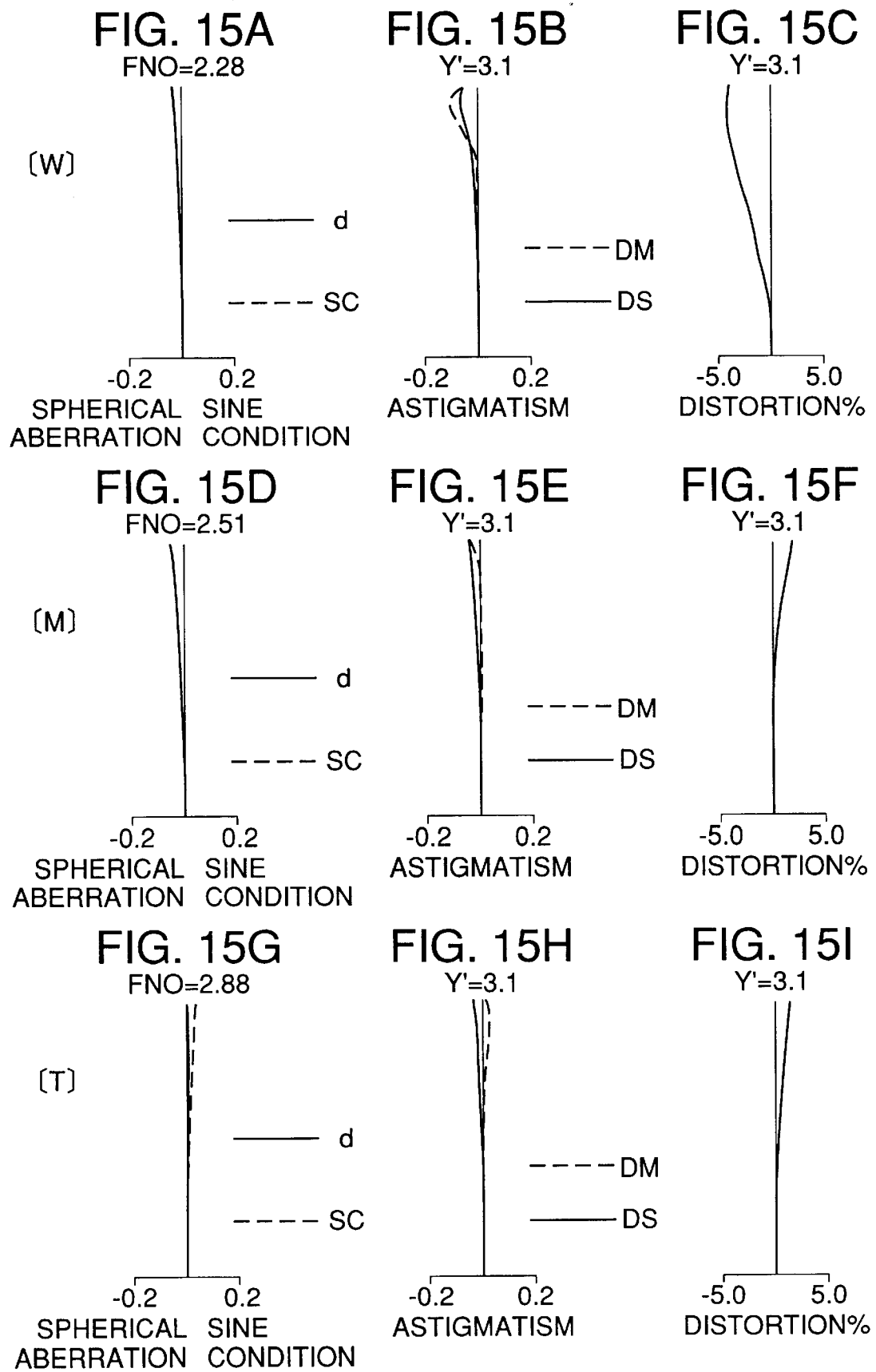

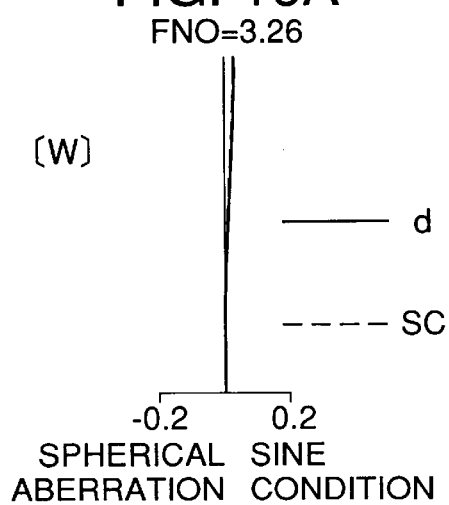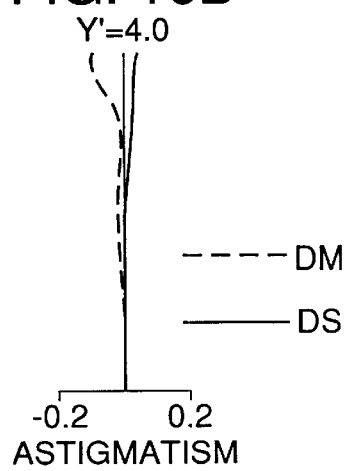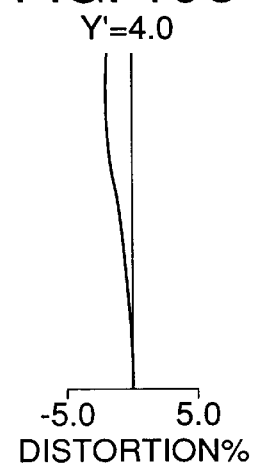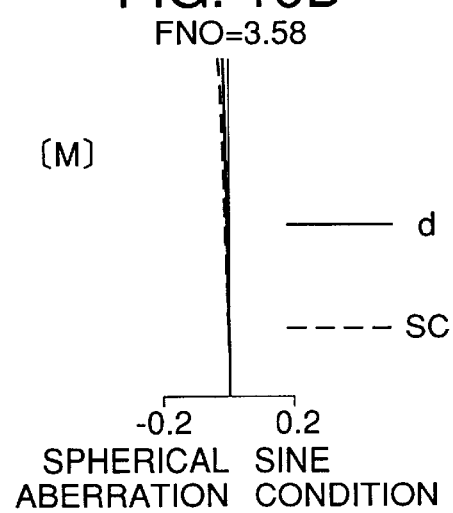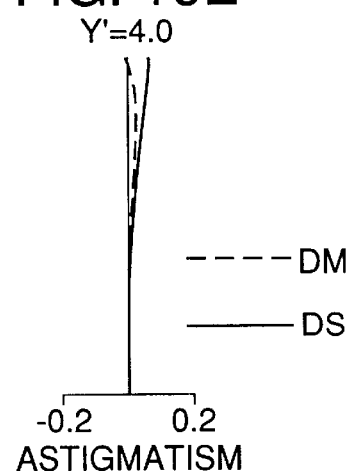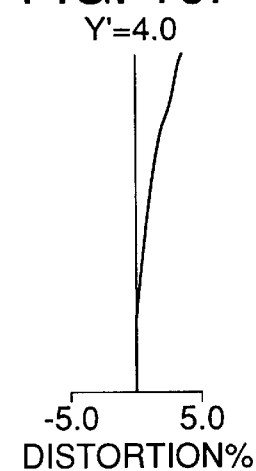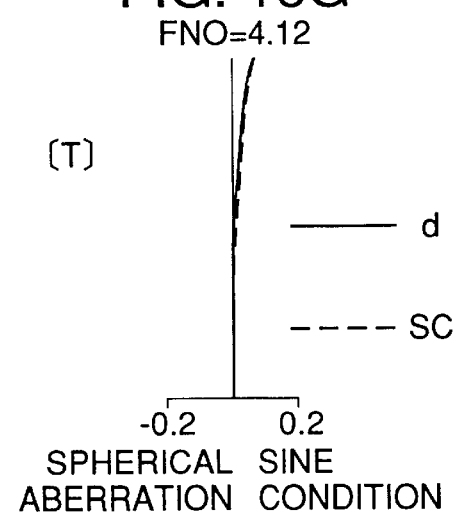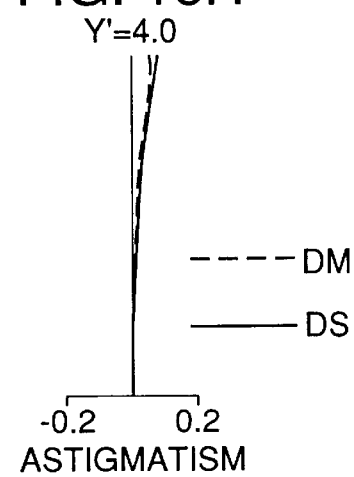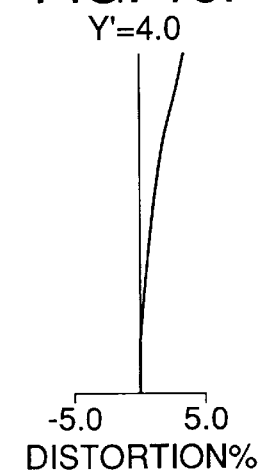

FNO=2.30

[W]

— d
---- SC

-0.2  0.2
SPHERICAL SINE
ABERRATION CONDITION

Y'=3.1

---- DM
—— DS

-0.2  0.2
ASTIGMATISM

Y'=3.1

-5.0  5.0
DISTORTION%

FNO=2.53

[M]

— d
---- SC

-0.2  0.2
SPHERICAL SINE
ABERRATION CONDITION

Y'=3.1

---- DM
—— DS

-0.2  0.2
ASTIGMATISM

Y'=3.1

-5.0  5.0
DISTORTION%

FNO=2.88

[T]

— d
---- SC

-0.2  0.2
SPHERICAL SINE
ABERRATION CONDITION

Y'=3.1

---- DM
—— DS

-0.2  0.2
ASTIGMATISM

Y'=3.1

-5.0  5.0
DISTORTION%

FNO=2.73
[W]

Y'=4.0

Y'=4.0

FNO=3.00
[M]

Y'=4.0

Y'=4.0

FNO=3.40
[T]

Y'=4.0

Y'=4.0

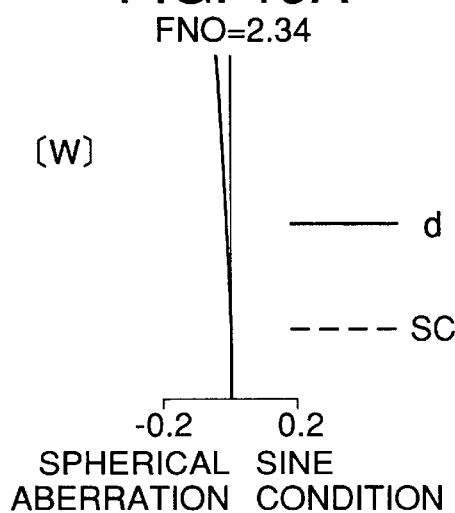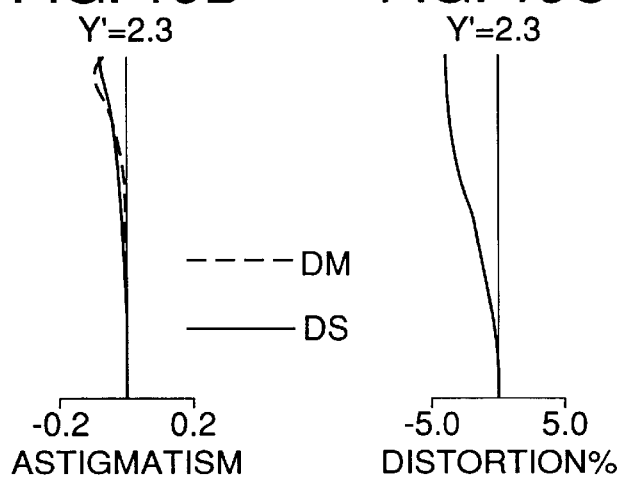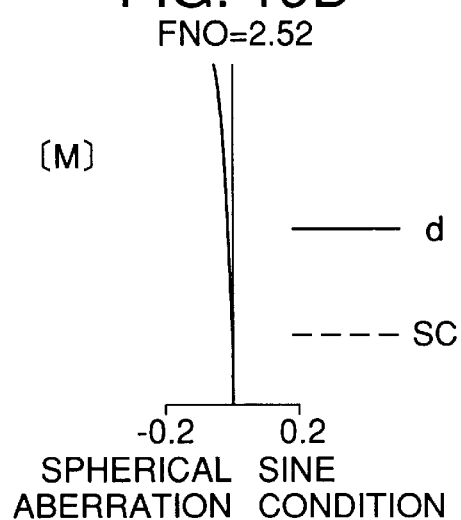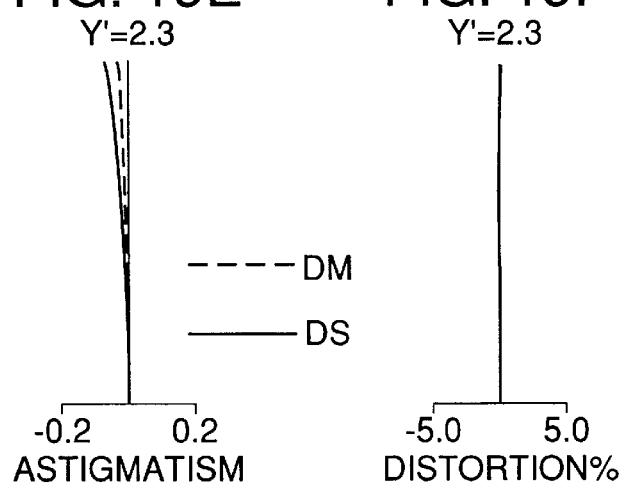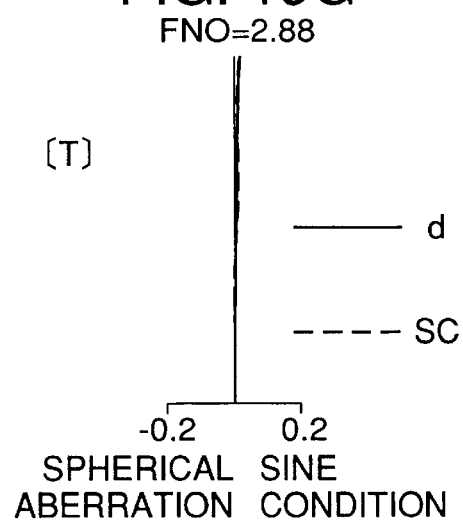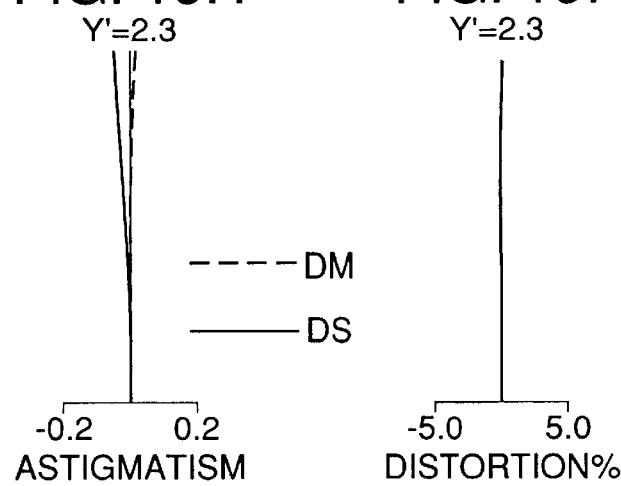

FNO=4.11
[W]
— d
---- SC
-0.2  0.2
SPHERICAL SINE
ABERRATION CONDITION

Y'=4.0
---- DM
— DS
-0.2  0.2
ASTIGMATISM

Y'=4.0
-5.0  5.0
DISTORTION%

FNO=4.43
[M]
— d
---- SC
-0.2  0.2
SPHERICAL SINE
ABERRATION CONDITION

Y'=4.0
---- DM
— DS
-0.2  0.2
ASTIGMATISM

Y'=4.0
-5.0  5.0
DISTORTION%

FNO=5.00
[T]
— d
---- SC
-0.2  0.2
SPHERICAL SINE
ABERRATION CONDITION

Y'=4.0
---- DM
— DS
-0.2  0.2
ASTIGMATISM

Y'=4.0
-5.0  5.0
DISTORTION%

FNO=2.04

[W]

— d
---- SC

-0.1   0.1
SPHERICAL SINE
ABERRATION CONDITION

Y'=3.1

---- DM
— DS

-0.1   0.1
ASTIGMATISM

Y'=3.1

-5.0   5.0
DISTORTION%

FNO=2.34

[M]

— d
---- SC

-0.1   0.1
SPHERICAL SINE
ABERRATION CONDITION

Y'=3.1

---- DM
— DS

-0.1   0.1
ASTIGMATISM

Y'=3.1

-5.0   5.0
DISTORTION%

FNO=2.88

[T]

— d
---- SC

-0.1   0.1
SPHERICAL SINE
ABERRATION CONDITION

Y'=3.1

---- DM
— DS

-0.1   0.1
ASTIGMATISM

Y'=3.1

-5.0   5.0
DISTORTION%

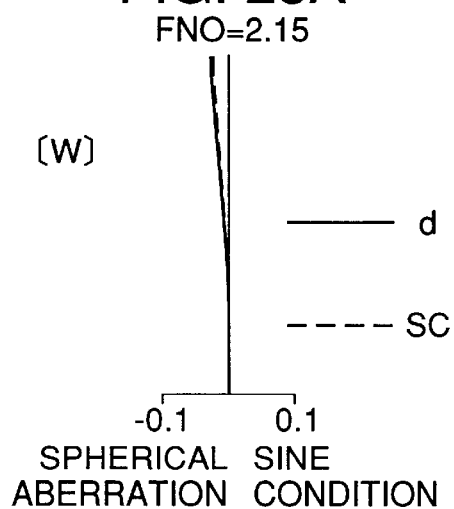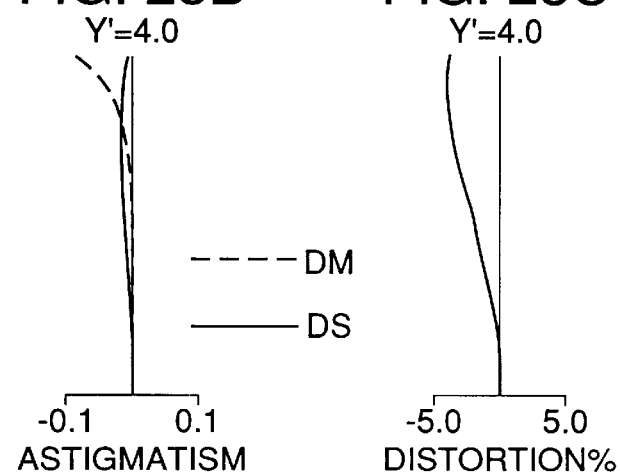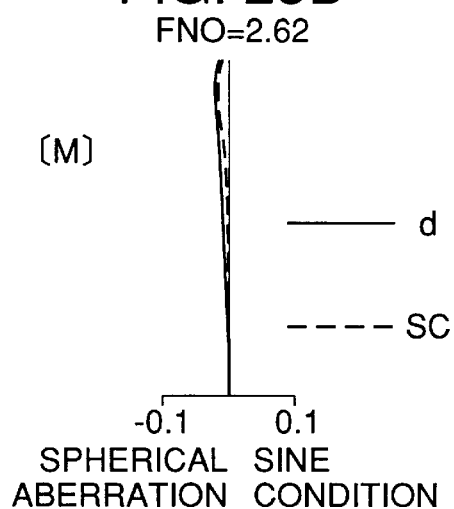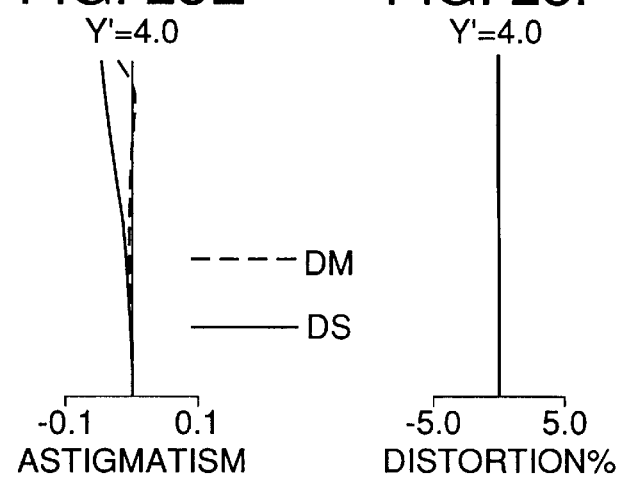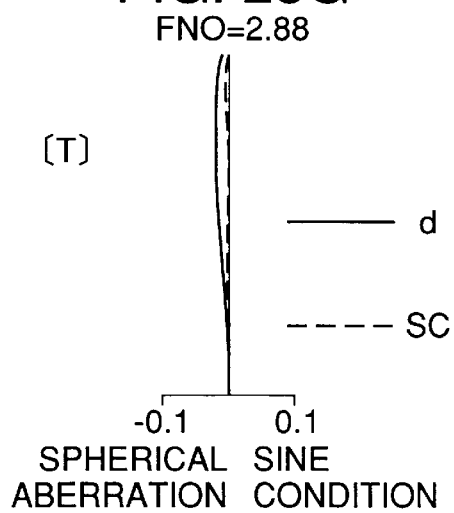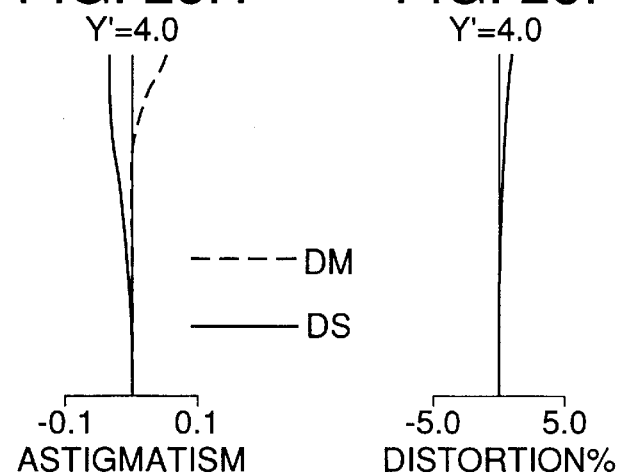

FIG. 29A
FNO=2.95
[W]
—— d
---- SC
-0.1   0.1
SPHERICAL SINE
ABERRATION CONDITION
FIG. 29B
Y'=3.1
---- DM
—— DS
-0.1   0.1
ASTIGMATISM
FIG. 29C
Y'=3.1
-5.0   5.0
DISTORTION%
FIG. 29D
FNO=3.33
[M]
—— d
---- SC
-0.1   0.1
SPHERICAL SINE
ABERRATION CONDITION
FIG. 29E
Y'=3.1
---- DM
—— DS
-0.1   0.1
ASTIGMATISM
FIG. 29F
Y'=3.1
-5.0   5.0
DISTORTION%
FIG. 29G
FNO=3.88
[T]
—— d
---- SC
-0.1   0.1
SPHERICAL SINE
ABERRATION CONDITION
FIG. 29H
Y'=3.1
---- DM
—— DS
-0.1   0.1
ASTIGMATISM
FIG. 29I
Y'=3.1
-5.0   5.0
DISTORTION%
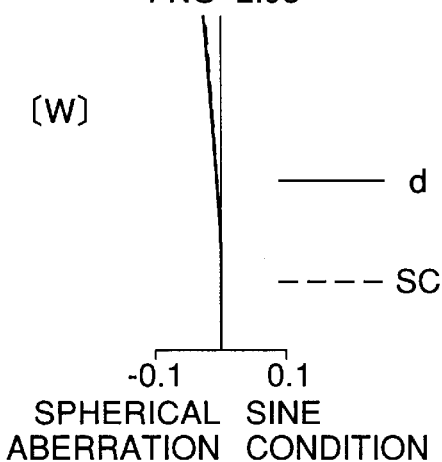
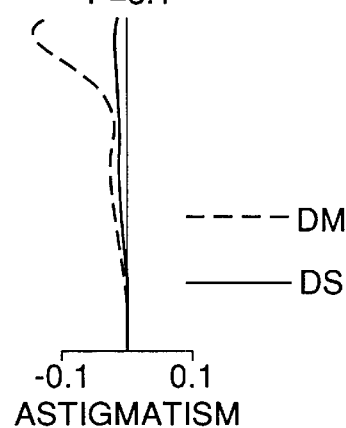
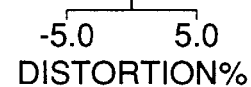
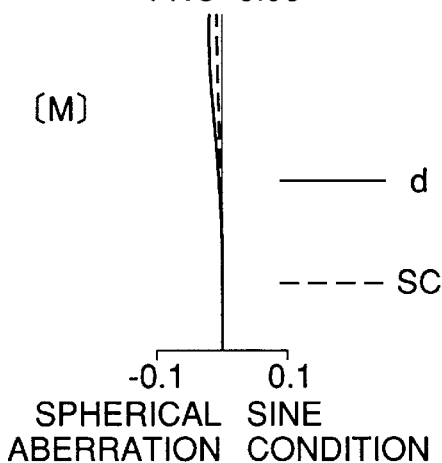
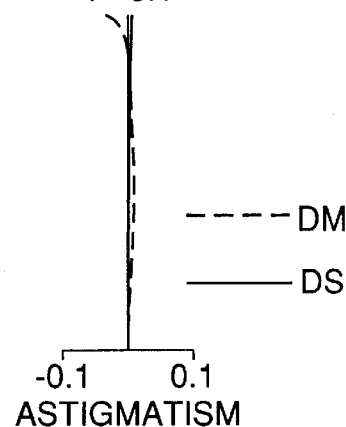
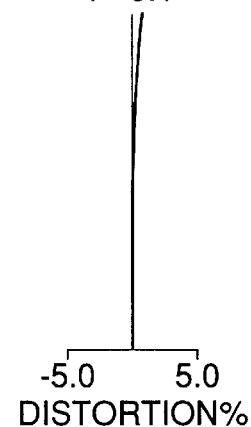
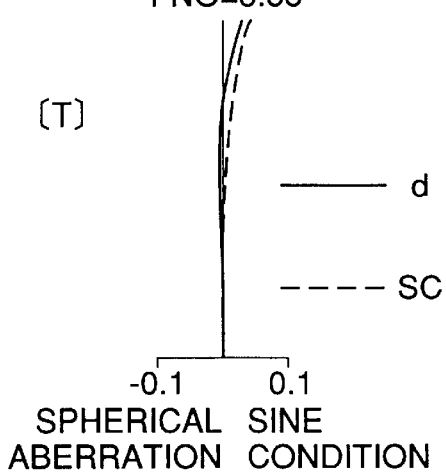
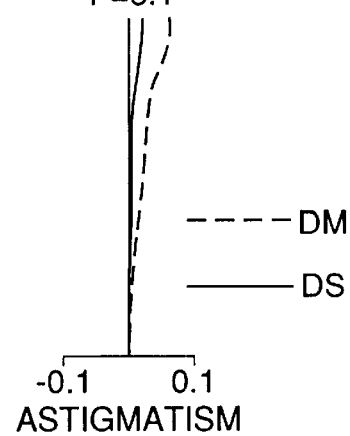
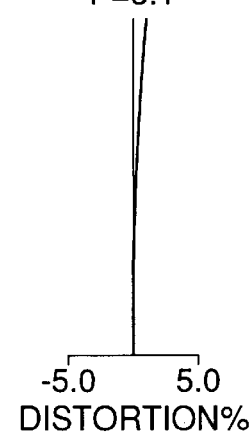

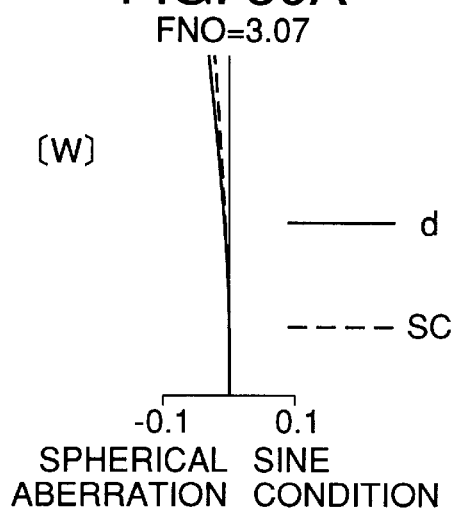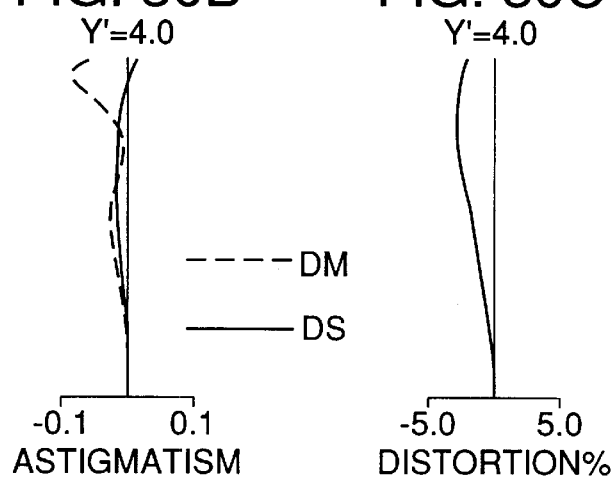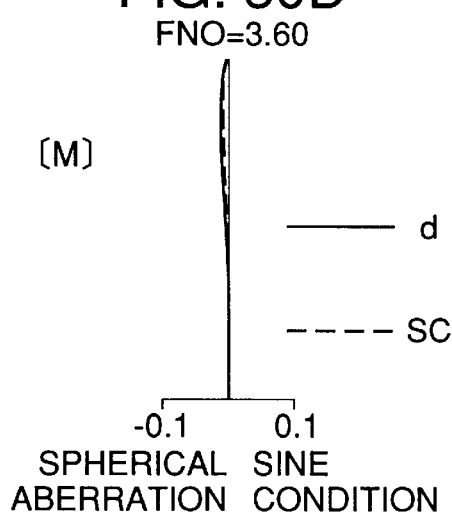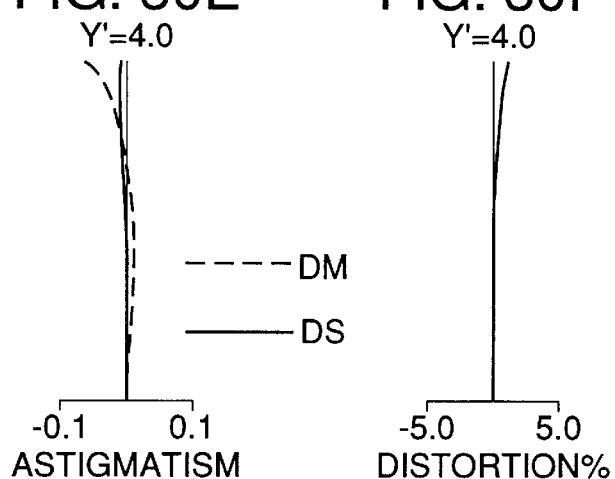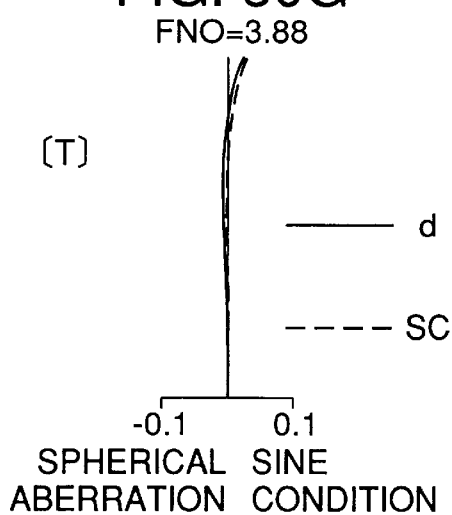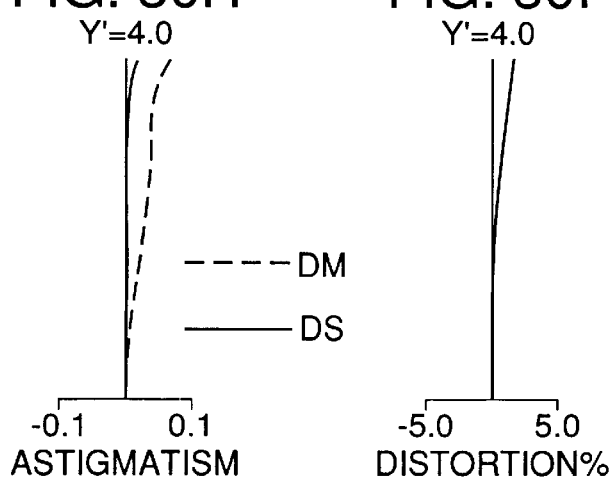

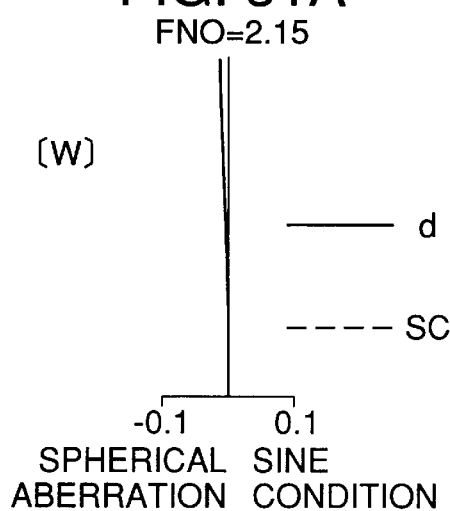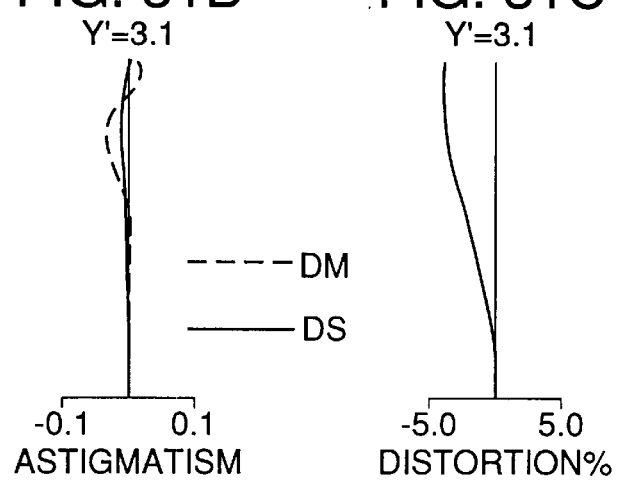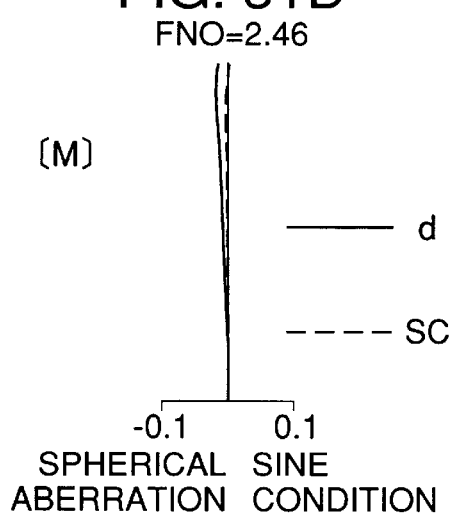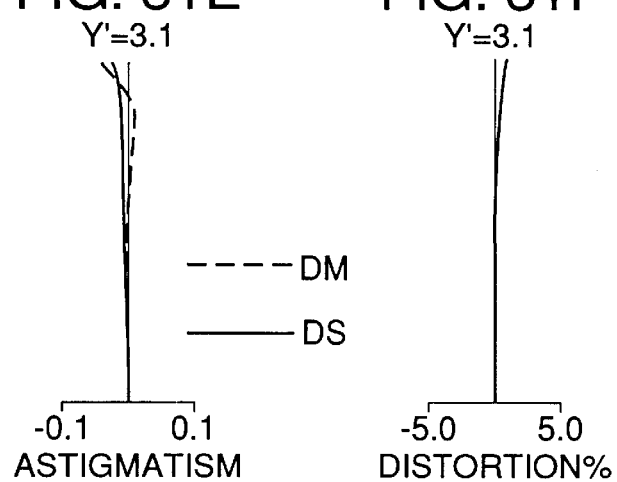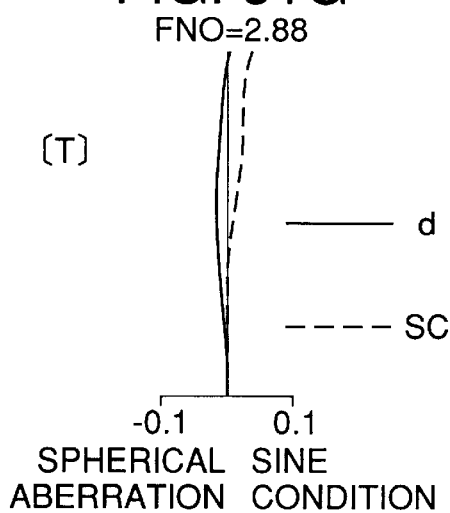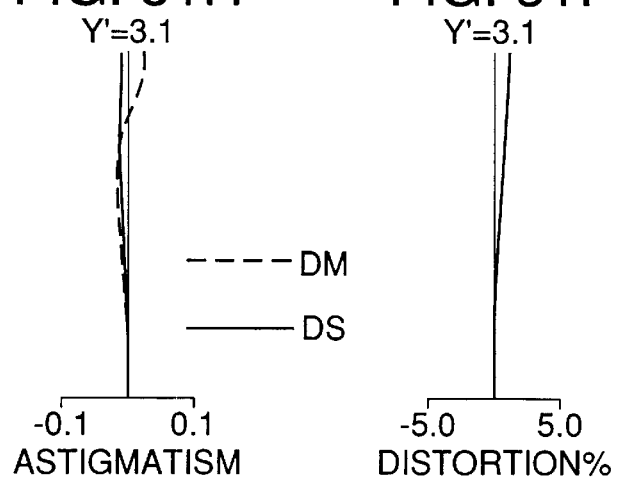

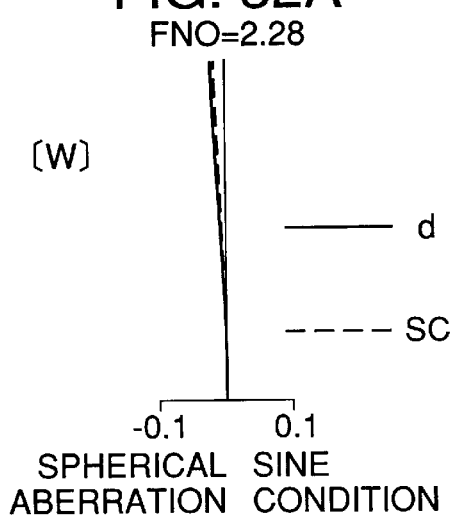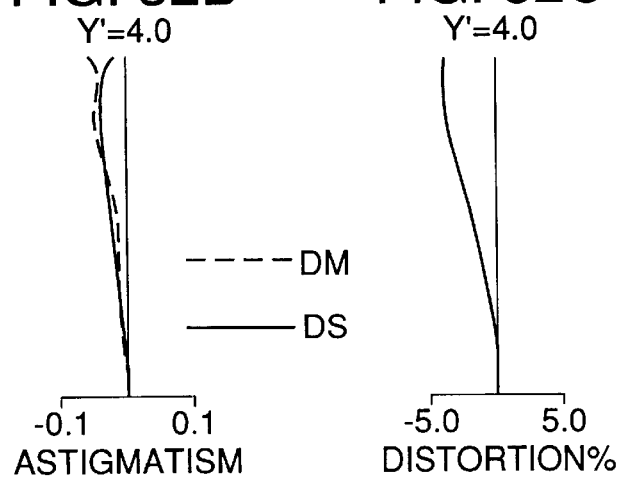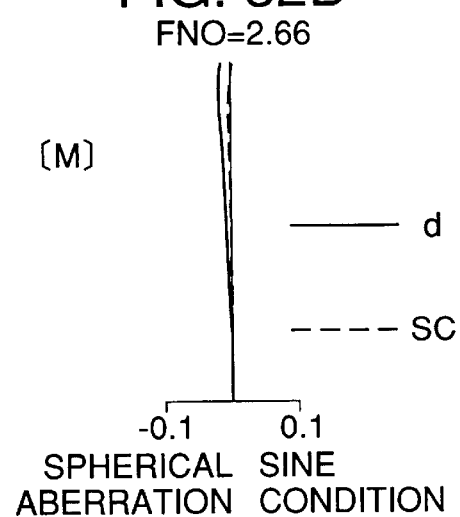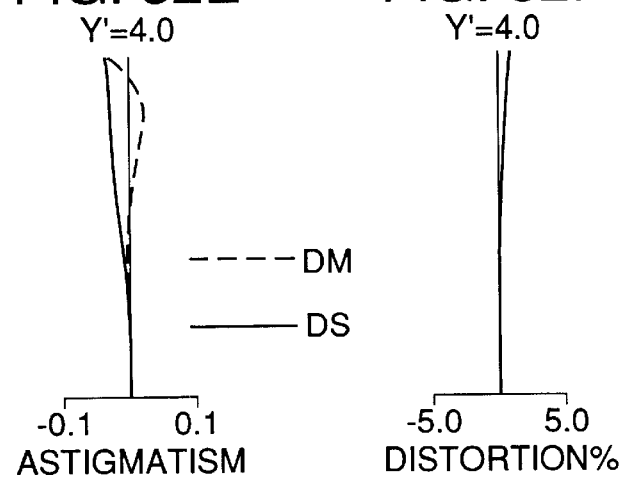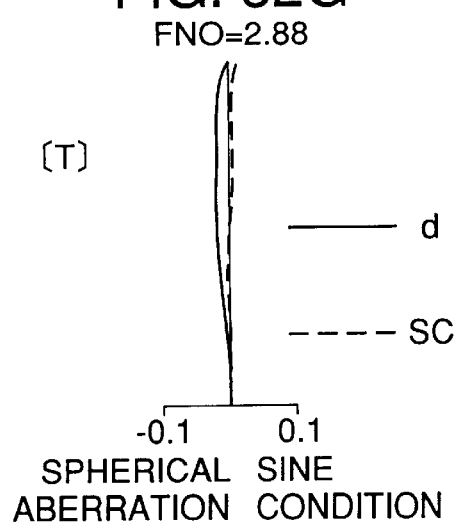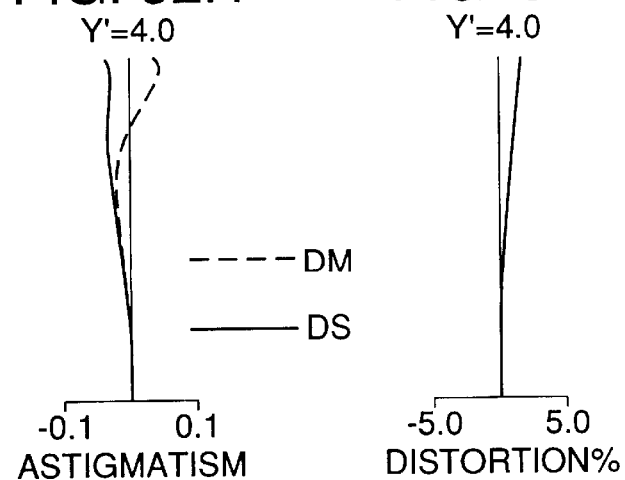

TAKING OPTICAL SYSTEM, IMAGE TAKING APPARATUS, AND METHOD FOR CONVERTING FRAME-FORMAT IN A TAKING OPTICAL SYSTEM

This application is based on applications Nos. H11-023420 and H11-023433 filed in Japan on Feb. 1, 1999, the entire content of which is hereby incorporated by reference.

FIELD OF THE INVENTION

The present invention relates to a taking optical system, and, particularly, to a taking optical system which can cope with different frame-formats (i.e. different numbers of pixels), for example a taking optical system that can be used with image sensing devices having different frame-formats.

BACKGROUND OF THE INVENTION

In recent years, as personal computers become prevalent, digital still cameras have been coming into wider and wider use that allow easy storage of images as electronic data. Such digital still cameras employ an image sensing device. In the modern design of image sensing devices, there are two mutually conflicting trends: one toward smaller frame-formats in keeping with the demand for more compact and more inexpensive cameras, and the other toward higher resolutions within given frame-formats in keeping with the demand for higher quality in images obtained.

For this reason, in the modern design of digital still cameras, it is customary to use, in combination with image sensing devices having different frame-formats according to their respective applications, taking optical systems dedicated exclusively thereto. Thus, developing a taking optical system that can be used with image sensing devices having different frame-formats is expected to lead to a considerable reduction in the costs of taking optical systems in general that are designed for similar applications.

As one example of a taking optical system that can be used with image sensing devices having different frame-formats, it has conventionally been known to apply simply a taking optical system designed for a relatively large frame-format to a relatively small frame-format. As another example, Japanese Laid-Open Patent Applications Nos. H8-114742 and H10-319314 propose using a relay lens system which refocuses the images formed by a taking optical system so as to vary the magnification. As another example, Japanese Laid-Open Patent Applications Nos. H10-123416, H9-329743, H9-329744, and H7-199067 propose disposing a detachable or exchangeable conversion lens unit somewhere in the optical path of a taking optical system so that the construction of the taking optical system can be changed in accordance with the frame-format by detaching or exchanging the conversion lens unit.

However, the first conventional method mentioned above of applying a taking optical system designed for a large frame-format to a small frame-format is impractical, not only because the taking optical system is unduly large relative to a small frame-format, but also because, due to the relationship between the angle of view and the focal length, the focal-length range is shifted toward the longest-focal-length side. The second conventional method mentioned above of using a relay lens system requires securing an extra optical path for the relay lens system, and thus makes the taking optical systems as a whole extremely large.

The third conventional method mentioned above of changing the construction of a taking optical system in accordance with the frame-format by detaching or exchanging a conversion lens unit provided therein requires that the structures of the individual lens barrels for holding the constituent lens units of the taking optical system be changed in accordance with the frame-format, or that the middle portion of the taking optical system be made movable so as to allow the conversion lens unit to be detached or exchanged, and thus makes the design of the taking optical system extremely complicated.

SUMMARY OF THE INVENTION

An object of the present invention is to provide a taking optical system that can be used with image sensing devices having different frame-formats and that offers satisfactorily high image quality despite being compact.

To achieve the above object, according to one aspect of the present invention, a method of converting a frame-format in a taking optical system comprises steps of arranging a plurality of lens units constituting the taking optical system except for the lens unit disposed at the object-side end or at the image-side end and determining the configuration of the lens unit disposed at the object-side end or at the image-side end based on the desired frame-format.

According to another aspect of the present invention, a taking optical system is composed of a main optical system that can form an object image on its own and a conversion optical system that can be removably disposed at the image-side end of the main optical system, wherein, when the object image is taken as the image of the first frame-format, the main optical system alone is used, and, when the object image is taken as the image of the second frame-format that is different from the first frame-format, the main optical system is used with the conversion optical system disposed at the image-side end thereof.

According to another aspect of the present invention, an image taking apparatus is provided with a taking optical system. The taking optical system is composed of a main optical system that can form an object image on its own and a conversion optical system that can be removably disposed at the image-side end of the main optical system, wherein, when the object image is taken as the image of the first frame-format, the main optical system alone is used, and, when the object image is taken as the image of the second frame-format that is different from the first frame-format, the main optical system is used with the conversion optical system disposed at the image-side end thereof. The image taking apparatus can cope with both of the first and second frame-formats.

According to another aspect of the present invention, a method of converting a frame-format in a taking optical system comprises a step of designing the taking optical system to have a main optical system that can form an object image on its own and a conversion optical system that can be removably disposed at the image-side end of the main optical system, and a step of using the main optical system alone when the object image is taken as the image of the first frame-format and using the main optical system with the conversion optical system disposed at the image-side end thereof when the object image is taken as the image of the second frame-format that is different from the first frame-format.

According to another aspect of the present invention, a taking optical system is provided with, from the object side, an object-side lens unit and a plurality of lens units disposed behind the object-side lens unit and performs zooming by moving, of the object-side lens unit and the lens units disposed behind it, at least two lens units along the optical axis, wherein, when an object image is taken as the image of the first frame-format, as the object-side lens unit, a first object-side lens unit is used, and, when the object image is taken as the image of the second frame-format that is larger than the first frame-format, as the object-side lens unit, a second object-side lens unit is used that is differently configured from the first object-side lens unit, and wherein the following condition is fulfilled:

$$0.65 < f1b/f1s < 0.95$$

wherein f1s represents the focal length of the first object-side lens unit; and f1b represents the focal length of the second object-side lens unit.

According to another aspect of the present invention, a taking optical system is provided with, from the object side, an object-side lens unit and a plurality of lens units disposed behind the object-side lens unit and performs zooming by moving, of the object-side lens unit and the lens units disposed behind it, at least two lens units along the optical axis, wherein, when an object image is taken as the image of the first frame-format, as the object-side lens unit, a first object-side lens unit is used, and, when the object image is taken as the image of the second frame-format that is different from the first frame-format, in the zoom range between the middle-focal-length position and the telephoto end of the taking optical system as determined using the first object-side lens unit, as the object-side lens unit, a second object-side lens unit is used that is differently configured from the first object-side lens unit.

According to another aspect of the present invention, a taking optical system is provided with, from the object side, a positively-powered object-side lens unit, a negatively-powered second lens unit, and lens units disposed behind them and performs zooming by moving, of these lens units, at least two lens units along the optical axis, wherein, when an object image is taken as the image of the first frame-format, as the object-side lens unit, a first object-side lens unit is used, and, when the object image is taken as the image of the second frame-format that is larger than the first frame-format, as the object-side lens unit, a second object-side lens is used that is differently configured from the first object-side lens unit.

According to another aspect of the present invention, an image taking apparatus is provided with a taking optical system. The taking optical system is provided with, from the object side, an object-side lens unit and a plurality of lens units disposed behind the object-side lens unit and performs zooming by moving, of the object-side lens unit and the lens units disposed behind it, at least two lens units along the optical axis, wherein, when an object image is taken as the image of the first frame-format, as the object-side lens unit, a first object-side lens unit is used, and, when the object image is taken as the image of the second frame-format that is larger than the first frame-format, as the object-side lens unit, a second object-side lens unit is used that is differently configured from the first object-side lens unit, and wherein the condition noted above is fulfilled. The image taking apparatus can cope with both of the first and second frame-formats.

According to another aspect of the present invention, a method of converting a frame-format in a taking optical system comprises a step of designing the taking optical system to have, from the object side, an object-side lens unit and a plurality of lens units disposed behind it and to perform zooming by moving, of the object-side lens unit and the lens units disposed behind it, at least two lens units along the optical axis and a step of using, as the object-side lens unit, a first object-side lens unit when an object image is taken as the image of the first frame-format and using, as the object-side lens unit, a second object-side lens unit that is differently configured from the first object-side lens unit when the object image is taken as the image of the second frame-format that is larger than the first frame-format, wherein the following condition is fulfilled:

$$0.65 < f1b/f1s < 0.95$$

wherein f1s represents the focal length of the first object-side lens unit; and f1b represents the focal length of the second object-side lens unit.

According to another aspect of the present invention, a method of converting a frame-format in a taking optical system comprises a step of designing the taking optical system to have, from the object side, an object-side lens unit and a plurality of lens units disposed behind it and to perform zooming by moving, of the object-side lens unit and the lens units disposed behind it, at least two lens units along the optical axis and a step of using, as the object-side lens unit, a first object-side lens unit when an object image is taken as the image of the first frame-format and using, as the object-side lens unit, a second object-side lens unit that is differently configured from the first object-side lens unit when the object image is taken as the image of the second frame-format that is different from the first frame-format in the zoom range between the middle-focal-length position and the telephoto end of the taking optical system as determined using the first object-side lens unit.

According to still another aspect of the present invention, a method of converting a frame-format in a taking optical system comprises a step of designing the taking optical system to have, from the object side, a positively-powered object-side lens unit, a negatively-powered second lens unit, and lens units disposed behind them and to perform zooming by moving, of these lens units, at least two lens units along the optical axis and a step of using, as the object-side lens unit, a first object-side lens unit when an object image is taken as the image of the first frame-format and using, as the object-side lens unit, a second object-side lens unit that is differently configured from the first object-side lens unit when the object image is taken as the image of the second frame-format that is larger than the first frame-format.

BRIEF DESCRIPTION OF THE DRAWINGS

This and other objects and features of this invention will become clear from the following description, taken in conjunction with the preferred embodiments with reference to the accompanied drawings in which:

FIGS. 14A to 14I are graphic representations of the aberrations observed in the infinite-distance shooting condition in Example 2 (when set for the second frame-format);

FIGS. 15A to 15I are graphic representations of the aberrations observed in the infinite-distance shooting condition in Example 3 (when set for the first frame-format);

FIGS. 16A to 16I are graphic representations of the aberrations observed in the infinite-distance shooting condition in Example 3 (when set for the second frame-format);

FIGS. 19A to 19I are graphic representations of the aberrations observed in the infinite-distance shooting condition in Example 5 (when set for the first frame-format);

FIGS. 28A to 28I are graphic representations of the aberrations observed in the infinite-distance shooting condition in Example 6 (when set for the second frame-format);

FIGS. 29A to 29I are graphic representations of the aberrations observed in the infinite-distance shooting condition in Example 7 (when set for the first frame-format);

FIGS. 30A to 30I are graphic representations of the aberrations observed in the infinite-distance shooting condition in Example 7 (when set for the second frame-format);

FIGS. 31A to 31I are graphic representations of the aberrations observed in the infinite-distance shooting condition in Example 8 (when set for the first frame-format); and FIGS. 32A to 32I are graphic representations of the aberrations observed in the infinite-distance shooting condition in Example 8 (when set for the second frame-format).

DESCRIPTION OF THE PREFERRED EMBODIMENTS

Hereinafter, taking optical systems embodying the present invention will be described with reference to the corresponding drawings.

Embodiments 1 to 5

FIGS. 1 and 2, FIGS. 3 and 4, FIGS. 5 and 6, FIGS. 7 and 8, and FIGS. 9 and 10 show the lens arrangement of the taking optical systems of a first to a fifth embodiment, respectively, of the invention.

Figure 1:
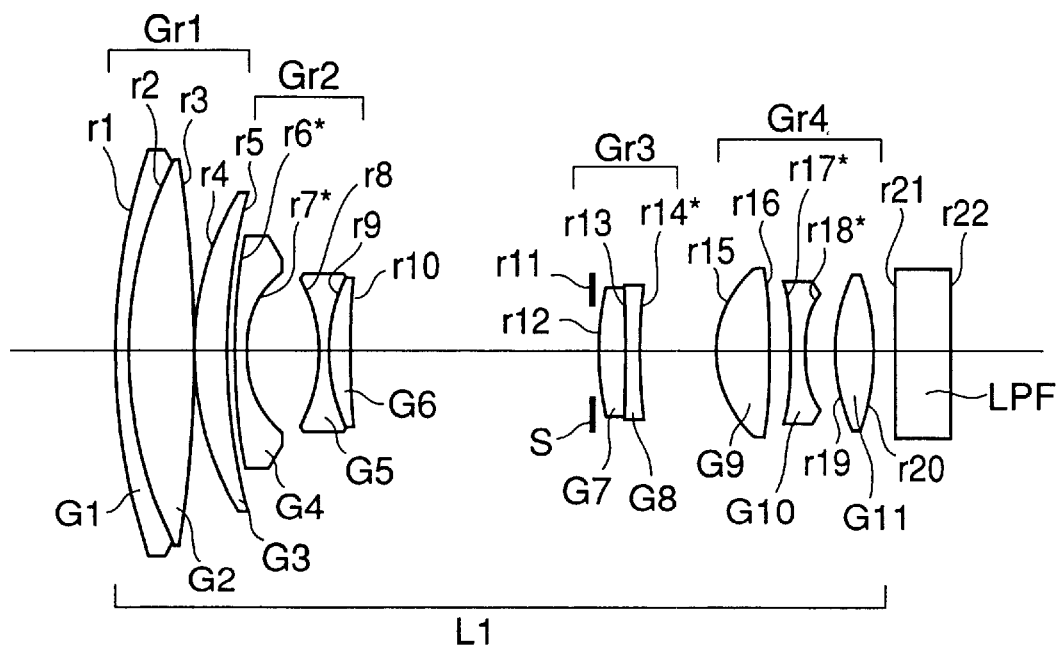
FIG. 1 is a lens arrangement diagram of the taking optical system (when set for the first frame-format) of a first embodiment (Example 1) of the present invention.

The taking optical system of the first embodiment, when configured for a first frame-format (a smaller frame-format, of which the height Y in a direction perpendicular to the optical axis=3.1 mm), is composed solely of a main optical system L1, as shown in FIG. 1. In this figure, the left-hand side is the object side and the right-hand side is the image side. The main optical system L1 is built as a four-unit zoom lens system of a positive-negative-positive-positive configuration composed of, from the object side, a first lens unit Gr1, a second lens unit Gr2, a third lens unit Gr3, and a fourth lens unit Gr4, of which Gr1 and Gr3 are stationary and Gr2 and Gr4 are movable. Gr1 consists of three lens elements G1, G2, and G3; Gr2 consists of three lens elements G4, G5, and G6; Gr3 consists of two lens elements G7 and G8 and an aperture stop S; and Gr4 consists of three lens elements G9, G10, and G11. In addition, a low-pass filter LPF shaped like a flat plate is disposed at the image-side end of the taking optical system.

Figure 2:
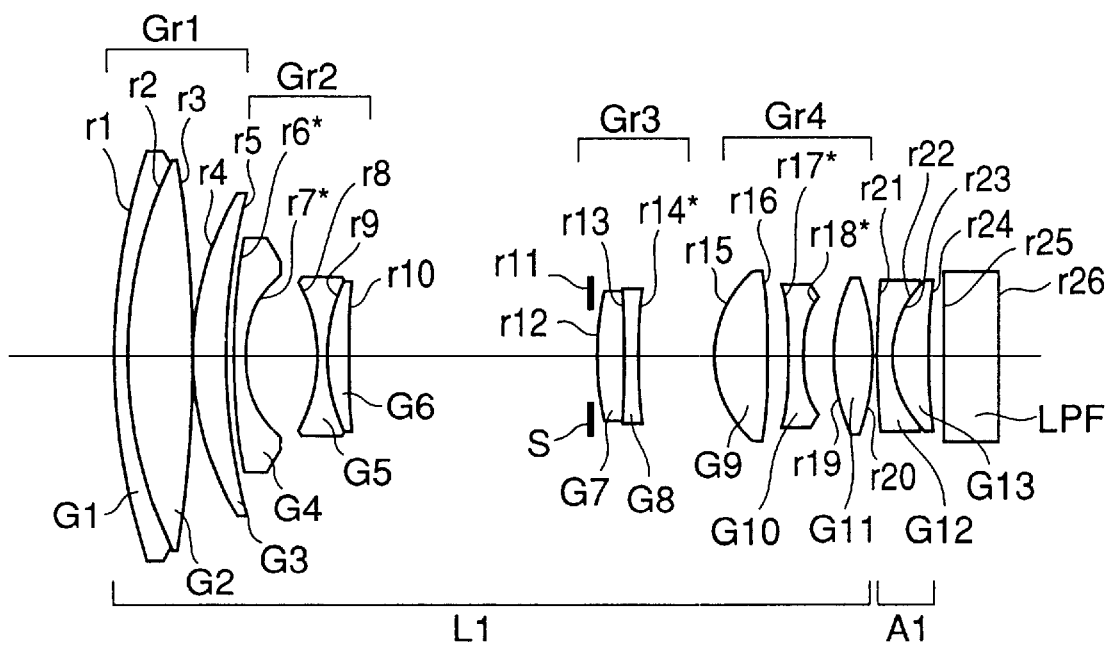
FIG. 2 is a lens arrangement diagram of the taking optical system (when set for the second frame-format) of the first embodiment.

On the other hand, the taking optical system of the first embodiment, when configured for a second frame-format (a larger frame-format, of which the height Y in a direction perpendicular to the optical axis=4.0 mm) has a conversion optical system A1 additionally disposed between the main optical system L1 and the low-pass filter LPF, as shown in FIG. 2. The conversion optical system A1 is composed of two lens elements G12 and G13.

Figure 3:
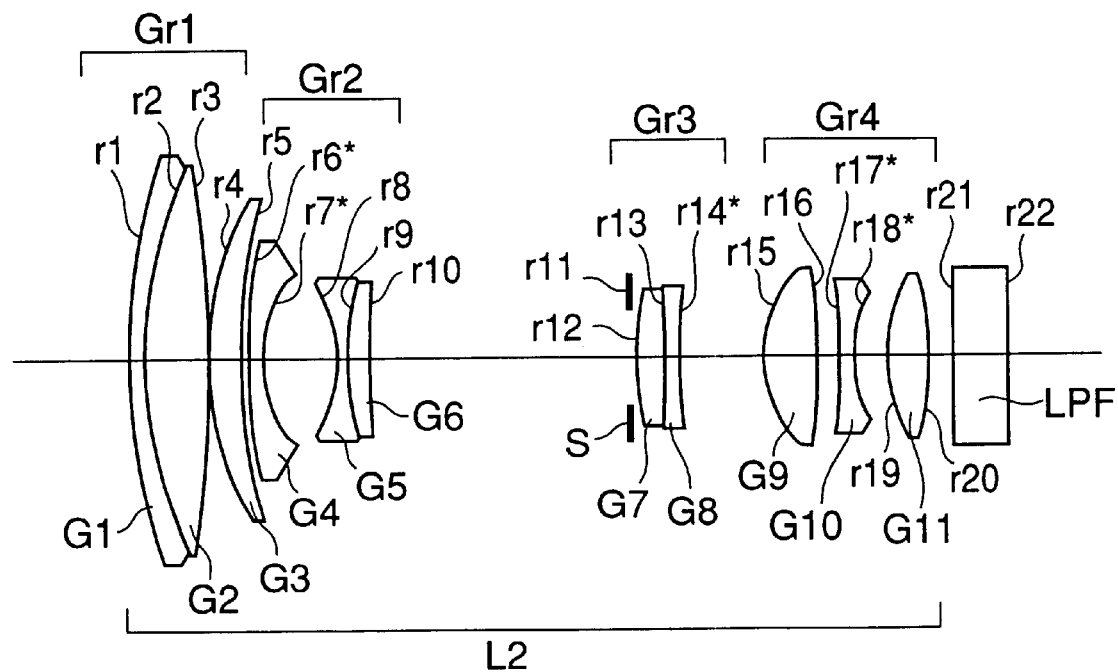
FIG. 3 is a lens arrangement diagram of the taking optical system (when set for the first frame-format) of a second embodiment (Example 2) of the present invention.

The taking optical system of the second embodiment, when configured for a first frame-format (a smaller frame-format, of which the height Y in a direction perpendicular to the optical axis=3.1 mm), is composed solely of a main optical system L2, as shown in FIG. 3. In this figure, the left-hand side is the object side and the right-hand side is the image side. The main optical system L2 is built, like that of the first embodiment, as a four-unit zoom lens system of a positive-negative-positive-positive configuration composed of, from the object side, a first lens unit Gr1, a second lens unit Gr2, a third lens unit Gr3, and a fourth lens unit Gr4, of which Gr1 and Gr3 are stationary and Gr2 and Gr4 are movable. Gr1 consists of three lens elements G1, G2, and G3; Gr2 consists of three lens elements G4, G5, and G6; Gr3 consists of two lens elements G7 and G8 and an aperture stop S; and Gr4 consists of three lens elements G9, G10, and G11. In addition, a low-pass filter LPF shaped like a flat plate is disposed at the image-side end of the taking optical system.

Figure 4:
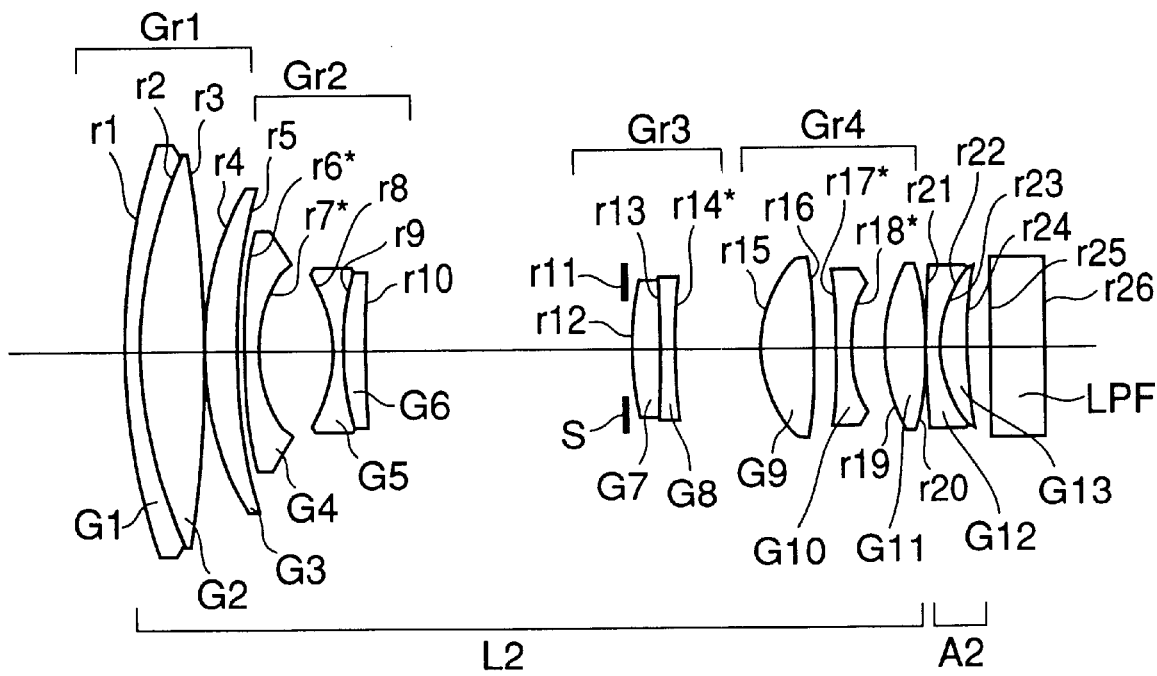
FIG. 4 is a lens arrangement diagram of the taking optical system (when set for the second frame-format) of the second embodiment.

On the other hand, the taking optical system of the second embodiment, when configured for a second frame-format (a larger frame-format, of which the height Y in a direction perpendicular to the optical axis=4.0 mm) has a conversion optical system A2 additionally disposed between the main optical system L2 and the low-pass filter LPF, as shown in FIG. 4. The conversion optical system A2 is composed of two lens elements G12 and G13.

Figure 5:
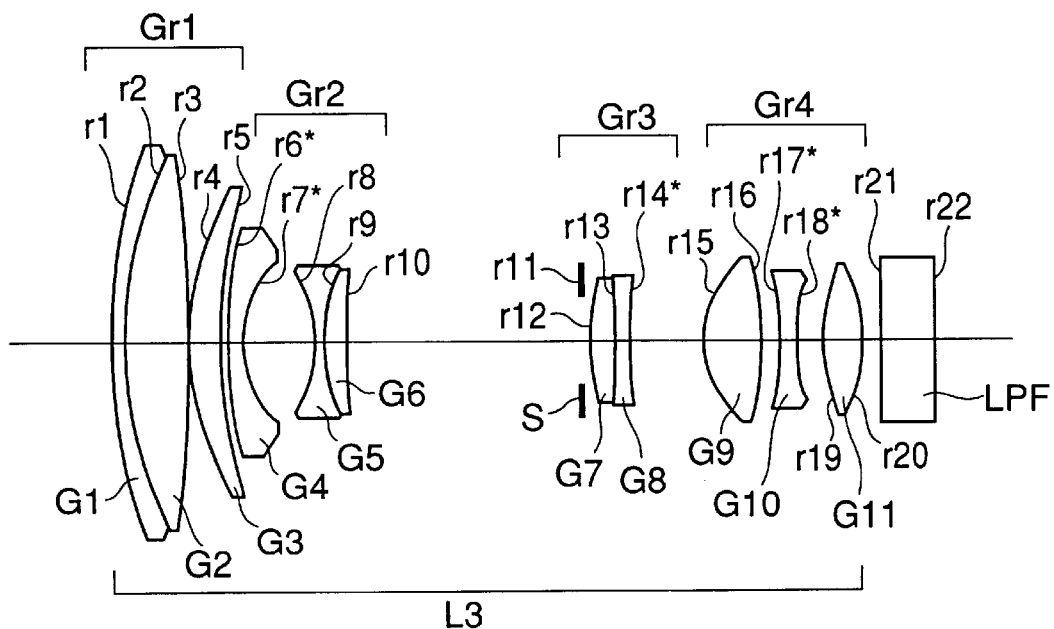
FIG. 5 is a lens arrangement diagram of the taking optical system (when set for the first frame-format) of a third embodiment (Example 3) of the present invention.

The taking optical system of the third embodiment, when configured for a first frame-format (a smaller frame-format, of which the height Y in a direction perpendicular to the optical axis=3.1 mm), is composed solely of a main optical system L3, as shown in FIG. 5. In this figure, the left-hand side is the object side and the right-hand side is the image side. The main optical system L3 is built, like that of the first embodiment, as a four-unit zoom lens system of a positive-negative-positive-positive configuration composed of, from the object side, a first lens unit Gr1, a second lens unit Gr2, a third lens unit Gr3, and a fourth lens unit Gr4, of which Gr1 and Gr3 are stationary and Gr2 and Gr4 are movable. Gr1 consists of three lens elements G1, G2, and G3; Gr2 consists of three lens elements G4, G5, and G6; Gr3 consists of two lens elements G7 and G8 and an aperture stop S; and Gr4 consists of three lens elements G9, G10, and G11. In addition, a low-pass filter LPF shaped like a flat plate is disposed at the image-side end of the taking optical system.

Figure 6:
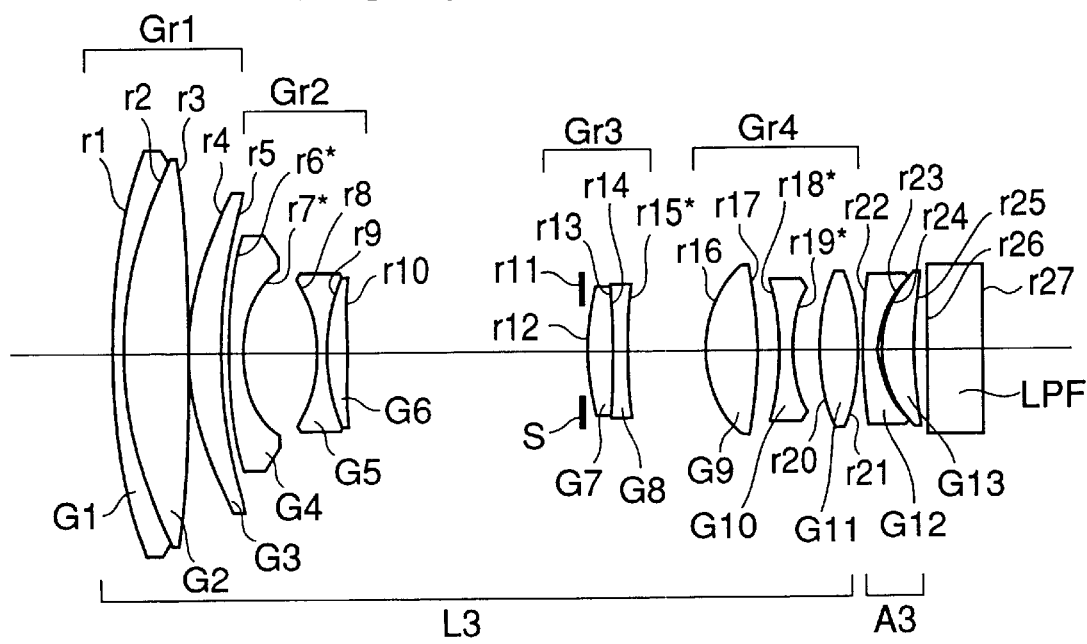
FIG. 6 is a lens arrangement diagram of the taking optical system (when set for the second frame-format) of the third embodiment.

On the other hand, the taking optical system of the third embodiment, when configured for a second frame-format (a larger frame-format, of which the height Y in a direction perpendicular to the optical axis=4.0 mm) has a conversion optical system A3 additionally disposed between the main optical system L3 and the low-pass filter LPF, as shown in FIG. 6. The conversion optical system A3 is composed of two lens elements G12 and G13.

Figure 7:
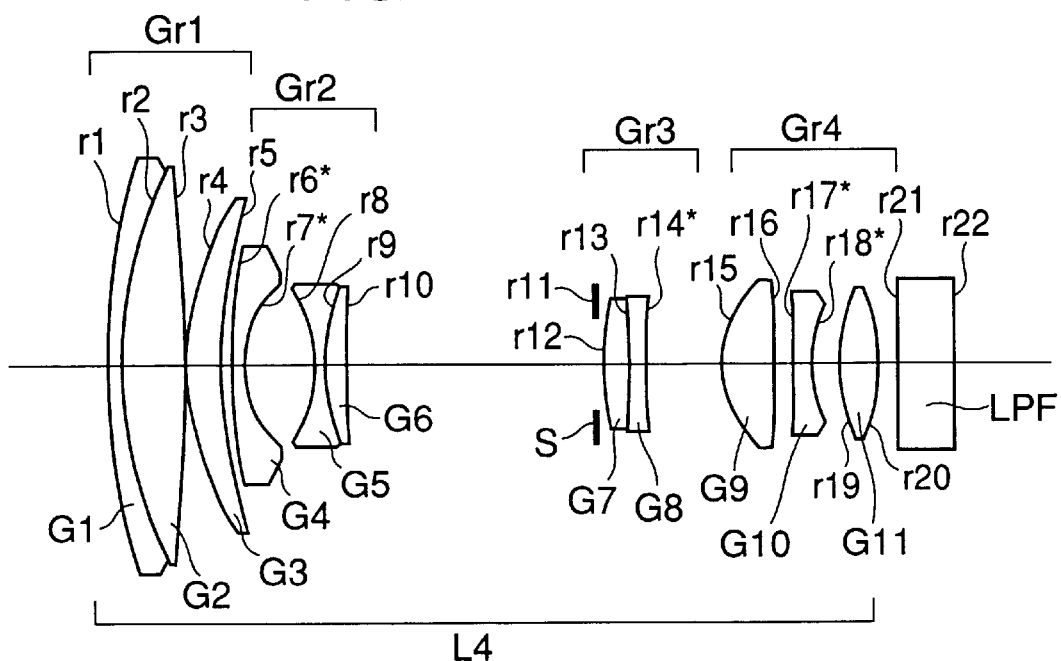
FIG. 7 is a lens arrangement diagram of the taking optical system (when set for the first frame-format) of a fourth embodiment (Example 4) of the present invention.

The taking optical system of the fourth embodiment, when configured for a first frame-format (a smaller frame-format, of which the height Y in a direction perpendicular to the optical axis=3.1 mm), is composed solely of a main optical system L4, as shown in FIG. 7. In this figure, the left-hand side is the object side and the right-hand side is the image side. The main optical system L4 is built, like that of the first embodiment, as a four-unit zoom lens system of a positive-negative-positive-positive configuration composed of, from the object side, a first lens unit Gr1, a second lens unit Gr2, a third lens unit Gr3, and a fourth lens unit Gr4, of which Gr1 and Gr3 are stationary and Gr2 and Gr4 are movable. Gr1 consists of three lens elements G1, G2, and G3; Gr2 consists of three lens elements G4, G5, and G6; Gr3 consists of two lens elements G7 and G8 and an aperture stop S; and Gr4 consists of three lens elements G9, G10, and G11. In addition, a low-pass filter LPF shaped like a flat plate is disposed at the image-side end of the taking optical system.

Figure 8:
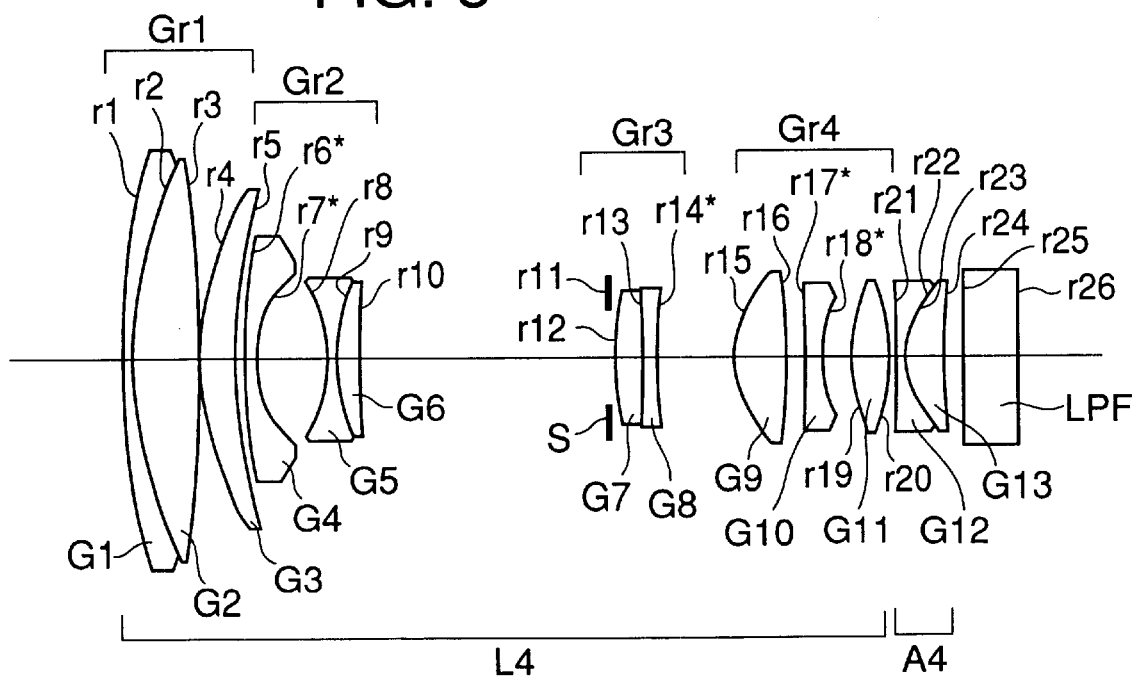
FIG. 8 is a lens arrangement diagram of the taking optical system (when set for the second frame-format) of the fourth embodiment.

On the other hand, the taking optical system of the fourth embodiment, when configured for a second frame-format (a larger frame-format, of which the height Y in a direction perpendicular to the optical axis=4.0 mm) has a conversion optical system A4 additionally disposed between the main optical system L4 and the low-pass filter LPF, as shown in FIG. 8. The conversion optical system A4 is composed of two lens elements G12 and G13.

Figure 9:
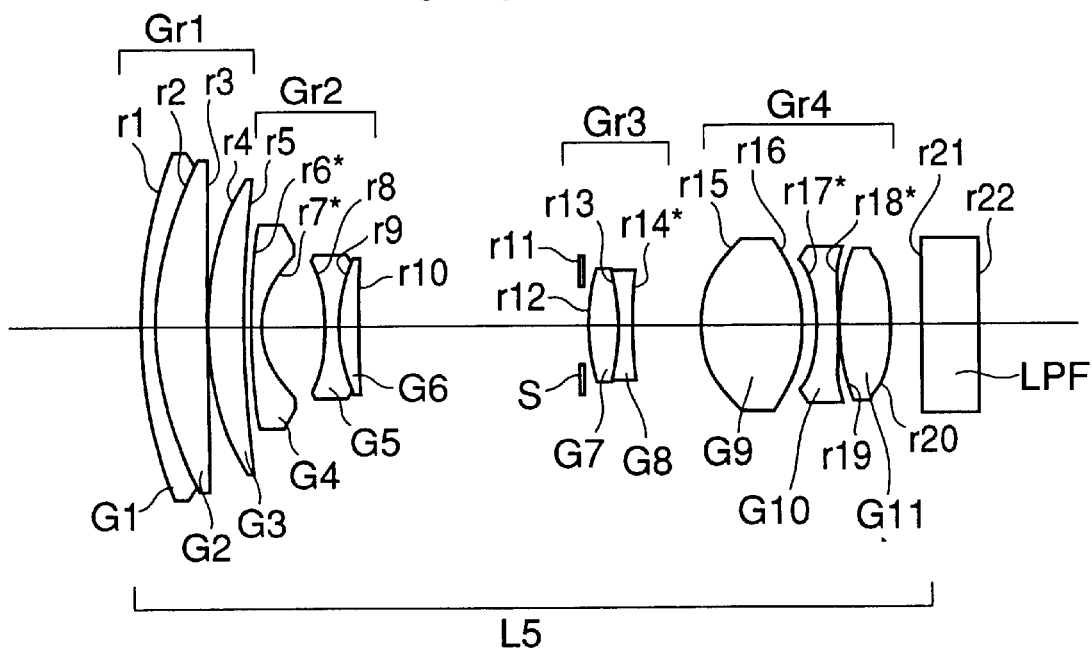
FIG. 9 is a lens arrangement diagram of the taking optical system (when set for the first frame-format) of a fifth embodiment (Example 5) of the present invention.

The taking optical system of the fifth embodiment, when configured for a first frame-format (a smaller frame-format, of which the height Y in a direction perpendicular to the optical axis=2.3 mm), is composed solely of a main optical system L5, as shown in FIG. 9. In this figure, the left-hand side is the object side and the right-hand side is the image side. The main optical system L5 is built, like that of the first embodiment, as a four-unit zoom lens system of a positive-negative-positive-positive configuration composed of, from the object side, a first lens unit Gr1, a second lens unit Gr2, a third lens unit Gr3, and a fourth lens unit Gr4, of which Gr1 and Gr3 are stationary and Gr2 and Gr4 are movable. Gr1 consists of three lens elements G1, G2, and G3; Gr2 consists of three lens elements G4, G5, and G6; Gr3 consists of two lens elements G7 and G8 and an aperture stop S; and Gr4 consists of three lens elements G9, G10, and G11. In addition, a low-pass filter LPF shaped like a flat plate is disposed at the image-side end of the taking optical system.

Figure 10:
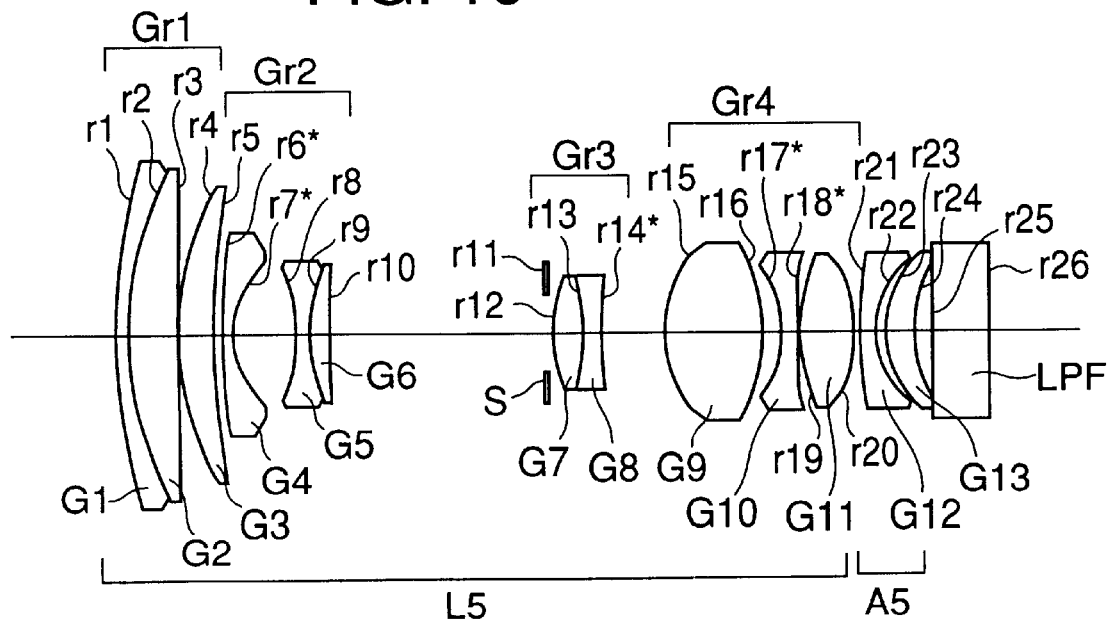
FIG. 10 is a lens arrangement diagram of the taking optical system (when set for the second frame-format) of the fifth embodiment.
Figure 11A:
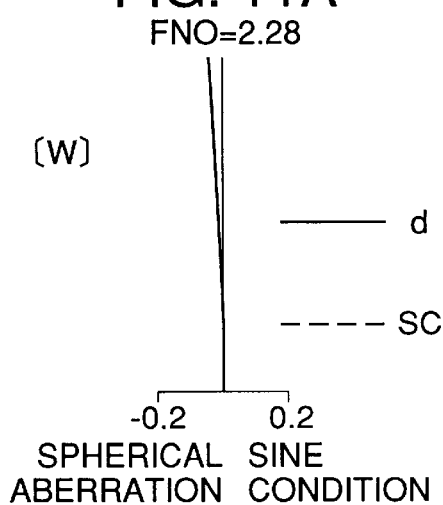
FIGS. 11A to 11I are graphic representations of the aberrations observed in the infinite-distance shooting condition in Example 1 (when set for the first frame-format)
Figure 11B:
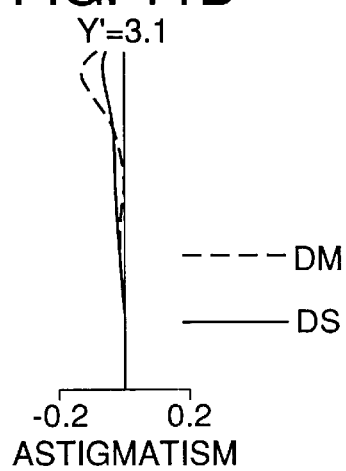
Figure 11C:
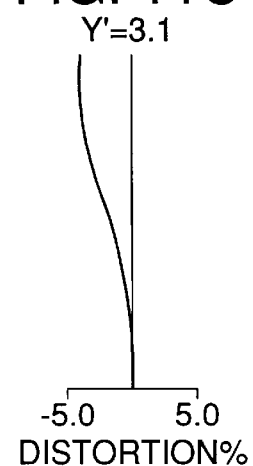
Figure 11D:
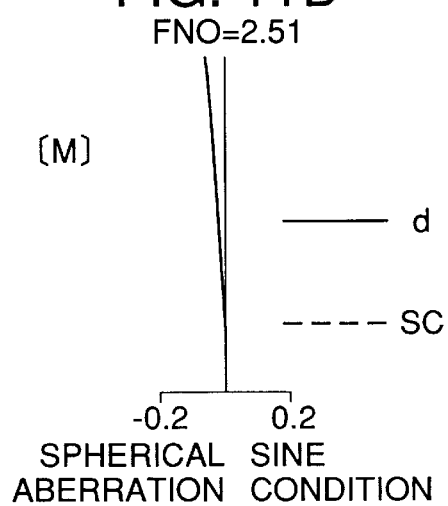
Figure 11E:
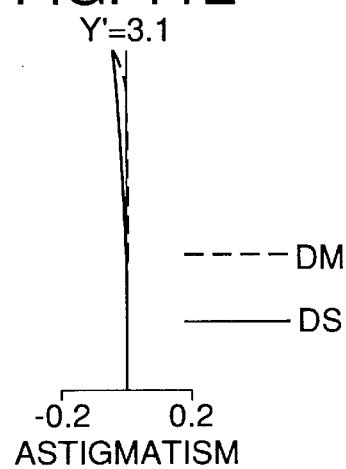
Figure 11F:
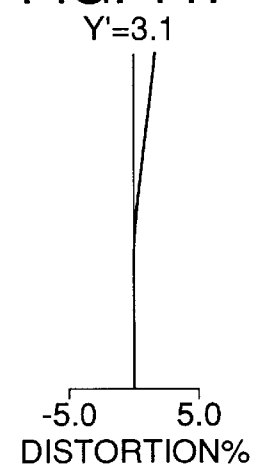
Figure 11G:
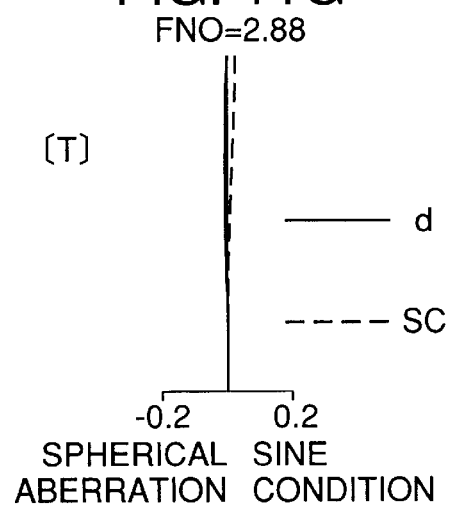
Figure 11H:
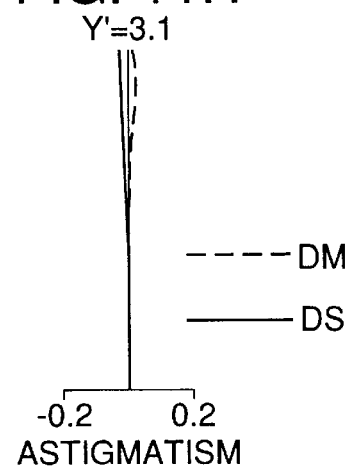
Figure 11I:
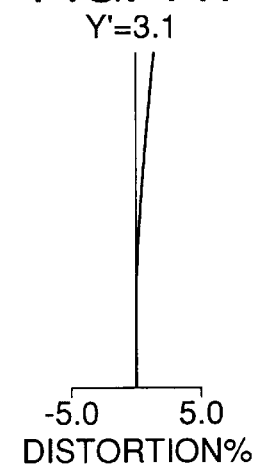
Figure 12A:
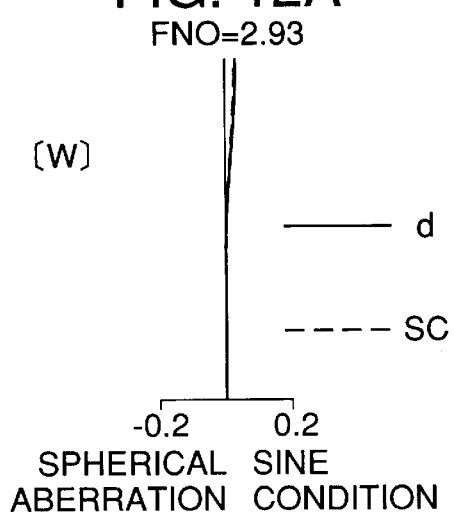
FIGS. 12A to 12I are graphic representations of the aberrations observed in the infinite-distance shooting condition in Example 1 (when set for the second frame-format)
Figure 12B:
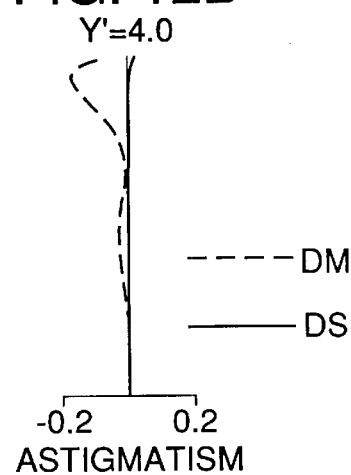
Figure 12C:
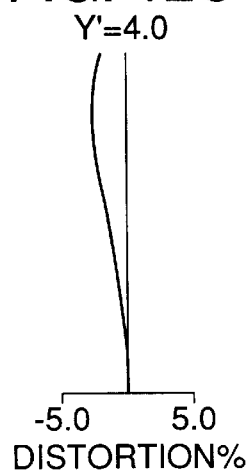
Figure 12D:
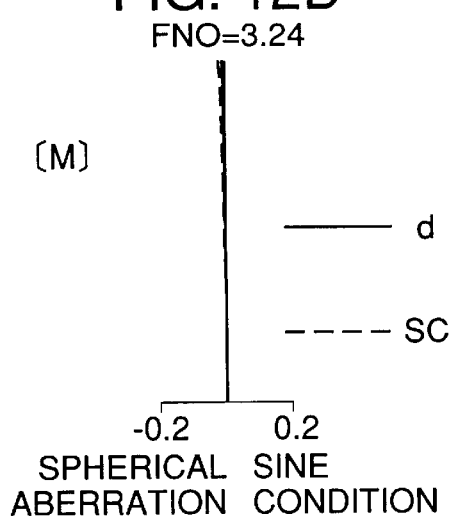
Figure 12E:
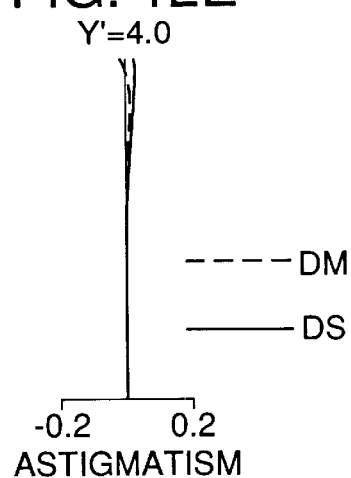
Figure 12F:
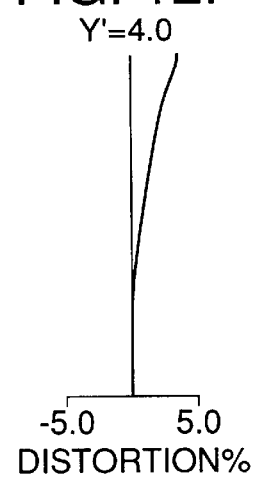
Figure 12G:
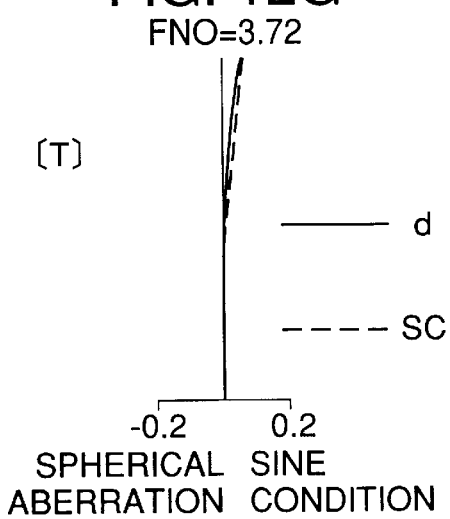
Figure 12H:
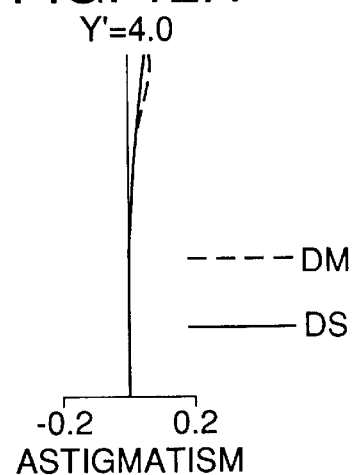
Figure 12I:
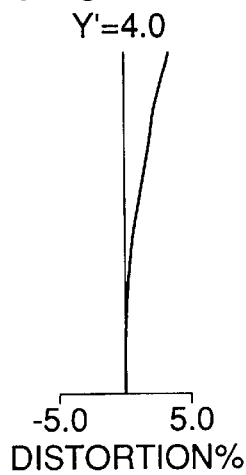
Figure 13A:
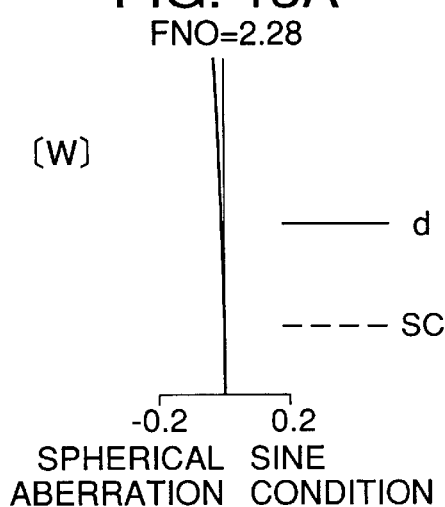
FIGS. 13A to 13I are graphic representations of the aberrations observed in the infinite-distance shooting condition in Example 2 (when set for the first frame-format)
Figure 13B:
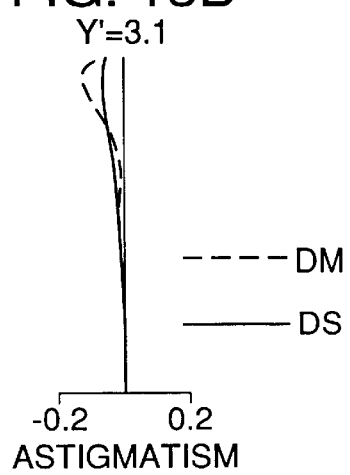
Figure 13C:
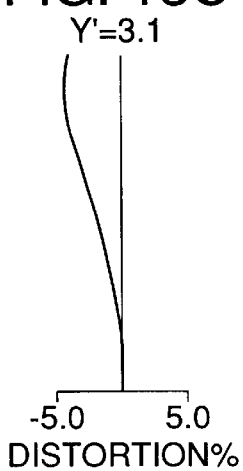
Figure 13D:
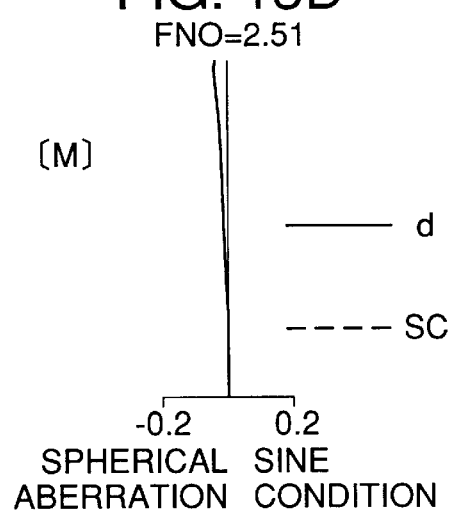
Figure 13E:
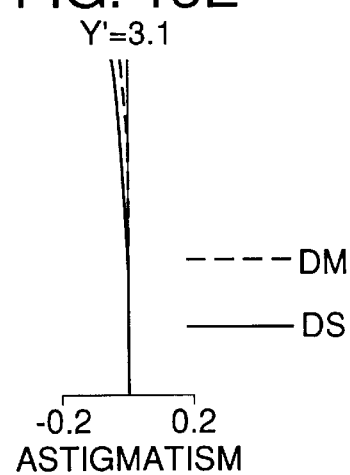
Figure 13F:
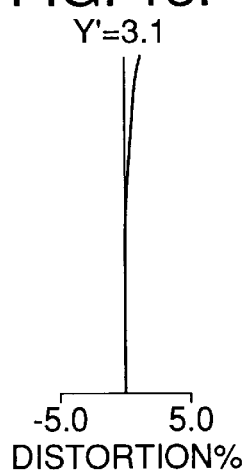
Figure 13G:
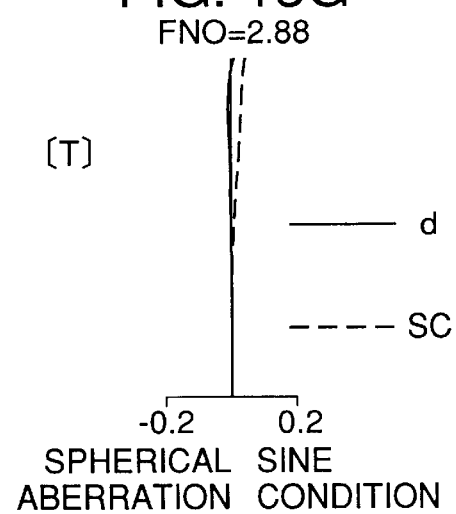
Figure 13H:
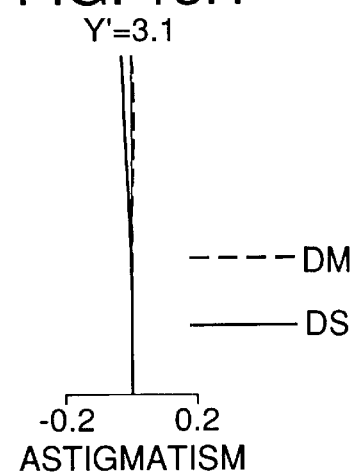
Figure 13I:
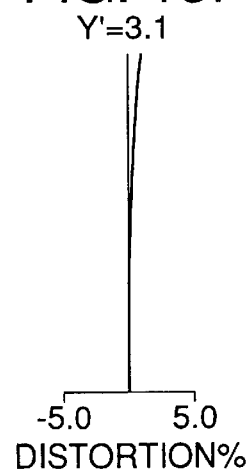
Figure 17A:
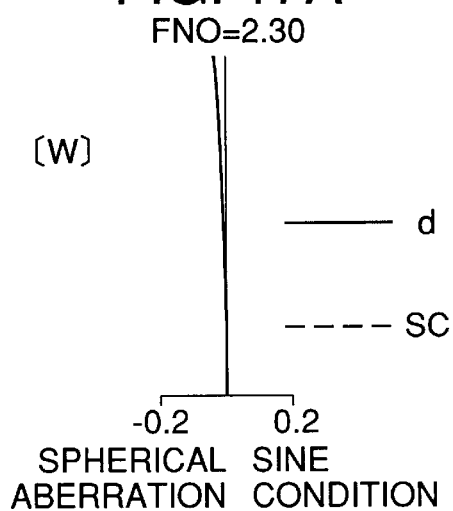
FIGS. 17A to 17I are graphic representations of the aberrations observed in the infinite-distance shooting condition in Example 4 (when set for the first frame-format)
Figure 17B:
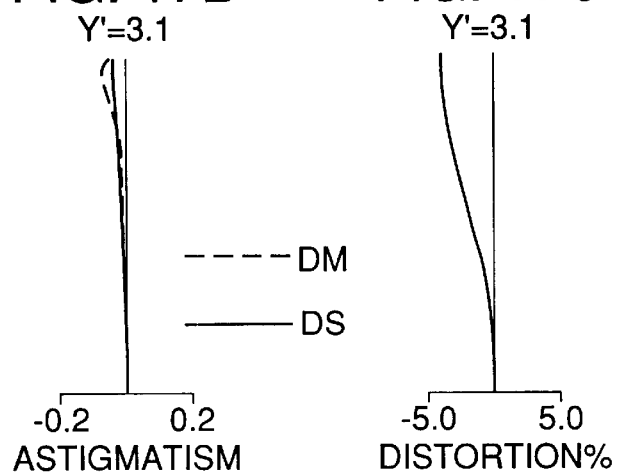
Figure 17C:
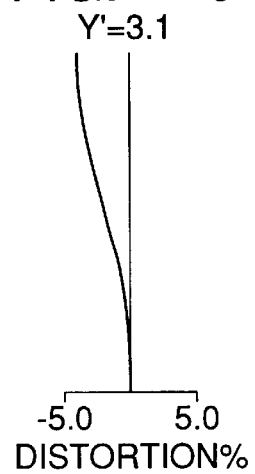
Figure 17D:
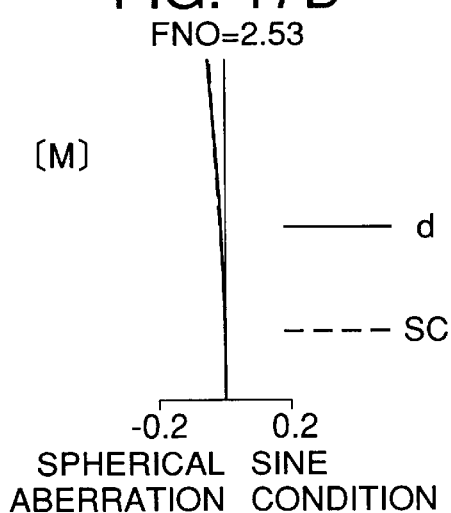
Figure 17E:
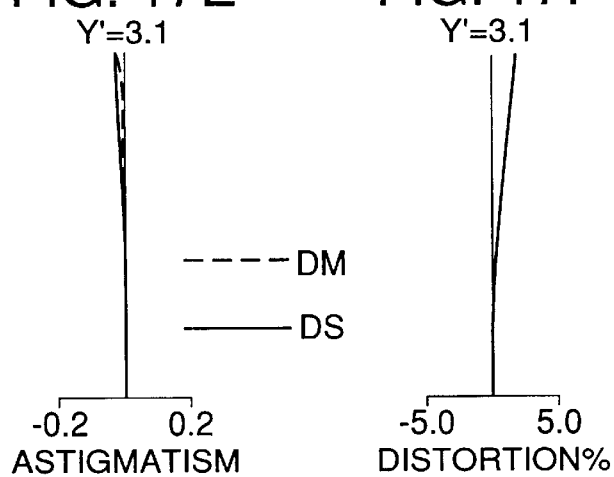
Figure 17F:
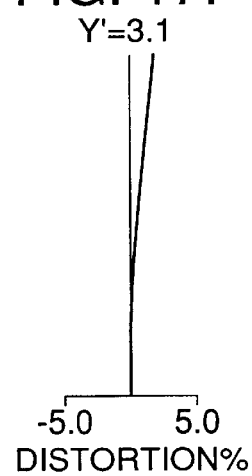
Figure 17G:
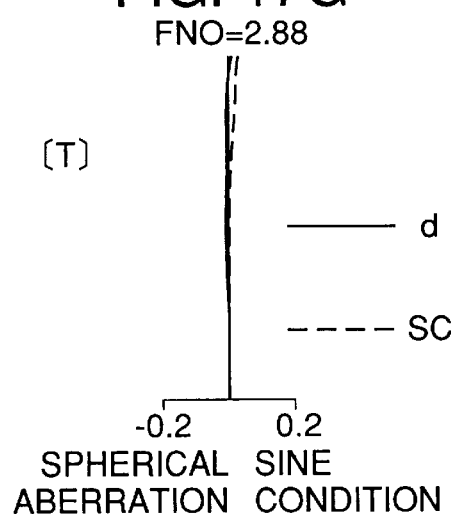
Figure 17H:
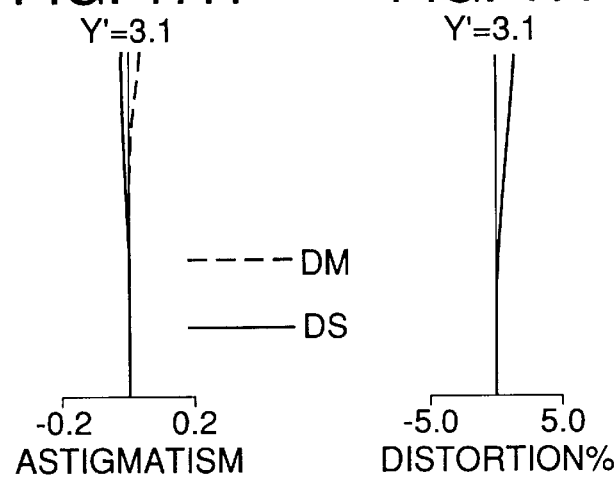
Figure 17I:
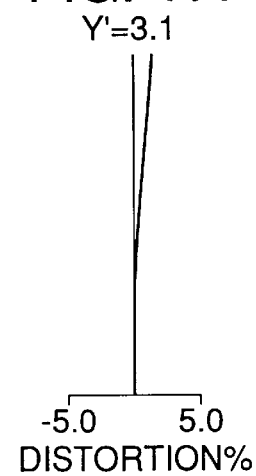
Figure 18A:
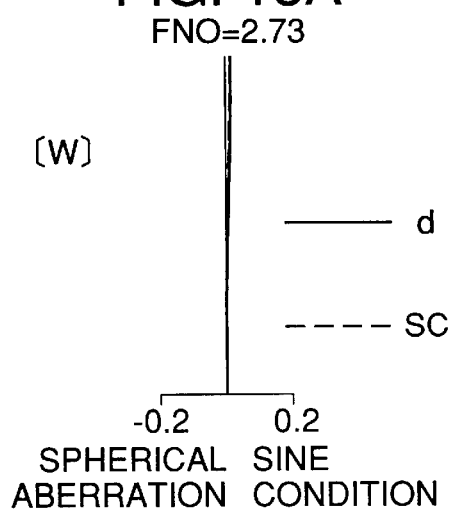
FIGS. 18A to 18I are graphic representations of the aberrations observed in the infinite-distance shooting condition in Example 4 (when set for the second frame-format)
Figure 18B:
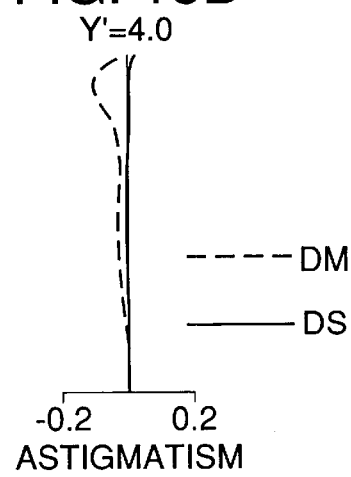
Figure 18C:
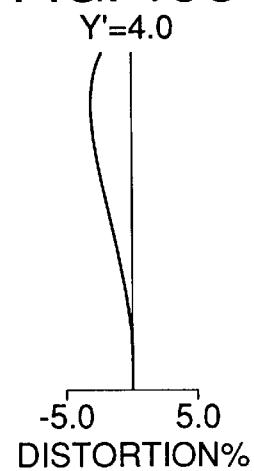
Figure 18D:
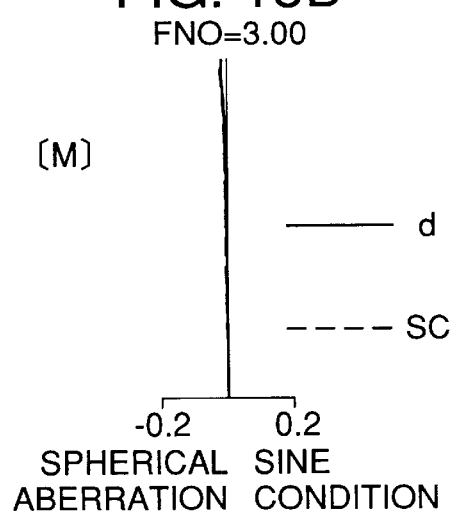
Figure 18E:
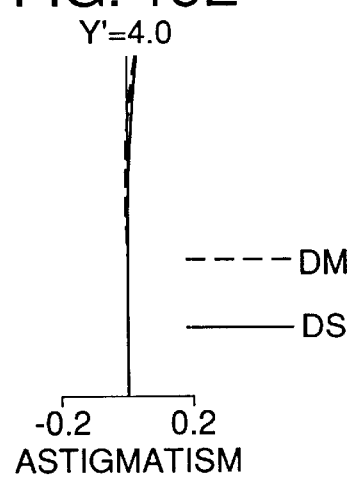
Figure 18F:
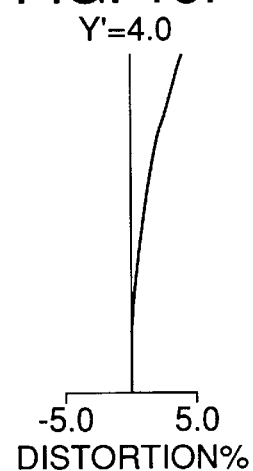
Figure 18G:
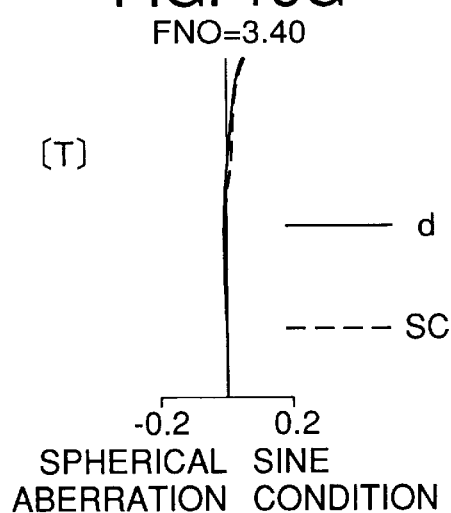
Figure 18H:
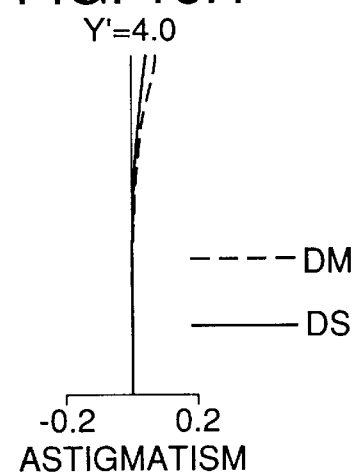
Figure 18I:
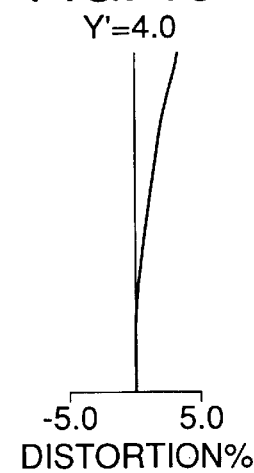
Figure 20A:
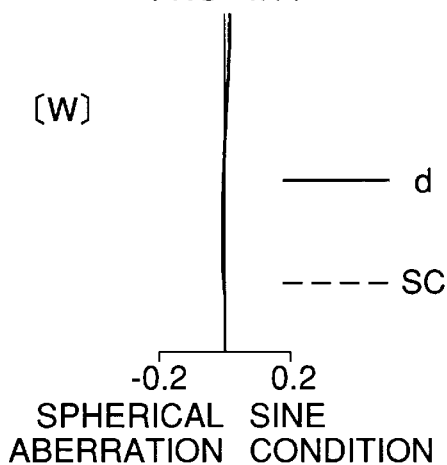
FIGS. 20A to 20I are graphic representations of the aberrations observed in the infinite-distance shooting condition in Example 5 (when set for the second frame-format)
Figure 20B:
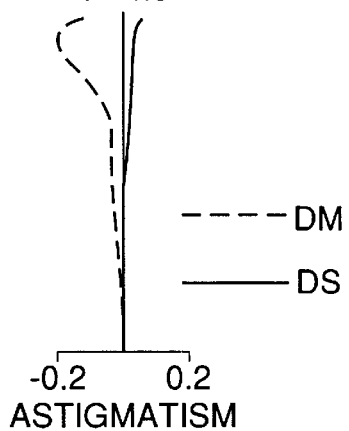
Figure 20C:
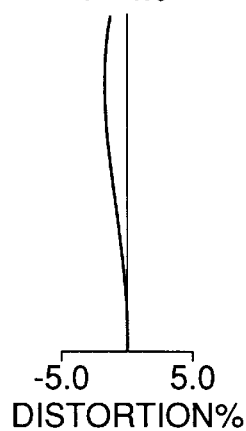
Figure 20D:
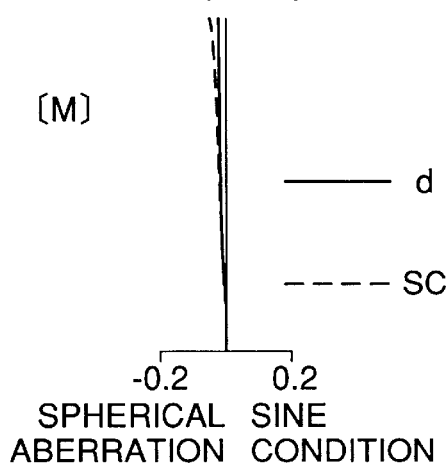
Figure 20E:
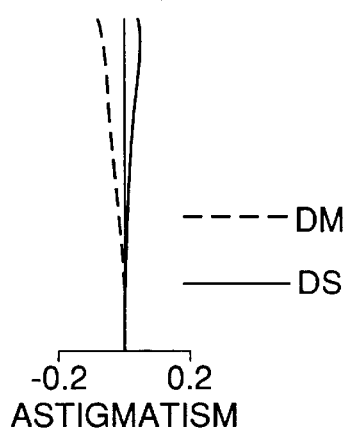
Figure 20F:
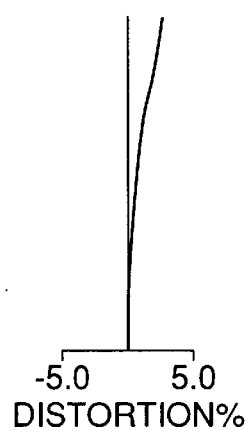
Figure 20G:
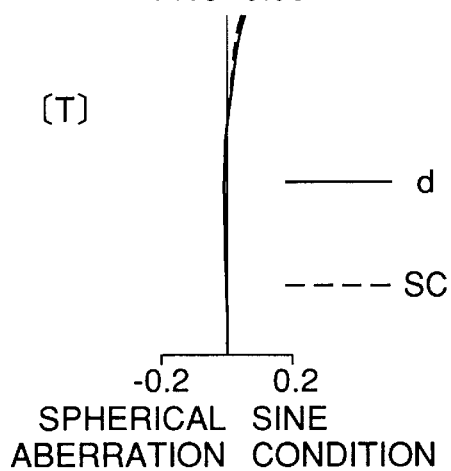
Figure 20H:
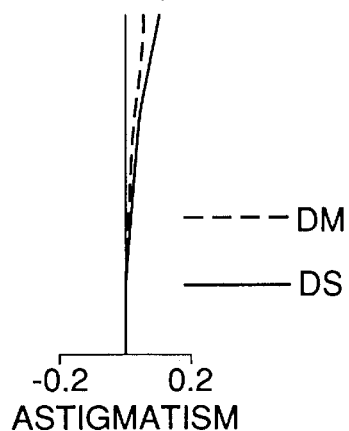
Figure 20I:
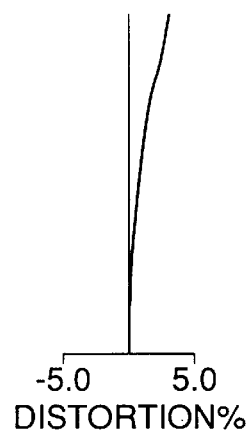

On the other hand, the taking optical system of the fifth embodiment, when configured for a second frame-format (a larger frame-format, of which the height Y in a direction perpendicular to the optical axis=4.0 mm) has a conversion optical system A5 additionally disposed between the main optical system L5 and the low-pass filter LPF, as shown in FIG. 10. The conversion optical system A5 is composed of two lens elements G12 and G13.

In any of these embodiments, other things being equal, the taking optical system is larger when configured for the second frame-format than when configured for the first frame-format. Therefore, in converting the frame-format, rearranging the configuration for the second frame-format into the configuration for the first frame-format by adding the conversion optical system to the former results in making the thus converted taking optical system unduly large for the first frame-format. Accordingly, it is more advantageous in terms of miniaturization to rearrange the configuration for the first frame-format into the configuration for the second frame-format by adding the conversion optical system to the former, as is practiced in the embodiments described above.

The conditions which are preferably fulfilled by these taking optical systems will be described below. In the embodiments 1 to 5 described above, it is preferable that the taking optical system, when configured for the second frame-format, fulfill Condition (1) below.

$$2.5 < |fc/Yb| < 11.0 \tag{1}$$

wherein fc represents the focal length of the conversion optical system; and

Yb represents the maximum image height of the second frame-format.

Condition (1) defines the focal length of the conversion optical system. If the value of Condition (1) is equal to or less than its lower limit, the focal length of the conversion optical system is so short, i.e. the optical power thereof is so strong, that it is difficult to correct aberrations, in particular barrel-shaped distortion and curvature of field. In contrast, if the value of Condition (1) is equal to or greater than its upper limit, the focal length of the conversion optical system is so long, i.e. the optical power thereof is so weak, that it is difficult to obtain sufficiently high magnification. As a result, it is not possible to obtain a significant difference between the focal lengths observed without and with the conversion optical system, and thus the taking optical system, when configured for the second frame-format, is so wide-angle oriented that it is difficult to correct peripheral imaging performance, in particular curvature of field.

In the embodiments 1 to 5, it is preferable that the taking optical system, when configured for the second frame-format, fulfill Condition (2) below.

$$1.1 < \beta c < 1.9 \qquad (2)$$

wherein
$\beta c$ represents the lateral magnification of the conversion optical system.

Condition (2) defines the magnification of the conversion optical system. If the value of Condition (2) is equal to or less than its lower limit, the conversion magnification is so low that the focal length of the taking optical system is not enlarged sufficiently even when the conversion optical system is added thereto, and thus the taking optical system is so wide-angle oriented that it is difficult to correct curvature of field. In contrast, if the value of Condition (2) is equal to or greater than its upper limit, the conversion magnification is so high that it is difficult to correct aberrations, in particular barrel-shaped distortion and curvature of field.

In the embodiments 1 to 5, it is preferable that the taking optical system fulfill Condition (3) below.

$$0.7 < (Yb/Ys)/\beta c < 1.3 \qquad (3)$$

wherein
$Ys$ represents the maximum image height of the first frame-format.

Condition (3) defines the relationship between the ratio of the second frame-format to the first frame-format and the conversion magnification, and thus defines the condition to be fulfilled to obtain roughly equal angles of view without and with the conversion optical system. If the value of Condition (3) is out of the range defined above, the difference between the angles of view without and with the conversion optical system is unduly great, increasing the burden on the main optical system, which is used in both the configurations for the first and second frame-formats, in terms of handling of different angles of view. This inconveniently leads to an increase in the total length of the entire taking optical system, to an increase in the diameter of the front-end lens unit, and to an increase in the number of lens elements needed to compensate for aggravated aberrations. Specifically, if the value of Condition (3) is equal to or less than its lower limit, the focal length range with the conversion optical system is shifted excessively toward the telephoto side, and thus the entire lens system needs to have an unduly long total length; in addition, unduly large spherical aberration appears. In contrast, if the value of Condition (3) is equal to or greater than its upper limit, the focal length range with the conversion optical system is shifted excessively toward the wide-angle side, and thus the front-end lens unit needs to have an unduly large diameter; in addition, unduly large curvature of field and distortion appear.

In the embodiments 1 to 5, it is preferable that the taking optical system, when configured for the first frame-format, fulfill Condition (4) below.

$$1.0 < |f2|/fws < 1.8 \qquad (4)$$

wherein
$f2$ represents the focal length of the second lens unit; and
$fws$ represents the focal length of the entire taking optical system, when configured for the first frame-format, as observed at the wide-angle end.

If the value of Condition (4) is equal to or less than its lower limit, the focal length of the second lens unit is too short, i.e. the optical power thereof is too strong, and thus, irrespective of whether the taking optical system is configured for the first frame-format or for the second frame-format with the conversion optical system added thereto, it is difficult to correct the negative distortion occurring at the wide-angle end, and in addition curvature of field exhibits an unduly strong inclination toward the under side. In contrast, if the value of Condition (4) is equal to or greater than its upper limit, the second lens unit needs to be moved through so long a distance for zooming that the front-end lens unit needs to have an unduly large diameter.

Note that, although the embodiments described above deal only with cases where frame-format conversion is achieved in a taking optical system by adding a conversion optical system thereto with the configuration of the main optical system left untouched, it is also possible, for example, to modify part of the configuration of the main optical system without changing its principal characteristics, and then add a conversion optical system thereto. Example of methods that allow the principal characteristics of the main optical system to be left untouched include so-called bending, whereby the radius of curvature of the single lens element constituting the main optical system is changed without changing its optical power, and addition of an aspherical surface or a diffractive optical surface. Also categorized into methods that allow the principal characteristics of the main optical system to be left untouched is addition thereto of a spherical lens, cemented lens, aspherical lens, diffractive optical lens, or the like having, in any case, a weak power for the purpose of improving image plane characteristics.

Modifying part of the configuration of the main optical system as described above is effective in improving optical performance particularly in the configuration for the larger frame-format. Because the configuration for the larger frame-format is used with an image sensing device having a larger number of pixels, and is accordingly required to offer higher optical performance than that for the smaller frame-format. Moreover, although the embodiments described above deal only with cases where the main optical system and the conversion optical system are both composed solely of refractive surfaces, it is also possible to adopt, depending on the requirements imposed by the image taking apparatus into which the taking optical system is incorporated, an arrangement having a mirror disposed in the optical path so as to turn the optical path, or an arrangement including a diffractive optical element.

Moreover, although the embodiments described above provide only examples of taking optical systems for use with image sensing devices having different frame-formats, the techniques underlying them are applicable also to taking optical systems designed for use with both an image sensing device having a smaller frame-format and a silver-halide film having a larger frame-format, or to taking optical systems designed for use with both conventional 35 mm silver-halide film and new-generation silver-halide film (i.e. APS film used in the Advanced Photo System).

Embodiments 6 to 8

FIGS. 21 and 22, FIGS. 23 and 24, and FIGS. 25 and 26 show the lens arrangement of the taking optical systems of a sixth to an eighth embodiment, respectively, of the invention. Note that, in each diagram, arrows schematically indicate the movement of the lens units, which will be described later, during zooming from the wide-angle end to the telephoto end. Arrows with a broken line indicate that the lens unit is kept in a fixed position during zooming. Moreover, each diagram shows the lens arrangement of the taking optical system during zooming, as observed at the wide-angle end.

Figure 21:
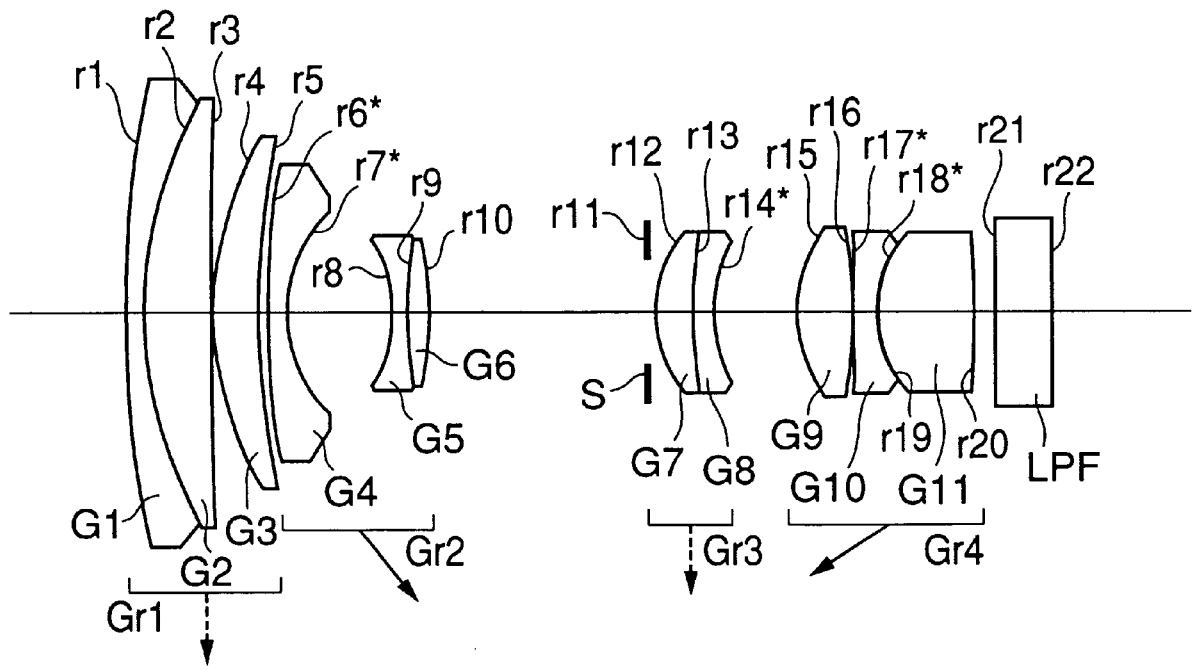
FIG. 21 is a lens arrangement diagram of the taking optical system (when set for the first frame-format) of a sixth embodiment (Example 6) of the present invention.

The taking optical system of the sixth embodiment, when configured for a first frame-format (a smaller frame-format, of which the height Y in a direction perpendicular to the optical axis=3.1 mm), has the construction as shown in FIG. 21. In this figure, the left-hand side is the object side and the right-hand side is the image side. This lens system is built as a four-unit zoom lens system of a positive-negative-positive-positive configuration composed of, from the object side, a first lens unit Gr1, a second lens unit Gr2, a third lens unit Gr3, and a fourth lens unit Gr4, of which Gr1 and Gr3 are stationary and Gr2 and Gr4 are movable. Here, the first lens unit Gr1 is referred to as the "first object-side lens unit". Gr1 consists of three lens elements G1, G2, and G3; Gr2 consists of three lens elements G4, G5, and G6; Gr3 consists of two lens elements G7 and G8 and an aperture stop S; and Gr4 consists of three lens elements G9, G10, and G11. In addition, a low-pass filter LPF shaped like a flat plate is disposed at the image-side end of the taking optical system.

Figure 22:
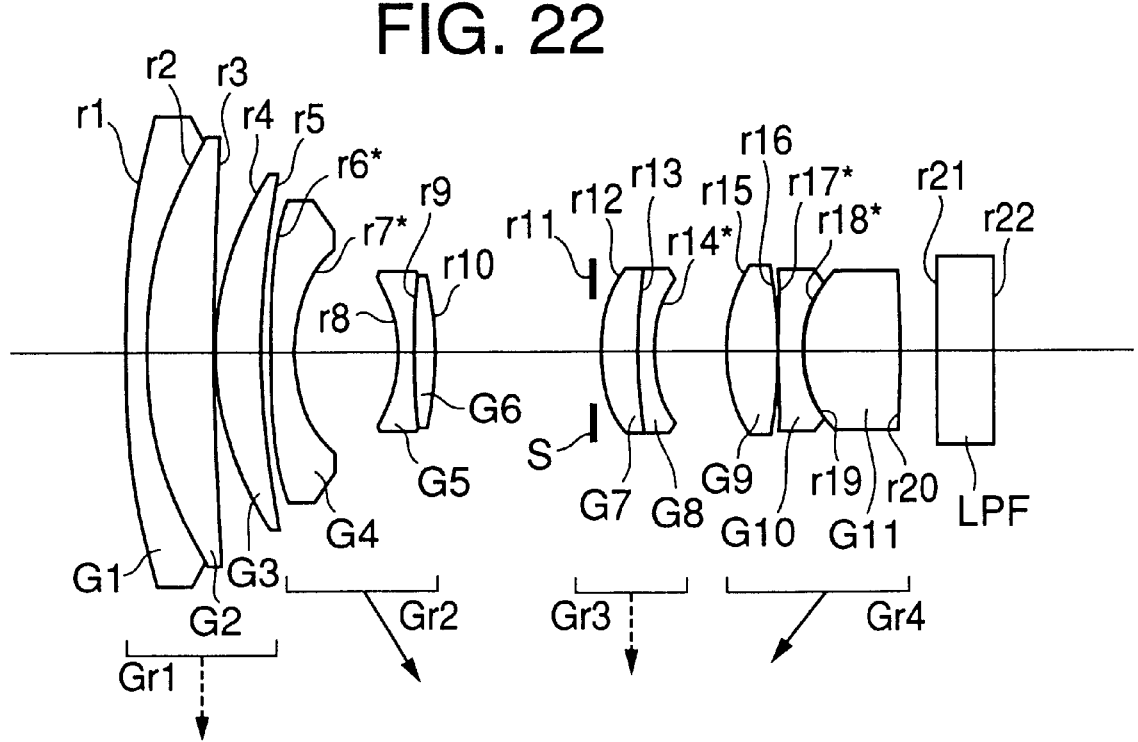
FIG. 22 is a lens arrangement diagram of the taking optical system (when set for the second frame-format) of the sixth embodiment.

On the other hand, the taking optical system of the sixth embodiment, when configured for a second frame-format (a larger frame-format, of which the height Y in a direction perpendicular to the optical axis=4.0 mm), has a construction as shown in FIG. 22, and is thus constructed basically in the same manner as in FIG. 21 except that, in the former, the first lens unit is replaced with another one in the zoom range between the middle-focal-length position and the telephoto end described later. Here, the first lens units is referred to as the "second object-side lens unit". The other lens units placed behind the first lens unit in FIGS. 21 and 22 have the same construction and are moved in the same way during zooming.

Figure 23:
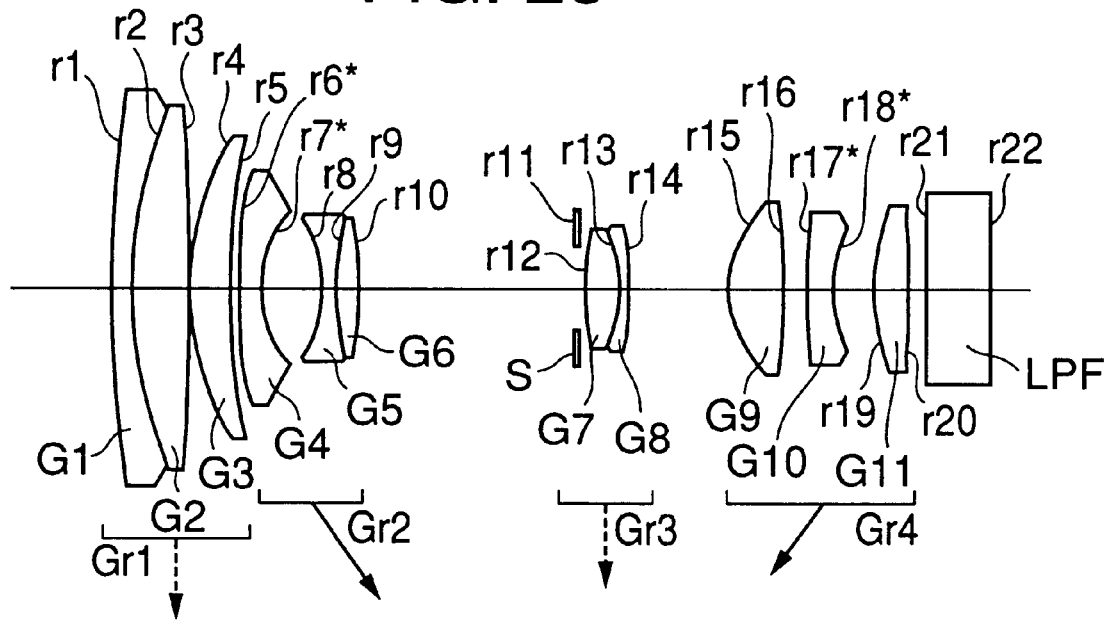
FIG. 23 is a lens arrangement diagram of the taking optical system (when set for the first frame-format) of a seventh embodiment (Example 7) of the present invention.

The taking optical system of the seventh embodiment, when configured for a first frame-format (a smaller frame-format, of which the height Y in a direction perpendicular to the optical axis=3.1 mm), has the construction as shown in FIG. 23. In this figure, the left-hand side is the object side and the right-hand side is the image side. This lens system is built as a four-unit zoom lens system of a positive-negative-positive-positive configuration composed of, from the object side, a first lens unit Gr1, a second lens unit Gr2, a third lens unit Gr3, and a fourth lens unit Gr4, of which Gr1 and Gr3 are stationary and Gr2 and Gr4 are movable. Here, the first lens unit Gr1 is referred to as the "first object-side lens unit". Gr1 consists of three lens elements G1, G2, and G3; Gr2 consists of three lens elements G4, G5, and G6; Gr3 consists of two lens elements G7 and G8 and an aperture stop S; and Gr4 consists of three lens elements G9, G10, and G11. In addition, a low-pass filter LPF shaped like a flat plate is disposed at the image-side end of the taking optical system.

Figure 24:
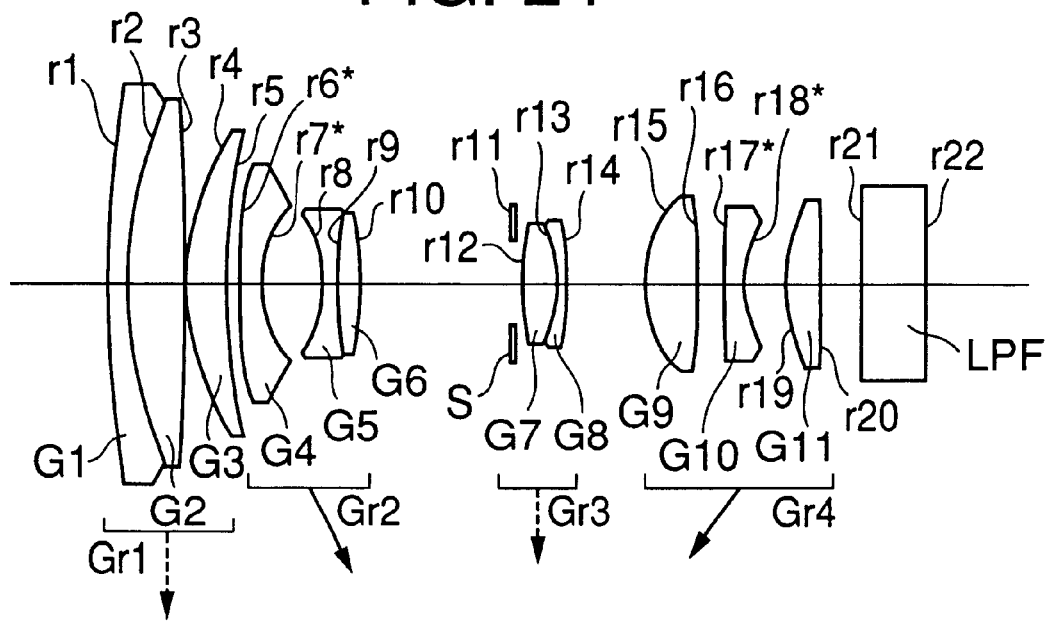
FIG. 24 is a lens arrangement diagram of the taking optical system (when set for the second frame-format) of the seventh embodiment.

On the other hand, the taking optical system of the seventh embodiment, when configured for a second frame-format (a larger frame-format, of which the height Y in a direction perpendicular to the optical axis=4.0 mm), has a construction as shown in FIG. 24, and is thus constructed basically in the same manner as in FIG. 23 except that, in the former, the first lens unit is replaced with another one in the zoom range between the middle-focal-length position and the telephoto end described later. Here, the first lens unit is referred to as the "second object-side lens unit". The other lens units placed behind the first lens unit in FIGS. 23 and 24 have the same construction and are moved in the same way during zooming.

Figure 25:
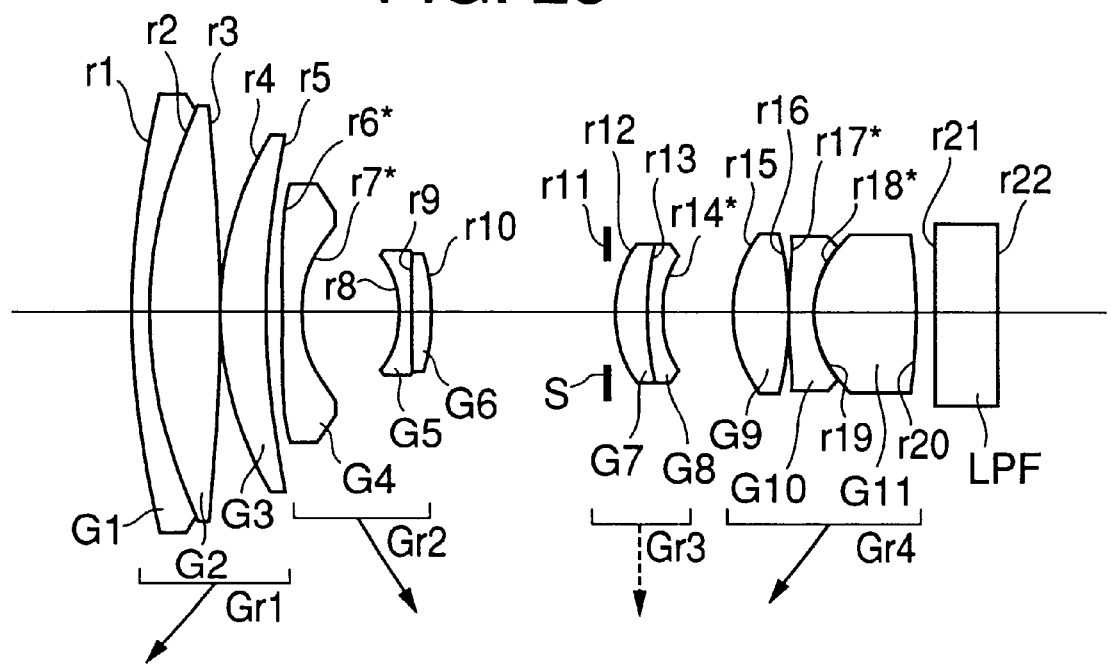
FIG. 25 is a lens arrangement diagram of the taking optical system (when set for the first frame-format) of an eighth embodiment (Example 8) of the present invention.

The taking optical system of the eighth embodiment, when configured for a first frame-format (a smaller frame-format, of which the height Y in a direction perpendicular to the optical axis=3.1 mm), has the construction as shown in FIG. 25. In this figure, the left-hand side is the object side and the right-hand side is the image side. This lens system is built as a four-unit zoom lens system of a positive-negative-positive-positive configuration composed of, from the object side, a first lens unit Gr1, a second lens unit Gr2, a third lens unit Gr3, and a fourth lens unit Gr4, of which Gr3 is stationary and Gr1, Gr2, and Gr4 are movable. Here, the first lens unit Gr1 is referred to as the "first object-side lens unit". Gr1 consists of three lens elements G1, G2, and G3; Gr2 consists of three lens elements G4, G5, and G6; Gr3 consists of two lens elements G7 and G8 and an aperture stop S; and Gr4 consists of three lens elements G9, G10, and G11. In addition, a low-pass filter LPF shaped like a flat plate is disposed at the image-side end of the taking optical system.

Figure 26:
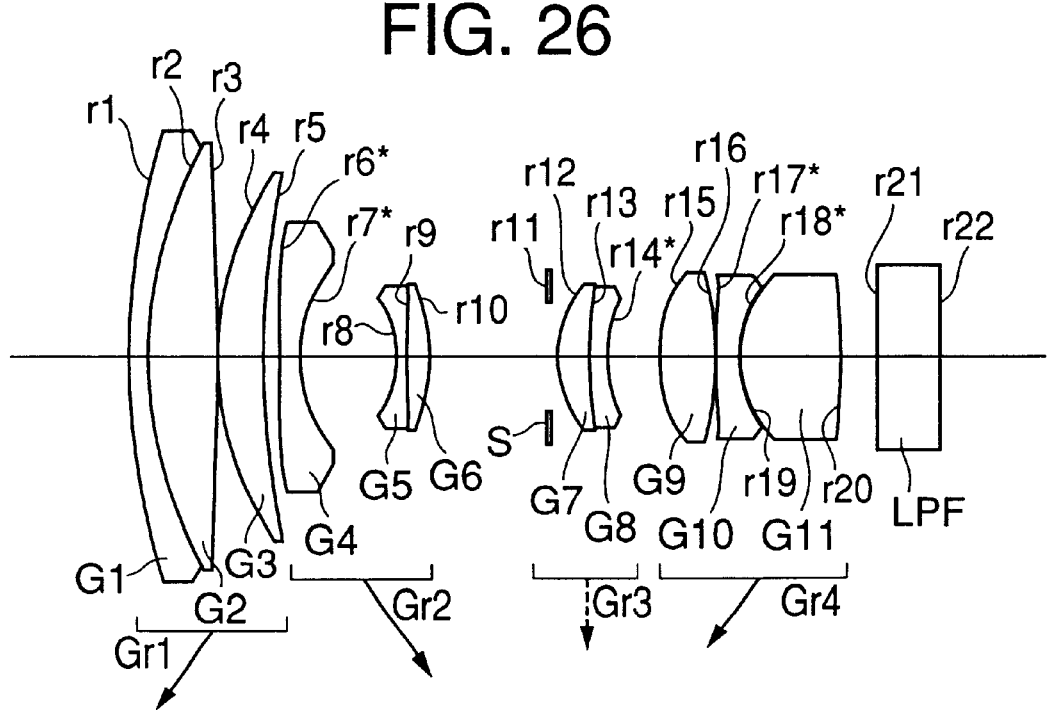
FIG. 26 is a lens arrangement diagram of the taking optical system (when set for the second frame-format) of the eighth embodiment.
Figure 27A:
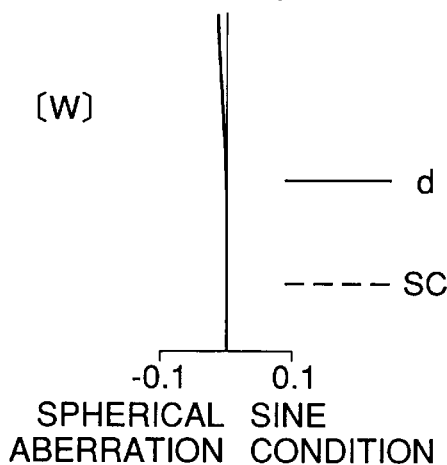
FIGS. 27A to 27I are graphic representations of the aberrations observed in the infinite-distance shooting condition in Example 6 (when set for the first frame-format)
Figure 27B:
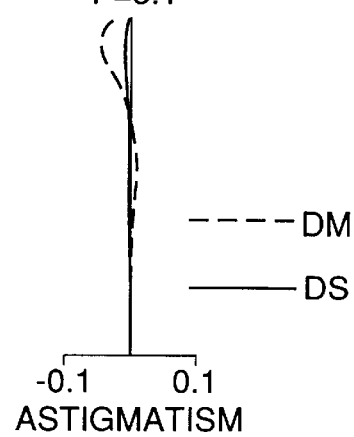
Figure 27C:
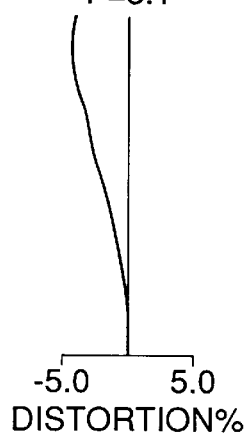
Figure 27D:
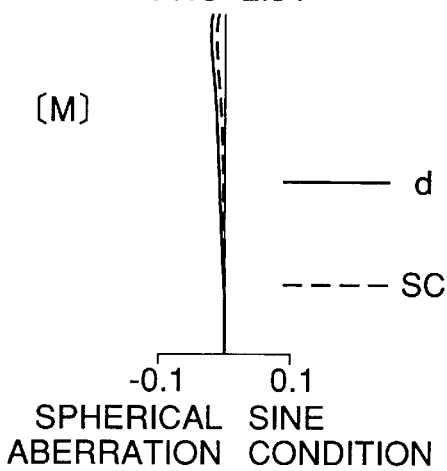
Figure 27E:
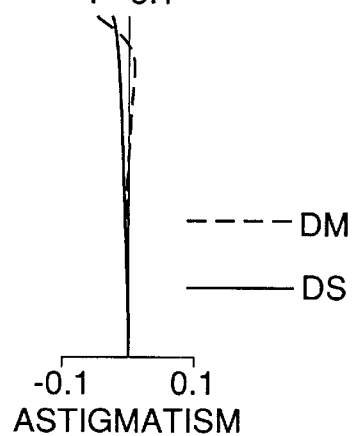
Figure 27F:
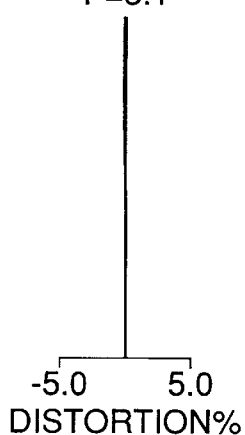
Figure 27G:
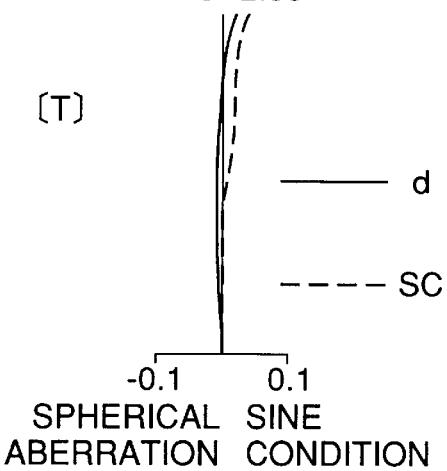
Figure 27H:
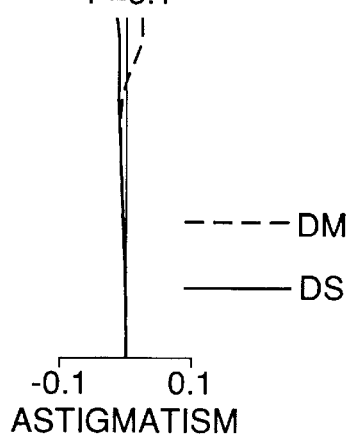
Figure 27I:
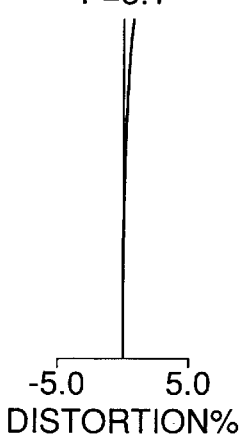

On the other hand, the taking optical system of the eighth embodiment, when configured for a second frame-format (a larger frame-format, of which the height Y in a direction perpendicular to the optical axis=4.0 mm), has a construction as shown in FIG. 26, and is thus constructed basically in the same manner as in FIG. 25 except that, in the former, the first lens unit is replaced with another one in the zoom range between the middle-focal-length position and the telephoto end described later. Here, the first lens unit is referred to as the "second object-side lens unit". The other lens units placed behind the first lens unit in FIGS. 25 and 26 have the same construction and are moved in the same way during zooming In any of these embodiments, other things being equal, the taking optical system is larger when configured for the second frame-format than when configured for the first frame-format. Therefore, exchanging the first lens unit yields no advantage, because, as explained earlier in the description of the prior art, the size of the entire taking optical system is determined by its size when configured for the larger frame-format.

Incidentally, in zoom-type taking optical systems, like those of the embodiments of the present invention, during zooming from the wide-angle end to the telephoto end, the lens units are moved in such a way that the distance between the first and second lens units increases and that the distance between the second lens unit and the lens units placed behind it, including the aperture stop, decreases. In general, the diameter of such a zoom-type taking optical system as a whole depends on the diameter of the front-end lens unit thereof. Here, by adopting an arrangement that can be adapted to the second frame-format by exchanging the first lens unit in the zoom range between the middle-focal-length position and the telephoto end of the configuration for the first frame-format, it is possible to reduce the increased distance between the first and second lens units and thereby place the first lens unit closer to the second lens unit, and as a result, now that the distance between the second lens unit and the lens units placed behind it, including the aperture stop, is reduced, it is possible to position the entrance pupil closer. This helps achieve a considerable reduction in the diameter of the front-end lens unit.

What is important here is that, in order for the second lens unit to offer the same zoom solution irrespective of whether the first lens unit is exchanged or not, the second lens unit needs to offer substantially the same magnification. That is, in either case, the image point position of the first lens unit (the second object-side lens unit) with respect to the second lens unit as observed in the zoom range between the wide-angle end and the telephoto end when the taking optical system is configured for the second frame-format needs to coincide with the image point position of the first lens unit (the first object-side lens unit) with respect to the second lens unit as observed in the zoom range between the middle-focal-length position and the telephoto end when configured for the first frame-format.

As described above, by adopting an arrangement that can be adapted to the second frame-format by exchanging the first lens unit in the zoom range between the middle-focal-length position and the telephoto end of the configuration for the first frame-format, it is possible to realize a taking optical system that can cope with both the first frame-format and the second frame-format without sacrificing its size when configured for the first frame-format. Moreover, this permits the zoom solution of the lens units disposed behind the first lens unit to remain invariable, and thus contributes greatly to the standardization of the structures of lens barrels.

The conditions which are preferably fulfilled by the taking optical systems will be described below. In the embodiments 6 to 8 described above, it is preferable that the taking optical system fulfill Condition (5) below.

$$0.65 < f1b/f1s < 0.95 \qquad (5)$$

wherein f1s represents the focal length of the first object-side lens unit; and f1b represents the focal length of the second object-side lens unit.

Condition (5) defines the ratio of the focal length of the second object-side lens unit to that of the first object-side lens unit, and thus defines the condition to be fulfilled to achieve proper aberration correction and to set the above-described image point of the first lens unit in an appropriate position. If the value of Condition (5) is equal to or less than its lower limit, the focal length of the second object-side lens unit is too short relative to that of the first object-side lens unit, and thus it is difficult to obtain satisfactory peripheral imaging performance at the wide-angle end, and it is difficult to secure a sufficient distance between the first and second lens units at the wide-angle end to set the image point of the first lens unit in an appropriate position. In contrast, if the value of Condition (5) is equal to or greater than its upper limit, the focal length of the second object-side lens unit is too long relative to that of the first object-side lens unit, and thus the distance between the first and second lens units is unduly long at the wide-angle end. This inconveniently leads to an increase in the total length of the entire taking optical system and to an increase in the diameter of the front-end lens unit.

In the embodiments 6 to 8, it is preferable that the taking optical system fulfill Condition (6) below.

$$0.45 < Zb/Zs < 0.85 \qquad (6)$$

wherein

Zb represents the zoom ratio of the taking optical system, when configured for the second frame-format; and Zs represents the zoom ratio of the taking optical system, when configured for the first frame-format.

If the value of Condition (6) is equal to or less than its lower limit, the zoom ratio of the taking optical system, when configured for the second frame-format, is too low, and thus it is impossible to gain an appreciable advantage by exchanging the first lens unit. In contrast, if the value of Condition (6) is equal to or greater than its upper limit, the zoom ratio of the taking optical system, when configured for the second frame-format, is too high, and thus, as described previously, the taking optical system is unduly large relative to the first frame-format.

In the embodiments 6 to 8, it is preferable that the taking optical system, when configured for the first frame-format, fulfill Condition (7) below.

$$0.85 < |f2|/fws < 1.55 \qquad (7)$$

wherein f2 represents the focal length of the second lens unit; and fws represents the focal length of the entire taking optical system, when configured for the first frame-format, as observed at the wide-angle end.

If the value of Condition (7) is equal to or less than its lower limit, the focal length of the second lens unit is too short, i.e. the optical power thereof is too strong, and thus, irrespective of whether the taking optical system is configured for the first frame-format or for the second frame-format with the first lens unit exchanged, it is difficult to correct the negative distortion occurring at the wide-angle end, and in addition curvature of field exhibits an unduly strong inclination toward the under side. In contrast, if the value of Condition (7) is equal to or greater than its upper limit, the second lens unit needs to be moved through so long a distance for zooming that the front-end lens unit needs to have an unduly large diameter.

In the embodiments 6 to 8, it is preferable that the taking optical system fulfill Condition (8) below.

$$0.5 < Ys/Yb < 0.95 \qquad (8)$$

wherein

Ys represents the maximum image height of the first frame-format; and

Yb represents the maximum image height of the second frame-format.

Condition (8) defines the conversion magnification of the frame-format. If the value of Condition (8) is equal to or less than its lower limit, the ratio between the two frame-formats is so high that the total length of the taking optical system is unduly long. In contrast, if the value of Condition (8) is equal to or greater than its upper limit, the ratio between the frame-formats is so low that exchanging the first lens unit yields no appreciable advantage.

Note that, although the embodiments described above deal only with cases where frame-format conversion is achieved in a taking optical system by exchanging the first lens unit thereof with the configuration of the lens units placed behind it left untouched, it is also possible, for example, to modify part of the configuration of the lens units placed behind the first lens unit without changing their principal characteristics, and then exchange the first lens unit. Example of methods that allow the principal characteristics of the lens units placed behind the first lens unit to be left untouched include so-called bending, whereby the radii of curvature of the single lens elements constituting the lens units placed behind the first lens unit are changed without changing their optical powers, and addition of an aspherical surface or a diffractive optical surface. Also categorized into methods that allow the principal characteristics of the lens units placed behind the first lens unit to be left untouched is addition thereto of a spherical lens, cemented lens, aspherical lens, diffractive optical lens, or the like having, in any case, a weak power for the purpose of improving image plane characteristics.

Modifying part of the configuration of the lens units placed behind the first lens unit as described above is effective in improving optical performance particularly in the configuration for the larger frame-format. Because the configuration for the larger frame-format is used with an image sensing device having a larger number of pixels, and is accordingly required to offer higher optical performance than that for the smaller frame-format. Moreover, although the embodiments described above deal only with cases where the taking optical system is composed solely of refractive surfaces, it is also possible to adopt, depending on the requirements imposed by the image taking apparatus into which the taking optical system is incorporated, an arrangement having a mirror disposed in the optical path so as to turn the optical path, or an arrangement including a diffractive optical element.

Moreover, although the embodiments described above provide only examples of taking optical systems for use with image sensing devices having different frame-formats, the techniques underlying them are applicable also to taking optical systems designed for use with both an image sensing device having a smaller frame-format and a silver-halide film having a larger frame-format, or to taking optical systems designed for use with both conventional 35 mm silver-halide film and new-generation silver-halide film (i.e. APS film used in the Advanced Photo System).

EXAMPLES

Hereinafter, examples of taking optical systems embodying the present invention will be presented with reference to their construction data, graphic representations of aberrations, and other data. Examples 1 to 8 presented below correspond to the first to eighth embodiments, respectively, described above. Tables 1, 3, 5, 7, 9, 12, 14, and 16 list the construction data of Examples 1 to 8, respectively, when configured for the first frame-format, thus corresponding to the lens arrangements shown in FIGS. 1, 3, 5, 7, 9, 21, 23, and 25, respectively. Tables 2, 4, 6, 8, 10, 13, 15, and 17 list the construction data of Examples 1 to 8, respectively, when configured for the second frame-format, thus corresponding to the lens arrangements shown in FIGS. 2, 4, 6, 8, 10, 22, 24, and 26, respectively.

In the construction data of these Examples, ri (i=1, 2, 3, . . . ) represents the ith surface counted from the object side and its radius of curvature, di (i=1, 2, 3, . . . ) represents the ith axial distance counted from the object side, and Ni (i=1, 2, 3, . . . ) and vi (i=1, 2, 3, . . . ) respectively represent the refractive index for the d line and the Abbe number of the ith lens element counted from the object side.

In the construction data of Examples 1 to 5, for each of the focal length f of the entire taking optical system, the F number FNO of the entire taking optical system, the distance between the first and second lens units, the distance between the second and third lens units, the distance between the third and fourth lens units, and the distance between the last lens unit of the main optical system and the low-pass filter (or the conversion optical system), three values are given which are observed at, from left, the wide-angle end (W), the middle-focal-length position (M), and the telephoto end (T).

In the construction data of Examples 6 to 8, for each of the focal length f of the entire taking optical system, the F number FNO of the entire taking optical system, the distance between the first and second lens units, the distance between the second and third lens units, the distance between the third and fourth lens units, and the distance between the last lens unit of the taking optical system and the low-pass filter, three values are given which are observed at, from left, the wide-angle end (W), the middle-focal-length position (M), and the telephoto end (T).

Note that, in all of Examples, a surface whose radius of curvature is marked with an asterisk (*) is an aspherical surface, whose surface shape is defined by the following formulae:

$$X = X_0 + \Sigma A_i Y^i \quad (a)$$

$$X_0 = CY^2 / \{1 + (1 - \epsilon C^2 Y^2)^{1/2}\} \quad (b)$$

wherein

X represents the displacement from the reference surface along the optical axis;

Y represents the height in a direction perpendicular to the optical axis;

C represents the paraxial curvature;

$\epsilon$ represents the quadric surface parameter; and $A_i$ represents the aspherical coefficient of the ith order.

FIGS. 11A to 11I, 13A to 13I, 15A to 15I, 17A to 17I, 19A to 19I, 27A to 27I, 29A to 29I, and 31A to 31I are graphic representations of the aberrations observed in the taking optical systems of Examples 1 to 8, respectively, when configured for the first frame-format; and FIGS. 12A to 12I, 14A to 14I, 16A to 16I, 18A to 18I, 20A to 20I, 28A to 28I, 30A to 30I, and 32A to 32I are graphic representations of the aberrations observed in the taking optical systems of Examples 1 to 8, respectively, when configured for the second frame-format. Of these diagrams, FIGS. 11A to 11C, 12A to 12C, 13A to 13C, 14A to 14C, 15A to 15C, 16A to 16C, 17A to 17C, 18A to 18C, 19A to 19C, 20A to 20C, 27A to 27C, 28A to 28C, 29A to 29C, 30A to 30C, 31A to 31C, and 32A to 32C show the aberrations observed at the wide-angle end [W]; FIGS. 11D to 11F, 12D to 12F, 13D to 13F, 14D to 14F, 15D to 15F, 16D to 16F, 17D to 17F, 18D, to 18F, 19D to 19F, 20A to 20F, 27D to 27F, 28D to 28F, 29D to 29F, 30D to 30F, 31D to 31F, and 32D to 32F show the aberrations observed at the middle focal length [M]; FIGS. 11G to 11I, 12G to 12I, 13G to 13I, 14G to 14I, 15G to 15I, 16G to 16I, 17G to 17I, 18G to 18I, 19G to 19I, 20G to 20I, 27G to 27I, 28G to 28I, 29G to 29I, 30G to 30I, 31G to 31I, and 32G to 32I show the aberrations observed at the telephoto end [T]. In the spherical aberration diagrams, the solid line (d) represents the spherical aberration observed for the d line and the broken line (SC) represents the sine condition. In the astigmatism diagrams, the solid line (DS) represents the astigmatism observed on the sagittal plane and the broken line (DM) represents the astigmatism observed on the meridional plane.

Examples 1 to 5, when configured for the first or second frame-format, fulfill corresponding one or ones of Conditions (1) to (4) described previously.

Examples 6 to 8, when configured for the first or second frame-format, fulfill corresponding one or ones of Conditions (5) to (8) described previously.

TABLE 1

Construction Data of Example 1 (for the first frame-format)

f = 5.1 mm~12.0 mm~29.4 mm
(Focal Length of the Entire Optical System)
FNO = 2.28~2.51~2.88 (F-Numbers)

| Radius of Curvature | Axial Distance | Refractive Index (Nd) | Abbe Number (νd) |
|---|---|---|---|
| r1 = 39.361 | | | |
| | d1 = 0.800 | N1 = 1.83350 | ν1 = 21.00 |
| r2 = 25.444 | | | |
| | d2 = 3.932 | N2 = 1.48749 | ν2 = 70.44 |
| r3 = −92.731 | | | |
| | d3 = 0.100 | | |
| r4 = 18.735 | | | |
| | d4 = 1.976 | N3 = 1.65364 | ν3 = 55.78 |
| r5 = 35.205 | | | |
| | d5 = 0.500~8.755~14.831 | | |
| r6* = 49.390 | | | |
| | d6 = 0.750 | N4 = 1.77250 | ν4 = 49.77 |
| r7* = 7.170 | | | |
| | d7 = 4.459 | | |
| r8 = −9.753 | | | |
| | d8 = 0.700 | N5 = 1.48749 | ν5 = 70.44 |
| r9 = 12.601 | | | |
| | d9 = 1.268 | N6 = 1.83350 | ν6 = 21.00 |
| r10 = 57.770 | | | |
| | d10 = 14.831~6.576~0.500 | | |
| r11 = ∞ (Aperture Stop) | | | |
| | d11 = 0.500 | | |
| r12 = 15.739 | | | |
| | d12 = 1.546 | N7 = 1.75450 | ν7 = 51.57 |
| r13 = −113.832 | | | |
| | d13 = 1.000 | N8 = 1.84666 | ν8 = 23.82 |
| r14* = 41.438 | | | |
| | d14 = 4.732~2.453~0.200 | | |
| r15 = 6.813 | | | |
| | d15 = 3.315 | N9 = 1.63237 | ν9 = 48.67 |
| r16 = −34.984 | | | |
| | d16 = 1.181 | | |
| r17* = −49.645 | | | |
| | d17 = 1.000 | N10 = 1.84666 | ν10 = 23.82 |
| r18* = 9.148 | | | |
| | d18 = 1.869 | | |
| r19 = 11.635 | | | |
| | d19 = 2.378 | N11 = 1.54012 | ν11 = 63.99 |
| r20 = −15.552 | | | |
| | d20 = 1.359~3.641~5.877 | | |
| r21 = ∞ | | | |
| | d21 = 3.400 | N12 = 1.51680 | ν12 = 64.20 |
| r22 = ∞ | | | |

Aspherical Coefficients of 6th Surface (r6)

ε = 0.10000 × 10
A4 = 0.26307 × 10$^{-4}$
A6 = 0.24482 × 10$^{-5}$
A8 = −0.30163 × 10$^{-7}$

Aspherical Coefficients of 7th Surface (r7)

ε = 0.10000 × 10
A4 = −0.92198 × 10$^{-5}$
A6 = 0.24720 × 10$^{-5}$
A8 = 0.22450 × 10$^{-6}$

Aspherical Coefficients of 14th Surface (r14)

ε = 0.10000 × 10
A4 = 0.30309 × 10$^{-4}$
A6 = 0.27800 × 10$^{-5}$
A8 = −0.29431 × 10$^{-6}$
A10 = 0.11555 × 10$^{-7}$

Aspherical Coefficients of 17th Surface (r17)

ε = 0.10000 × 10
A4 = −0.47983 × 10$^{-3}$
A6 = 0.34008 × 10$^{-5}$
A8 = −0.15789 × 10$^{-6}$

TABLE 1-continued

Construction Data of Example 1 (for the first frame-format)

Aspherical Coefficients of 18th Surface (r18)

ε = 0.10000 × 10
A4 = 0.49212 × 10$^{-3}$
A6 = 0.16988 × 10$^{-4}$
A8 = 0.50803 × 10$^{-6}$

TABLE 2

Construction Data of Example 1 (for the second frame-format)

f = 6.6 mm~15.5 mm~38.1 mm
(Focal Length of the Entire Optical System)
FNO = 2.93~3.24~3.72 (F-Numbers)

| Radius of Curvature | Axial Distance | Refractive Index (Nd) | Abbe Number (νd) |
|---|---|---|---|
| r1 = 39.361 | | | |
| | d1 = 0.800 | N1 = 1.83350 | ν1 = 21.00 |
| r2 = 25.444 | | | |
| | d2 = 3.932 | N2 = 1.48749 | ν2 = 70.44 |
| r3 = −92.731 | | | |
| | d3 = 0.100 | | |
| r4 = 18.735 | | | |
| | d4 = 1.976 | N3 = 1.65364 | ν3 = 55.78 |
| r5 = 35.205 | | | |
| | d5 = 0.500~8.755~14.831 | | |
| r6* = 49.390 | | | |
| | d6 = 0.750 | N4 = 1.77250 | ν4 = 49.77 |
| r7* = 7.170 | | | |
| | d7 = 4.459 | | |
| r8 = −9.753 | | | |
| | d8 = 0.700 | N5 = 1.48749 | ν5 = 70.44 |
| r9 = 12.601 | | | |
| | d9 = 1.268 | N6 = 1.83350 | ν6 = 21.00 |
| r10 = 57.770 | | | |
| | d10 = 14.831~6.576~0.500 | | |
| r11 = ∞ (Aperture Stop) | | | |
| | d11 = 0.500 | | |
| r12 = 15.739 | | | |
| | d12 = 1.546 | N7 = 1.75450 | ν7 = 51.57 |
| r13 = −113.832 | | | |
| | d13 = 1.000 | N8 = 1.84666 | ν8 = 23.82 |
| r14* = 41.438 | | | |
| | d14 = 4.732~2.453~0.200 | | |
| r15 = 6.813 | | | |
| | d15 = 3.315 | N9 = 1.63237 | ν9 = 48.67 |
| r16 = −34.984 | | | |
| | d16 = 1.181 | | |
| r17* = −49.645 | | | |
| | d17 = 1.000 | N10 = 1.84666 | ν10 = 23.82 |
| r18* = 9.148 | | | |
| | d18 = 1.869 | | |
| r19 = 11.635 | | | |
| | d19 = 2.378 | N11 = 1.54012 | ν11 = 63.99 |
| r20 = −15.552 | | | |
| | d20 = 0.400~2.679~4.932 | | |
| r21 = 71.678 | | | |
| | d21 = 0.800 | N12 = 1.75450 | ν12 = 51.57 |
| r22 = 6.056 | | | |
| | d22 = 0.121 | | |
| r23 = 6.248 | | | |
| | d23 = 2.244 | N13 = 1.57058 | ν13 = 39.32 |
| r24 = 33.647 | | | |
| | d24 = 1.000 | | |
| r25 = ∞ | | | |
| | d25 = 3.400 | N14 = 1.51680 | ν14 = 64.20 |
| r26 = ∞ | | | |

Aspherical Coefficients of 6th Surface (r6)

ε = 0.10000 × 10
A4 = 0.26307 × 10$^{-4}$

TABLE 2-continued

Construction Data of Example 1 (for the second frame-format)

A6 = 0.24482 × 10$^{-5}$
A8 = −0.30163 × 10$^{-7}$
Aspherical Coefficients of 7th Surface (r7)

$\epsilon$ = 0.10000 × 10
A4 = −0.92198 × 10$^{-5}$
A6 = 0.24720 × 10$^{-5}$
A8 = 0.22450 × 10$^{-6}$
Aspherical Coefficients of 14th Surface (r14)

$\epsilon$ = 0.10000 × 10
A4 = 0.30309 × 10$^{-4}$
A6 = 0.27800 × 10$^{-5}$
A8 = −0.29431 × 10$^{-6}$
A10 = 0.11555 × 10$^{-7}$
Aspherical Coefficients of 17th Surface (r17)

$\epsilon$ = 0.10000 × 10
A4 = −0.47983 × 10$^{-3}$
A6 = 0.34008 × 10$^{-5}$
A8 = −0.15789 × 10$^{-6}$
Aspherical Coefficients of 18th Surface (r18)

$\epsilon$ = 0.10000 × 10
A4 = 0.49212 × 10$^{-3}$
A6 = 0.16988 × 10$^{-4}$
A8 = 0.50803 × 10$^{-6}$

TABLE 3

Construction Data of Example 2 (for the first frame-format)

f = 5.1 mm~12.0 mm~29.4 mm
(Focal length of the Entire Optical System)
FNO = 2.28~2.51~2.88 (F-Numbers)

| | Radius of Curvature | Axial Distance | Refractive Index (Nd) | Abbe Number (νd) |
|---|---|---|---|---|
| r1 = | 44.384 | | | |
| | | d1 = 0.800 | N1 = 1.83350 | ν1 = 21.00 |
| r2 = | 26.902 | | | |
| | | d2 = 3.548 | N2 = 1.48749 | ν2 = 70.44 |
| r3 = | −87.224 | | | |
| | | d3 = 0.100 | | |
| r4 = | 18.690 | | | |
| | | d4 = 1.903 | N3 = 1.71785 | |
| r5 = | 34.111 | | | |
| | | d5 = 0.500~8.898~15.092 | | |
| r6* = | 53.697 | | | |
| | | d6 = 0.750 | N4 = 1.77250 | ν3 = 49.77 |
| r7* = | 7.151 | | | |
| | | d7 = 4.412 | | |
| r8 = | −9.136 | | | |
| | | d8 = 0.700 | N5 = 1.48749 | |
| r9 = | 14.748 | | | |
| | | d9 = 1.249 | N6 = 1.83350 | ν4 = 21.00 |
| r10 = | 166.857 | | | |
| | | d10 = 15.092~6.694~0.500 | | |
| r11 = | ∞ (Aperture Stop) | | | |
| | | d11 = 0.500 | | |
| r12 = | 16.402 | | | |
| | | d12 = 1.569 | N7 = 1.75450 | |
| r13 = | −73.572 | | | |
| | | d13 = 1.000 | N8 = 1.84666 | ν5 = 23.82 |
| r14* = | 47.167 | | | |
| | | d14 = 4.771~2.465~0.200 | | |
| r15 = | 6.930 | | | |
| | | d15 = 3.195 | N9 = 1.64598 | |
| r16 = | −49.092 | | | |
| | | d16 = 1.247 | | |
| r17* = | −259.880 | | | |
| | | d17 = 1.000 | N10 = 1.84666 | ν6 = 23.82 |
| r18* = | 8.606 | | | |
| | | d18 = 2.029 | | |

TABLE 3-continued

Construction Data of Example 2 (for the first frame-format)

| | | | | |
|---|---|---|---|---|
| r19 = | 10.973 | | | |
| | | d19 = 2.385 | N11 = 1.48757 | |
| r20 = | −15.859 | | | |
| | | d20 = 1.336~3.642~5.907 | | |
| r21 = | ∞ | | | |
| | | d21 = 3.400 | N12 = 1.51680 | ν7 = 64.20 |
| r22 = | ∞ | | | |

Aspherical Coefficients of 6th Surface (r6)

$\epsilon$ = 0.10000 × 10
A4 = 0.50768 × 10$^{-4}$
A6 = 0.27040 × 10$^{-5}$
A8 = −0.32896 × 10$^{-7}$
Aspherical Coefficients of 7th Surface (r7)

$\epsilon$ = 0.10000 × 10
A4 = −0.26886 × 10$^{-5}$
A6 = 0.24656 × 10$^{-5}$
A8 = 0.28044 × 10$^{-6}$
Aspherical Coefficients of 14th Surface (r14)

$\epsilon$ = 0.10000 × 10
A4 = 0.29944 × 10$^{-4}$
A6 = 0.23942 × 10$^{-5}$
A8 = −0.26510 × 10$^{-6}$
A10 = 0.10143 × 10$^{-7}$
Aspherical Coefficients of 17th Surface (r17)

$\epsilon$ = 0.10000 × 10
A4 = −0.43785 × 10$^{-3}$
A6 = −0.85525 × 10$^{-6}$
A8 = −0.55200 × 10$^{-7}$
Aspherical Coefficients of 18th Surface (r18)

$\epsilon$ = 0.10000 × 10
A4 = 0.49210 × 10$^{-3}$
A6 = 0.12730 × 10$^{-4}$
A8 = 0.66578 × 10$^{-6}$

TABLE 4

Construction Data of Example 2 (for the second frame-format)

f = 6.6 mm~15.5 mm~38.1 mm
(Focal length of the Entire Optical System)
FNO = 2.9~3.22~3.72 (F-Numbers)

| | Radius of Curvature | Axial Distance | Refractive Index (Nd) | Abbe Number (νd) |
|---|---|---|---|---|
| r1 = | 44.384 | | | |
| | | d1 = 0.800 | N1 = 1.83350 | ν1 = 21.00 |
| r2 = | 26.902 | | | |
| | | d2 = 3.548 | N2 = 1.48749 | |
| r3 = | −87.224 | | | |
| | | d3 = 0.100 | | |
| r4 = | 18.690 | | | |
| | | d4 = 1.903 | N3 = 1.71785 | |
| r5 = | 34.111 | | | |
| | | d5 = 0.500~8.898~15.092 | | |
| r6* = | 53.697 | | | |
| | | d6 = 0.750 | N4 = 1.77250 | ν2 = 49.77 |
| r7* = | 7.151 | | | |
| | | d7 = 4.412 | | |
| r8 = | −9.136 | | | |
| | | d8 = 0.700 | N5 = 1.48749 | |
| r9 = | 14.748 | | | |
| | | d9 = 1.249 | N6 = 1.83350 | ν3 = 21.00 |
| r10 = | 166.857 | | | |
| | | d10 = 15.092~6.694~0.500 | | |
| r11 = | ∞ (Aperture Stop) | | | |
| | | d11 = 0.500 | | |
| r12 = | 16.402 | | | |
| | | d12 = 1.569 | N7 = 1.75450 | |

TABLE 4-continued

Construction Data of Example 2 (for the second frame-format)

| | | | | |
|---|---|---|---|---|
| r13 = | −73.572 | | | |
| | | d13 = 1.000 | N8 = 1.84666 | ν4 = 23.82 |
| r14* = | 47.167 | | | |
| | | d14 = 4.771~2.465~0.200 | | |
| r15 = | 6.930 | | | |
| | | d15 = 3.195 | N9 = 1.64598 | |
| r16 = | −49.092 | | | |
| | | d16 = 1.247 | | |
| r17* = | −259.880 | | | |
| | | d17 = 1.000 | N10 = 1.84666 | ν5 = 23.82 |
| r18* = | 8.606 | | | |
| | | d18 = 2.029 | | |
| r19 = | 10.973 | | | |
| | | d19 = 2.385 | N11 = 1.48757 | |
| r20 = | −15.859 | | | |
| | | d20 = 0.100~2.405~4.671 | | |
| r21 = | 49.436 | | | |
| | | d21 = 0.600 | N12 = 1.75450 | |
| r22 = | 5.976 | | | |
| | | d22 = 0.102 | | |
| r23 = | 6.145 | | | |
| | | d23 = 1.807 | N13 = 1.57277 | |
| r24 = | 28.181 | | | |
| | | d24 = 1.000 | | |
| r25 = | ∞ | | | |
| | | d25 = 3.400 | N14 = 1.51680 | ν6 = 64.20 |
| r26 = | ∞ | | | |

Aspherical Coefficients of 6th Surface (r6)

$\epsilon$ = 0.10000 × 10
A4 = 0.50768 × 10$^{-4}$
A6 = 0.27040 × 10$^{-5}$
A8 = −0.32896 × 10$^{-7}$ Aspherical Coefficients of 7th Surface (r7)

$\epsilon$ = 0.10000 × 10
A4 = −0.26886 × 10$^{-5}$
A6 = 0.24656 × 10$^{-5}$
A8 = 0.28044 × 10$^{-6}$ Aspherical Coefficients of 14th Surface (r14)

$\epsilon$ = 0.10000 × 10
A4 = 0.29944 × 10$^{-4}$
A6 = 0.23942 × 10$^{-5}$
A8 = −0.26510 × 10$^{-6}$
A10 = 0.10143 × 10$^{-7}$ Aspherical Coefficients of 17th Surface (r17)

$\epsilon$ = 0.10000 × 10
A4 = −0.43785 × 10$^{-3}$
A6 = −0.85525 × 10$^{-6}$
A8 = −0.55200 × 10$^{-7}$ Aspherical Coefficients of 18th Surface (r18)

$\epsilon$ = 0.10000 × 10
A4 = 0.49210 × 10$^{-3}$
A6 = 0.12730 × 10$^{-4}$
A8 = 0.66578 × 10$^{-6}$

TABLE 5

Construction Data of Example 3 (for the first frame-format)

f = 5.1 mm~12.0 mm~29.4 mm
(Focal length of the Entire Optical System)
FNO = 2.28~2.51~2.88 (F-Numbers)

| | Radius of Curvature | Axial Distance | Refractive Index (Nd) | Abbe Number (νd) |
|---|---|---|---|---|
| r1 = | 38.100 | | | |
| | | d1 = 0.800 | N1 = 1.83350 | ν1 = 21.00 |
| r2 = | 25.197 | | | |
| | | d2 = 4.072 | N2 = 1.48749 | ν2 = 70.44 |

TABLE 5-continued

Construction Data of Example 3 (for the first frame-format)

| | | | | |
|---|---|---|---|---|
| r3 = | −98.604 | | | |
| | | d3 = 0.100 | | |
| r4 = | 19.021 | | | |
| | | d4 = 2.041 | N3 = 1.63412 | ν3 = 56.85 |
| r5 = | 36.020 | | | |
| | | d5 = 0.500~8.861~14.981 | | |
| r6* = | 49.675 | | | |
| | | d6 = 0.750 | N4 = 1.77250 | ν4 = 49.77 |
| r7* = | 7.233 | | | |
| | | d7 = 4.595 | | |
| r8 = | −9.793 | | | |
| | | d8 = 0.700 | N5 = 1.48749 | ν5 = 70.44 |
| r9 = | 12.800 | | | |
| | | d9 = 1.273 | N6 = 1.83350 | ν6 = 21.00 |
| r10 = | 60.435 | | | |
| | | d10 = 14.981~6.620~0.500 | | |
| r11 = | ∞ (Aperture Stop) | | | |
| | | d11 = 0.500 | | |
| r12 = | 15.868 | | | |
| | | d12 = 1.517 | N7 = 1.75450 | ν7 = 51.57 |
| r13 = | −296.209 | | | |
| | | d13 = 1.000 | N8 = 1.84666 | ν8 = 23.82 |
| r14* = | 35.961 | | | |
| | | d14 = 4.773~2.488~0.200 | | |
| r15 = | 6.619 | | | |
| | | d15 = 3.473 | N9 = 1.56380 | ν9 = 47.92 |
| r16 = | −24.792 | | | |
| | | d16 = 1.309 | | |
| r17* = | −23.223 | | | |
| | | d17 = 1.000 | N10 = 1.84666 | ν10 = 23.82 |
| r18* = | 11.411 | | | |
| | | d18 = 1.585 | | |
| r19 = | 12.595 | | | |
| | | d19 = 2.498 | N11 = 1.58242 | ν11 = 60.28 |
| r20 = | −13.465 | | | |
| | | d20 = 1.343~3.628~5.916 | | |
| r21 = | ∞ | | | |
| | | d21 = 3.400 | N12 = 1.51680 | ν12 = 64.20 |
| r22 = | ∞ | | | |

Aspherical Coefficients of 6th Surface (r6)

$\epsilon$ = 0.10000 × 10
A4 = 0.29472 × 10$^{-4}$
A6 = 0.19378 × 10$^{-5}$
A8 = −0.23877 × 10$^{-7}$ Aspherical Coefficients of 7th Surface (r7)

$\epsilon$ = 0.10000 × 10
A4 = −0.60653 × 10$^{-5}$
A6 = 0.20752 × 10$^{-5}$
A8 = 0.17680 × 10$^{-6}$ Aspherical Coefficients of 14th Surface (r14)

$\epsilon$ = 0.10000 × 10
A4 = 0.32613 × 10$^{-4}$
A6 = 0.21765 × 10$^{-5}$
A8 = −0.22337 × 10$^{-6}$
A10 = 0.89525 × 10$^{-8}$ Aspherical Coefficients of 17th Surface (r17)

$\epsilon$ = 0.10000 × 10
A4 = −0.50533 × 10$^{-3}$
A6 = 0.65302 × 10$^{-5}$
A8 = −0.26699 × 10$^{-6}$ Aspherical Coefficients of 18th Surface (r18)

$\epsilon$ = 0.10000 × 10
A4 = 0.46260 × 10$^{-3}$
A6 = 0.18637 × 10$^{-4}$
A8 = 0.25741 × 10$^{-6}$

TABLE 6

Construction Data of Example 3 (for the second frame-format)

f = 7.3 mm~17.2 mm~42.0 mm
(Focal length of the Entire Optical System)
FNO = 3.26~3.58~4.12 (F-Numbers)

| | Radius of Curvature | Axial Distance | Refractive Index (Nd) | Abbe Number (vd) |
|---|---|---|---|---|
| r1 = | 38.100 | | | |
| | | d1 = 0.800 | N1 = 1.83350 | v1 = 21.00 |
| r2 = | 25.197 | | | |
| | | d2 = 4.072 | N2 = 1.48749 | v2 = 70.44 |
| r3 = | −98.604 | | | |
| | | d3 = 0.100 | | |
| r4 = | 19.021 | | | |
| | | d4 = 2.041 | N3 = 1.63412 | v3 = 56.85 |
| r5 = | 36.020 | | | |
| | | d5 = 0.500~8.861~14.981 | | |
| r6* = | 49.673 | | | |
| | | d6 = 0.750 | N4 = 1.77250 | v4 = 49.77 |
| r7* = | 7.233 | | | |
| | | d7 = 4.595 | | |
| r8 = | −9.793 | | | |
| | | d8 = 0.700 | N5 = 1.48749 | v5 = 70.44 |
| r9 = | 12.800 | | | |
| | | d9 = 1.273 | N6 = 1.83350 | v6 = 21.00 |
| r10 = | 60.435 | | | |
| | | d10 = 14.981~6.620~0.500 | | |
| r11 = | ∞ (Aperture Stop) | | | |
| | | d11 = 0.500 | | |
| r12 = | 15.868 | | | |
| | | d12 = 1.517 | N7 = 1.75450 | v7 = 51.57 |
| r13 = | −296.209 | | | |
| | | d13 = 0.010 | | |
| r14 = | −296.203 | | | |
| | | d14 = 1.000 | N8 = 1.84666 | v8 = 23.82 |
| r15* = | 35.961 | | | |
| | | d15 = 4.773~2.488~0.200 | | |
| r16 = | 6.619 | | | |
| | | d16 = 3.473 | N9 = 1.56380 | v9 = 47.92 |
| r17 = | −24.792 | | | |
| | | d17 = 1.309 | | |
| r18* = | −23.223 | | | |
| | | d18 = 1.000 | N10 = 1.84666 | v10 = 23.82 |
| r19* = | 11.411 | | | |
| | | d19 = 1.585 | | |
| r20 = | 12.595 | | | |
| | | d20 = 2.498 | N11 = 1.58242 | v11 = 60.28 |
| r21 = | −13.465 | | | |
| | | d21 = 0.400~2.685~4.973 | | |
| r22 = | 41.840 | | | |
| | | d22 = 0.800 | N12 = 1.75450 | v12 = 51.57 |
| r23 = | 5.885 | | | |
| | | d23 = 0.245 | | |
| r24 = | 6.199 | | | |
| | | d24 = 2.016 | N13 = 1.59891 | v13 = 35.03 |
| r25 = | 16.340 | | | |
| | | d25 = 1.000 | | |
| r26 = | ∞ | | | |
| | | d26 = 3.400 | N14 = 1.51680 | v14 = 64.20 |
| r27 = | ∞ | | | |

Aspherical Coefficients of 6th Surface (r6)

$\epsilon$ = 0.10000 × 10
A4 = 0.29472 × $10^{-4}$
A6 = 0.19378 × $10^{-5}$
A8 = −0.23877 × $10^{-7}$ Aspherical Coefficients of 7th Surface (r7)

$\epsilon$ = 0.10000 × 10
A4 = −0.60653 × $10^{-5}$
A6 = 0.20752 × $10^{-5}$
A8 = 0.17680 × $10^{-6}$ Aspherical Coefficients of 15th Surface (r15)

$\epsilon$ = 0.10000 × 10
A4 = 0.32613 × $10^{-4}$

TABLE 6-continued

Construction Data of Example 3 (for the second frame-format)

A6 = 0.21765 × $10^{-5}$
A8 = −0.22337 × $10^{-6}$
A10 = 0.89525 × $10^{-8}$

Aspherical Coefficients of 18th Surface (r18)

$\epsilon$ = 0.10000 × 10
A4 = −0.50533 × $10^{-3}$
A6 = 0.65302 × $10^{-5}$
A8 = −0.26699 × $10^{-6}$ Aspherical Coefficients of 19th Surface (r19)

$\epsilon$ = 0.10000 × 10
A4 = 0.46260 × $10^{-3}$
A6 = 0.18637 × $10^{-4}$
A8 = 0.25741 × $10^{-6}$

TABLE 7

Construction Data of Example 4 (for the first frame-format)

f = 5.1 mm~12.0 mm~29.4 mm
(Focal length of the Entire Optical System)
FNO = 2.3~2.53~2.88 (F-Numbers)

| | Radius of Curvature | Axial Distance | Refractive Index (Nd) | Abbe Number (vd) |
|---|---|---|---|---|
| r1 = | 51.292 | | | |
| | | d1 = 0.800 | N1 = 1.83350 | v1 = 21.00 |
| r2 = | 28.707 | | | |
| | | d2 = 3.874 | N2 = 1.49411 | v2 = 69.48 |
| r3 = | −88.318 | | | |
| | | d3 = 0.100 | | |
| r4 = | 19.533 | | | |
| | | d4 = 2.187 | N3 = 1.74573 | v3 = 51.87 |
| r5 = | 38.766 | | | |
| | | d5 = 0.500~8.903~15.126 | | |
| r6* = | 76.536 | | | |
| | | d6 = 0.750 | N4 = 1.77250 | v4 = 49.77 |
| r7* = | 7.248 | | | |
| | | d7 = 4.289 | | |
| r8 = | −9.577 | | | |
| | | d8 = 0.700 | N5 = 1.48749 | v5 = 70.44 |
| r9 = | 14.103 | | | |
| | | d9 = 1.327 | N6 = 1.83350 | v6 = 21.00 |
| r10 = | 119.341 | | | |
| | | d10 = 15.126~6.723~0.500 | | |
| r11 = | ∞ (Aperture Stop) | | | |
| | | d11 = 0.500 | | |
| r12 = | 14.886 | | | |
| | | d12 = 1.645 | N7 = 1.76163 | v7 = 50.36 |
| r13 = | −54.790 | | | |
| | | d13 = 1.000 | N8 = 1.84666 | v8 = 23.82 |
| r14* = | 47.323 | | | |
| | | d14 = 4.717~2.400~0.200 | | |
| r15 = | 7.049 | | | |
| | | d15 = 3.069 | N9 = 1.65030 | v9 = 49.41 |
| r16 = | −87.401 | | | |
| | | d16 = 1.297 | | |
| r17* = | 107.653 | | | |
| | | d17 = 1.000 | N10 = 1.84666 | v10 = 23.82 |
| r18* = | 7.817 | | | |
| | | d18 = 1.736 | | |
| r19 = | 10.410 | | | |
| | | d19 = 2.338 | N11 = 1.48749 | v11 = 70.44 |
| r20 = | −16.932 | | | |
| | | d20 = 1.351~3.667~5.867 | | |
| r21 = | ∞ | | | |
| | | d21 = 3.400 | N12 = 1.51680 | v12 = 64.20 |
| r22 = | ∞ | | | |

Aspherical Coefficients of 6th Surface (r6)

$\epsilon$ = 0.10000 × 10
A4 = 0.15037 × $10^{-3}$

TABLE 7-continued

Construction Data of Example 4 (for the first frame-format)

$A6 = -0.41303 \times 10^{-6}$
$A8 = -0.67332 \times 10^{-8}$

Aspherical Coefficients of 7th Surface (r7)

$\epsilon = 0.10000 \times 10$
$A4 = 0.11096 \times 10^{-3}$
$A6 = 0.25794 \times 10^{-5}$
$A8 = 0.16455 \times 10^{-6}$ Aspherical Coefficients of 14th Surface (r14)

$\epsilon = 0.10000 \times 10$
$A4 = 0.30579 \times 10^{-4}$
$A6 = 0.34943 \times 10^{-5}$
$A8 = -0.41149 \times 10^{-6}$
$A10 = 0.16505 \times 10^{-7}$ Aspherical Coefficients of 17th Surface (r17)

$\epsilon = 0.10000 \times 10$
$A4 = -0.46605 \times 10^{-3}$
$A6 = 0.42583 \times 10^{-6}$
$A8 = -0.17528 \times 10^{-8}$ Aspherical Coefficients of 18th Surface (r18)

$\epsilon = 0.10000 \times 10$
$A4 = 0.39333 \times 10^{-3}$
$A6 = 0.12845 \times 10^{-4}$
$A8 = 0.65431 \times 10^{-6}$

TABLE 8

Construction Data of Example 4 (for the second frame-format)

f = 6.0 mm~14.1 mm~34.6 mm
(Focal length of the Entire Optical System)
FNO = 2.73~3.0~3.4 (F-Numbers)

| | Radius of Curvature | Axial Distance | Refractive Index (Nd) | Abbe Number (νd) |
|---|---|---|---|---|
| r1 = | 51.292 | | | |
| | | d1 = 0.800 | N1 = 1.83350 | ν1 = 21.00 |
| r2 = | 28.707 | | | |
| | | d2 = 3.874 | N2 = 1.49411 | ν2 = 69.48 |
| r3 = | −88.318 | | | |
| | | d3 = 0.100 | | |
| r4 = | 19.533 | | | |
| | | d4 = 2.187 | N3 = 1.74575 | ν3 = 51.87 |
| r5 = | 38.766 | | | |
| | | d5 = 0.500~8.903~15.126 | | |
| r6* = | 76.536 | | | |
| | | d6 = 0.750 | N4 = 1.77250 | ν4 = 49.77 |
| r7* = | 7.248 | | | |
| | | d7 = 4.289 | | |
| r8 = | −9.577 | | | |
| | | d8 = 0.700 | N5 = 1.48749 | ν5 = 70.44 |
| r9 = | 14.103 | | | |
| | | d9 = 1.327 | N6 = 1.83350 | ν6 = 21.00 |
| r10 = | 119.341 | | | |
| | | d10 = 15.126~6.723~0.500 | | |
| r11 = | ∞ (Aperture Stop) | | | |
| | | d11 = 0.500 | | |
| r12 = | 14.886 | | | |
| | | d12 = 1.645 | N7 = 1.76163 | ν7 = 50.36 |
| r13 = | −54.790 | | | |
| | | d13 = 1.000 | N8 = 1.84666 | ν8 = 23.82 |
| r14* = | 47.323 | | | |
| | | d14 = 4.717~2.400~0.200 | | |
| r15 = | 7.049 | | | |
| | | d15 = 3.069 | N9 = 1.65030 | ν9 = 49.41 |
| r16 = | −87.401 | | | |
| | | d16 = 1.297 | | |
| r17* = | 107.653 | | | |
| | | d17 = 1.000 | N10 = 1.84666 | ν10 = 23.82 |
| r18* = | 7.817 | | | |
| | | d18 = 1.736 | | |

TABLE 8-continued

Construction Data of Example 4 (for the second frame-format)

| | | | | |
|---|---|---|---|---|
| r19 = | 10.410 | | | |
| | | d19 = 2.338 | N11 = 1.48749 | ν11 = 70.44 |
| r20 = | −16.932 | | | |
| | | d20 = 0.400~2.717~4.917 | | |
| r21 = | 117.244 | | | |
| | | d21 = 0.800 | N12 = 1.75450 | ν12 = 51.57 |
| r22 = | 6.400 | | | |
| | | d22 = 0.100 | | |
| r23 = | 6.592 | | | |
| | | d23 = 2.286 | N13 = 1.64387 | ν13 = 44.47 |
| r24 = | 45.168 | | | |
| | | d24 = 1.000 | | |
| r25 = | ∞ | | | |
| | | d25 = 3.400 | N14 = 1.51680 | ν14 = 64.20 |
| r26 = | ∞ | | | |

Aspherical Coefficients of 6th Surface (r6)

$\epsilon = 0.10000 \times 10$
$A4 = 0.15037 \times 10^{-3}$
$A6 = -0.41303 \times 10^{-6}$
$A8 = -0.67332 \times 10^{-8}$ Aspherical Coefficients of 7th Surface (r7)

$\epsilon = 0.10000 \times 10$
$A4 = 0.11096 \times 10^{-3}$
$A6 = 0.25794 \times 10^{-5}$
$A8 = 0.16455 \times 10^{-6}$ Aspherical Coefficients of 14th Surface (r14)

$\epsilon = 0.10000 \times 10$
$A4 = 0.30579 \times 10^{-4}$
$A6 = 0.34943 \times 10^{-5}$
$A8 = -0.41149 \times 10^{-6}$
$A10 = 0.16505 \times 10^{-7}$ Aspherical Coefficients of 17th Surface (r17)

$\epsilon = 0.10000 \times 10$
$A4 = -0.46605 \times 10^{-3}$
$A6 = 0.42583 \times 10^{-6}$
$A8 = -0.17528 \times 10^{-8}$ Aspherical Coefficients of 18th Surface (r18)

$\epsilon = 0.10000 \times 10$
$A4 = 0.39333 \times 10^{-3}$
$A6 = 0.12845 \times 10^{-4}$
$A8 = 0.65431 \times 10^{-6}$

TABLE 9

Construction Data of Example 5 (for the first frame-format)

f = 3.8 mm~9.0 mm~21.7 mm
(Focal length of the Entire Optical System)
FNO = 2.34~2.52~2.88 (F-Numbers)

| | Radius of Curvature | Axial Distance | Refractive Index (Nd) | Abbe Number (νd) |
|---|---|---|---|---|
| r1 = | 33.893 | | | |
| | | d1 = 0.800 | N1 = 1.83350 | ν1 = 21.00 |
| r2 = | 20.854 | | | |
| | | d2 = 2.933 | N2 = 1.48749 | ν2 = 70.44 |
| r3 = | 3458.532 | | | |
| | | d3 = 0.100 | | |
| r4 = | 18.532 | | | |
| | | d4 = 2.028 | N3 = 1.75409 | ν3 = 51.58 |
| r5 = | 52.594 | | | |
| | | d5 = 0.500~7.990~13.134 | | |
| r6* = | 54.228 | | | |
| | | d6 = 0.750 | N4 = 1.77250 | ν4 = 49.77 |
| r7* = | 5.734 | | | |
| | | d7 = 3.716 | | |
| r8 = | −9.442 | | | |
| | | d8 = 0.700 | N5 = 1.51435 | ν5 = 54.87 |

TABLE 9-continued

Construction Data of Example 5 (for the first frame-format)

| | | | | |
|---|---|---|---|---|
| r9 = | 10.231 | | | |
| | | d9 = 1.262 | N6 = 1.83350 | ν6 = 21.00 |
| r10 = | 82.356 | | | |
| | | d10 = 13.134~5.644~0.500 | | |
| r11 = | ∞ (Aperture Stop) | | | |
| | | d11 = 0.500 | | |
| r12 = | 12.294 | | | |
| | | d12 = 1.696 | N7 = 1.70084 | ν7 = 26.54 |
| r13 = | −12.693 | | | |
| | | d13 = 1.000 | N8 = 1.84666 | ν8 = 23.82 |
| r14* = | 22.033 | | | |
| | | d14 = 3.925~2.101~0.200 | | |
| r15 = | 6.741 | | | |
| | | d15 = 5.913 | N9 = 1.50423 | ν9 = 59.67 |
| r16 = | −9.980 | | | |
| | | d16 = 1.116 | | |
| r17* = | −6.796 | | | |
| | | d17 = 1.000 | N10 = 1.84666 | ν10 = 23.82 |
| r18* = | −127.113 | | | |
| | | d18 = 0.100 | | |
| r19 = | 12.962 | | | |
| | | d19 = 3.236 | N11 = 1.61322 | ν11 = 48.97 |
| r20 = | −7.908 | | | |
| | | d20 = 1.731~3.554~5.455 | | |
| r21 = | ∞ | | | |
| | | d21 = 3.400 | N12 = 1.51680 | ν12 = 64.20 |
| r22 = | ∞ | | | |

Aspherical Coefficients of 6th Surface (r6)

$\epsilon$ = 0.10000 × 10
A4 = 0.17992 × 10$^{-3}$
A6 = 0.21097 × 10$^{-5}$
A8 = −0.60366 × 10$^{-7}$ Aspherical Coefficients of 7th Surface (r7)

$\epsilon$ = 0.10000 × 10
A4 = 0.10422 × 10$^{-3}$
A6 = 0.71873 × 10$^{-5}$
A8 = 0.67492 × 10$^{-6}$ Aspherical Coefficients of 14th Surface (r14)

$\epsilon$ = 0.10000 × 10
A4 = 0.20982 × 10$^{-4}$
A6 = 0.10888 × 10$^{-4}$
A8 = −0.19610 × 10$^{-5}$
A10 = 0.12639 × 10$^{-6}$ Aspherical Coefficients of 17th Surface (r17)

$\epsilon$ = 0.10000 × 10
A4 = −0.82030 × 10$^{-3}$
A6 = 0.27014 × 10$^{-4}$
A8 = −0.40805 × 10$^{-6}$ Aspherical Coefficients of 18th Surface (r18)

$\epsilon$ = 0.10000 × 10
A4 = 0.26263 × 10$^{-3}$
A6 = 0.42079 × 10$^{-4}$
A8 = −0.49132 × 10$^{-5}$

TABLE 10

Construction Data of Example 5 (for the second frame-format)

f = 6.6 mm~15.7 mm~37.8 mm
(Focal length of the Entire Optical System)
FNO = 4.11~4.43~5.0 (F-Numbers)

| | Radius of Curvature | Axial Distance | Refractive Index (Nd) | Abbe Number (νd) |
|---|---|---|---|---|
| r1 = | 33.893 | | | |
| | | d1 = 0.800 | N1 = 1.83350 | ν1 = 21.00 |
| r2 = | 20.854 | | | |
| | | d2 = 2.933 | N2 = 1.48749 | ν2 = 70.44 |

TABLE 10-continued

Construction Data of Example 5 (for the second frame-format)

| | | | | |
|---|---|---|---|---|
| r3 = | 3458.532 | | | |
| | | d3 = 0.100 | | |
| r4 = | 18.532 | | | |
| | | d4 = 2.028 | N3 = 1.75409 | ν3 = 51.58 |
| r5 = | 52.594 | | | |
| | | d5 = 0.500~7.990~13.134 | | |
| r6* = | 54.228 | | | |
| | | d6 = 0.750 | N4 = 1.77250 | ν4 = 49.77 |
| r7* = | 5.734 | | | |
| | | d7 = 3.716 | | |
| r8 = | −9.442 | | | |
| | | d8 = 0.700 | N5 = 1.51435 | ν5 = 54.87 |
| r9 = | 10.231 | | | |
| | | d9 = 1.262 | N6 = 1.83350 | ν6 = 21.00 |
| r10 = | 82.356 | | | |
| | | d10 = 13.134~5.644~0.500 | | |
| r11 = | ∞ (Aperture Stop) | | | |
| | | d11 = 0.500 | | |
| r12 = | 12.294 | | | |
| | | d12 = 1.696 | N7 = 1.70084 | ν7 = 26.54 |
| r13 = | −12.693 | | | |
| | | d13 = 1.000 | N8 = 1.84666 | ν8 = 23.82 |
| r14* = | 22.033 | | | |
| | | d14 = 3.925~2.101~0.200 | | |
| r15 = | 6.741 | | | |
| | | d15 = 5.913 | N9 = 1.50423 | ν9 = 59.67 |
| r16 = | −9.980 | | | |
| | | d16 = 1.116 | | |
| r17* = | −6.796 | | | |
| | | d17 = 1.000 | N10 = 1.84666 | ν10 = 23.82 |
| r18* = | −127.113 | | | |
| | | d18 = 0.100 | | |
| r19 = | 12.962 | | | |
| | | d19 = 3.236 | N11 = 1.61322 | ν11 = 48.97 |
| r20 = | −7.908 | | | |
| | | d20 = 0.400~2.224~4.125 | | |
| r21 = | 33.371 | | | |
| | | d21 = 0.800 | N12 = 1.75450 | ν12 = 51.57 |
| r22 = | 5.500 | | | |
| | | d22 = 0.660 | | |
| r23 = | 6.120 | | | |
| | | d23 = 1.747 | N13 = 1.71069 | ν13 = 26.02 |
| r24 = | 8.790 | | | |
| | | d24 = 1.000 | | |
| r25 = | ∞ | | | |
| | | d25 = 3.400 | N14 = 1.51680 | ν14 = 64.20 |
| r26 = | ∞ | | | |

Aspherical Coefficients of 6th Surface (r6)

$\epsilon$ = 0.10000 × 10
A4 = 0.17992 × 10$^{-3}$
A6 = 0.21097 × 10$^{-5}$
A8 = −0.60366 × 10$^{-7}$ Aspherical Coefficients of 7th Surface (r7)

$\epsilon$ = 0.10000 × 10
A4 = 0.10422 × 10$^{-3}$
A6 = 0.71873 × 10$^{-5}$
A8 = 0.67492 × 10$^{-6}$ Aspherical Coefficients of 14th Surface (r14)

$\epsilon$ = 0.10000 × 10
A4 = 0.20982 × 10$^{-4}$
A6 = 0.10888 × 10$^{-4}$
A8 = −0.19610 × 10$^{-5}$
A10 = 0.12639 × 10$^{-6}$ Aspherical Coefficients of 17th Surface (r17)

$\epsilon$ = 0.10000 × 10
A4 = −0.82030 × 10$^{-3}$
A6 = 0.27014 × 10$^{-4}$
A8 = −0.40805 × 10$^{-6}$ Aspherical Coefficients of 18th Surface (r18)

$\epsilon$ = 0.10000 × 10
A4 = 0.26263 × 10$^{-3}$

TABLE 10-continued

Construction Data of Example 5 (for the second frame-format)

A6 = 0.42079 × 10⁻⁴
A8 = −0.49132 × 10⁻⁶

TABLE 11

Values Corresponding to Conditions (1) to (4)

|  | \|fc/Yb\| | βc | (Yb/Ys)/βc | \|f2\|/fws |
|---|---|---|---|---|
| Example 1 | 6.42 | 1.29 | 1.00 | 1.37 |
| Example 2 | 6.69 | 1.29 | 1.00 | 1.39 |
| Example 3 | 5.15 | 1.43 | 0.90 | 1.38 |
| Example 4 | 9.17 | 1.18 | 1.09 | 1.38 |
| Example 5 | 3.34 | 1.74 | 1.00 | 1.59 |

TABLE 12

Construction Data of Example 6 (for the first frame-format)
f = 5.1 mm~12.0 mm~29.5 mm (Focal Length of the Entire Optical System)
FN0 = 2.04~2.34~2.88 (F-Numbers)

| Radius of Curvature | Axial Distance | Refractive Index (Nd) | Abbe Number(νd) |
|---|---|---|---|
| r1 = 60.282 | d1 = 1.100 | N1 = 1.83350 | ν1 = 21.00 |
| r2 = 24.393 | d2 = 3.953 | N2 = 1.71402 | ν2 = 53.04 |
| r3 = 906.240 | d3 = 0.100 |  |  |
| r4 = 19.593 | d4 = 2.514 | N3 = 1.82317 | ν3 = 42.49 |
| r5 = 46.718 | d5 = 0.500~7.378~12.321 |  |  |
| r6* = 299.608 | d6 = 1.200 | N4 = 1.77250 | ν4 = 49.77 |
| r7* = 8.414 | d7 = 5.893 |  |  |
| r8 = −7.590 | d8 = 0.857 | N5 = 1.77250 | ν5 = 49.77 |
| r9 = 38.990 | d9 = 1.278 | N6 = 1.83350 | ν6 = 21.00 |
| r10 = −18.635 | d10 = 12.321~5.443~0.500 |  |  |
| r11 = ∞(Aperture Stop) | d11 = 0.500 |  |  |
| r12 = 7.684 | d12 = 2.101 | N7 = 1.84902 | ν7 = 33.39 |
| r13 = 30.947 | d13 = 1.000 | N8 = 1.84666 | ν8 = 23.82 |
| r14* = 8.532 | d14 = 4.868~2.651~0.200 |  |  |
| r15 = 7.957 | d15 = 3.139 | N9 = 1.78283 | ν9 = 47.19 |
| r16 = −25.917 | d16 = 0.100 |  |  |
| r17* = 525.290 | d17 = 1.200 | N10 = 1.84666 | ν10 = 23.82 |
| r18* = 6.887 | d18 = 0.100 |  |  |
| r19 = 6.336 | d19 = 5.568 | N11 = 1.51030 | ν11 = 56.67 |
| r20 = −68.590 | d20 = 1.000~3.217~5.668 |  |  |
| r21 = ∞ | d21 = 3.400 | N12 = 1.51680 | ν12 = 64.20 |
| r22 = ∞ |  |  |  |

Aspherical Coefficients of 6th Surface (r6)

ε = 0.10000 × 10
A4 = 0.21709 × 10⁻³
A6 = −0.18329 × 10⁻⁵
A8 = 0.10898 × 10⁻⁷

Aspherical Coefficients of 7th Surface (r7)

ε = 0.10000 × 10
A4 = 0.10916 × 10⁻³
A6 = 0.29366 × 10⁻⁵
A8 = −0.55087 × 10⁻⁷

Aspherical Coefficients of 14th Surface (r14)

ε = 0.10000 × 10
A4 = 0.30221 × 10⁻³
A6 = 0.94148 × 10⁻⁵
A8 = −0.46090 × 10⁻⁶
A10 = 0.22390 × 10⁻⁷

Aspherical Coefficients of 17th Surface (r17)

ε = 0.10000 × 10
A4 = 0.19557 × 10⁻³
A6 = −0.26628 × 10⁻⁴
A8 = 0.42985 × 10⁻⁶

TABLE 12-continued

Construction Data of Example 6 (for the first frame-format)
f = 5.1 mm~12.0 mm~29.5 mm (Focal Length of the Entire Optical System)
FN0 = 2.04~2.34~2.88 (F-Numbers)

| Radius of Curvature | Axial Distance | Refractive Index (Nd) | Abbe Number(νd) |
|---|---|---|---|

Aspherical Coefficients of 18th Surface (r18)

ε = 0.10000 × 10
A4 = 0.96285 × 10⁻³
A6 = −0.18887 × 10⁻⁴
A8 = 0.84935 × 10⁻⁶

TABLE 13

Construction Data of Example 6 (for the second frame-format)
f = 6.8 mm~16.7 mm~26.1 mm (Focal Length of the Entire Optical System)
FN0 = 2.15~2.62~2.88 (F-Numbers)

| Radius of Curvature | Axial Distance | Refractive Index (Nd) | Abbe Number(νd) |
|---|---|---|---|
| r1 = 50.490 | d1 = 1.100 | N1 = 1.83350 | ν1 = 21.00 |
| r2 = 21.305 | d2 = 3.953 | N2 = 1.71402 | ν2 = 53.04 |
| r3 = 209.898 | d3 = 0.100 |  |  |
| r4 = 17.259 | d4 = 2.514 | N3 = 1.82317 | ν3 = 42.49 |
| r5 = 44.790 | d5 = 0.700~6.527~8.874 |  |  |
| r6* = 299.608 | d6 = 1.200 | N4 = 1.77250 | ν4 = 49.77 |
| r7* = 8.414 | d7 = 5.893 |  |  |
| r8 = −7.590 | d8 = 0.857 | N5 = 1.77250 | ν5 = 49.77 |
| r9 = 38.990 | d9 = 1.278 | N6 = 1.83350 | ν6 = 21.00 |
| r10 = −18.635 | d10 = 8.674~2.847~0.500 |  |  |
| r11 = ∞(Aperture Stop) | d11 = 0.500 |  |  |
| r12 = 7.684 | d12 = 2.101 | N7 = 1.84902 | ν7 = 33.39 |
| r13 = 30.947 | d13 = 1.000 | N8 = 1.84666 | ν8 = 23.82 |
| r14* = 8.532 | d14 = 3.890~1.302~0.200 |  |  |
| r15 = 7.957 | d15 = 3.139 | N9 = 1.78283 | ν9 = 47.19 |
| r16 = −25.917 | d16 = 0.100 |  |  |
| r17* = 525.290 | d17 = 1.200 | N10 = 1.84666 | ν10 = 23.82 |
| r18* = 6.887 | d18 = 0.100 |  |  |
| r19 = 6.336 | d19 = 5.568 | N11 = 1.51030 | ν11 = 56.67 |
| r20 = −68.590 | d20 = 1.978~4.566~5.668 |  |  |
| r21 = ∞ | d21 = 3.400 | N12 = 1.51680 | ν12 = 64.20 |
| r22 = ∞ |  |  |  |

Aspherical Coefficients of 6th Surface (r6)

ε = 0.10000 × 10
A4 = 0.21709 × 10⁻³
A6 = −0.18329 × 10⁻⁵
A8 = 0.10898 × 10⁻⁷

Aspherical Coefficients of 7th Surface (r7)

ε = 0.10000 × 10
A4 = 0.10916 × 10⁻³
A6 = 0.29366 × 10⁻⁵
A8 = −0.55087 × 10⁻⁷

Aspherical Coefficients of 14th Surface (r14)

ε = 0.10000 × 10
A4 = 0.30221 × 10⁻³
A6 = 0.94148 × 10⁻⁵
A8 = −0.46090 × 10⁻⁶
A10 = 0.22390 × 10⁻⁷

Aspherical Coefficients of 17th Surface (r17)

ε = 0.10000 × 10
A4 = 0.19557 × 10⁻³
A6 = −0.26628 × 10⁻⁴
A8 = 0.42985 × 10⁻⁶

Aspherical Coefficients of 18th Surface (r18)

ε = 0.10000 × 10
A4 = 0.96285 × 10⁻³

TABLE 13-continued

Construction Data of Example 6 (for the second frame-format)
f = 6.8 mm~16.7 mm~26.1 mm (Focal Length of the Entire Optical System)
FN0 = 2.15~2.62~2.88 (F-Numbers)

| Radius of Curvature | Axial Distance | Refractive Index (Nd) | Abbe Number(vd) |
|---|---|---|---|

A6 = −0.18887 × 10$^{-4}$
A8 = 0.84935 × 10$^{-6}$

TABLE 14

Construction Data of Example 7 (for the first frame-format)
f = 5.1 mm~12.0 mm~29.5 mm (Focal Length of the Entire Optical System)
FN0 = 2.95~3.33~3.88 (F-Numbers)

| Radius of Curvature | Axial Distance | Refractive Index (Nd) | Abbe Number(vd) |
|---|---|---|---|
| r1 = 71.588 | d1 = 1.100 | N1 = 1.83350 | ν = 21.00 |
| r2 = 25.624 | d2 = 3.040 | N2 = 1.75450 | v2 = 51.57 |
| r3 = −228.108 | d3 = 0.100 | | |
| r4 = 16.398 | d4 = 2.088 | N3 = 1.75450 | v3 = 51.57 |
| r5 = 36.054 | d5 = 0.500~6.767~11.422 | | |
| r6* = 331.726 | d6 = 1.200 | N4 = 1.77250 | v4 = 49.77 |
| r7* = 6.964 | d7 = 3.281 | | |
| r8 = −7.055 | d8 = 0.700 | N5 = 1.77250 | v5 = 49.77 |
| r9 = 17.529 | d9 = 1.305 | N6 = 1.83350 | v6 = 21.00 |
| r10 = −20.010 | d10 = 11.422~5.155~0.500 | | |
| r11 = ∞(Aperture Stop) | d11 = 0.500 | | |
| r12 = 17.211 | d12 = 1.748 | N7 = 1.64939 | v7 = 40.02 |
| r13 = −8.162 | d13 = 0.500 | N8 = 1.84666 | v8 = 23.82 |
| r14 = −26.221 | d14 = 5.358~2.714~0.200 | | |
| r15 = 6.566 | d15 = 2.884 | N9 = 1.59898 | v9 = 59.07 |
| r16 = −51.162 | d16 = 1.371 | | |
| r17* = 56.257 | d17 = 1.200 | N10 = 1.84666 | v10 = 23.82 |
| r18* = 8.477 | d18 = 2.119 | | |
| r19 = 11.481 | d19 = 1.866 | N11 = 1.48749 | v11 = 70.44 |
| r20 = −130.207 | d20 = 1.000~3.644~6.158 | | |
| r21 = ∞ | d21 = 3.400 | N12 = 1.51680 | v12 = 64.20 |
| r22 = ∞ | | | |

Aspherical Coefficients of 6th Surface (r6)

ε = 0.10000 × 10
A4 = 0.53164 × 10$^{-3}$
A6 = −0.48611 × 10$^{-5}$
A8 = 0.38580 × 10$^{-7}$

Aspherical Coefficients of 7th Surface (r7)

ε = 0.10000 × 10
A4 = 0.52331 × 10$^{-3}$
A6 = 0.10727 × 10$^{-4}$
A8 = 0.10211 × 10$^{-5}$

Aspherical Coefficients of 17th Surface (r17)

ε = 0.10000 × 10
A4 = −0.35095 × 10$^{-3}$
A6 = −0.22893 × 10$^{-4}$
A8 = 0.31631 × 10$^{-6}$

Aspherical Coefficients of 18th Surface (r18)

ε = 0.10000 × 10
A4 = 0.81168 × 10$^{-3}$
A6 = −0.66566 × 10$^{-5}$
A8 = 0.17258 × 10$^{-5}$

TABLE 15

Construction Data of Example 7 (for the second frame-format)
f = 6.7 mm~16.5 mm~25.9mm (Focal Length of the Entire Optical System)
FN0 = 3.07~3.60~3.88 (F-Numbers)

| Radius of Curvature | Axial Distance | Refractive Index (Nd) | Abbe Number(vd) |
|---|---|---|---|
| r1 = 68.797 | d1 = 1.100 | N1 = 1.83350 | v1 = 21.00 |
| r2 = 23.685 | d2 = 3.040 | N2 = 1.75450 | v2 = 51.57 |
| r3 = −295.130 | d3 = 0.100 | | |
| r4 = 14.636 | d4 = 2.088 | N3 = 1.75450 | v3 = 51.57 |
| r5 = 36.561 | d5 = 0.700~6.093~8.316 | | |
| r6* = 331.726 | d6 = 1.200 | N4 = 1.77250 | v4 = 49.77 |
| r7* = 6.964 | d7 = 3.281 | | |
| r8 = −7.055 | d8 = 0.700 | N5 = 1.77250 | v5 = 49.77 |
| r9 = 17.529 | d9 = 1.305 | N6 = 1.83350 | v6 = 21.00 |
| r10 = −20.010 | d10 = 8.116~2.723~0.500 | | |
| r11 = ∞(Aperture Stop) | d11 = 0.500 | | |
| r12 = 17.211 | d12 = 1.748 | N7 = 1.64939 | v7 = 40.02 |
| r13 = −8.162 | d13 = 0.500 | N8 = 1.84666 | v8 = 23.82 |
| r14 = −26.221 | d14 = 4.156~1.252~0.200 | | |
| r15 = 6.566 | d15 = 2.884 | N9 = 1.59898 | v9 = 59.07 |
| r16 = −51.162 | d16 = 1.371 | | |
| r17* = 56.257 | d17 = 1.200 | N10 = 1.84666 | v10 = 23.82 |
| r18* = 8.477 | d18 = 2.119 | | |
| r19 = 11.481 | d19 = 1.866 | N11 = 1.48749 | v11 = 70.44 |
| r20 = −130.207 | d20 = 2.202~5.106~6.158 | | |
| r21 = ∞ | d21 = 3.400 | N12 = 1.51680 | v12 = 64.20 |
| r22 = ∞ | | | |

Aspherical Coefficients of 6th Surface (r6)

ε = 0.10000 × 10
A4 = 0.53164 × 10$^{-3}$
A6 = −0.48611 × 10$^{-5}$
A8 = 0.38580 × 10$^{-7}$

Aspherical Coefficients of 7th Surface (r7)

ε = 0.10000 × 10
A4 = 0.52331 × 10$^{-3}$
A6 = 0.10727 × 10$^{-4}$
A8 = 0.10211 × 10$^{-5}$

Aspherical Coefficients of 17th Surface (r17)

ε = 0.10000 × 10
A4 = =0.35095 × 10$^{-3}$
A6 = −0.22893 × 10$^{-4}$
A8 = 0.31631x 10$^{-6}$

Aspherical Coefficients of 18th Surface (r18)

ε = 0.10000 × 10
A4 = 0.81168 × 10$^{-3}$
A6 = −0.66566 × 10$^{-5}$
A8 = 0.17258 × 10$^{-5}$

TABLE 16

Construction Data of Example 8 (for the first frame-format)
f = 5.1 mm~12.0 mm~29.5 mm (Focal Length of the Entire Optical System)
FNO = 2.15~2.46~2.88 (F-Numbers)

| Radius of Curvature | Axial Distance | Refractive Index (Nd) | Abbe Number(vd) |
|---|---|---|---|
| r1 = 48.042 | d1 = 1.100 | N1 = 1.83350 | v1 = 21.00 |
| r2 = 27.540 | d2 = 3.848 | N2 = 1.48749 | v2 = 70.44 |
| r3 = 125.425 | d3 = 0.100 | | |
| r4 = 19.606 | d4 = 2.663 | N3 = 1.75450 | v3 = 51.57 |
| r5 = 44.341 | d5 = 0.909~9.146~15.048 | | |
| r6* = −125.878 | d6 = 1.200 | N4 = 1.77250 | v4 = 49.77 |
| r7* = 8.661 | d7 = 5.379 | | |
| r8 = −6.344 | d8 = 0.743 | N5 = 1.77250 | v5 = 49.77 |
| r9 = 170.925 | d9 = 1.109 | N6 = 1.83350 | v6 = 21.00 |
| r10 = −13.808 | d10 = 9.830~4.621~0.500 | | |
| r11 = ∞ (Aperture Stop) | d11 = 0.500 | | |

TABLE 16-continued

Construction Data of Example 8 (for the first frame-format)
f = 5.1 mm~12.0 mm~29.5 mm (Focal Length of the Entire Optical System)
FNO = 2.15~2.46~2.88 (F-Numbers)

| Radius of Curvature | Axial Distance | Refractive Index (Nd) | Abbe Number(vd) |
|---|---|---|---|
| r12 = 6.833 | d12 = 1.797 | N7 = 1.84910 | ν7 = 33.85 |
| r13 = 19.895 | d13 = 1.000 | N8 = 1.84666 | ν8 = 23.82 |
| r14* = 7.569 | d14 = 3.919~1.936~0.200 | | |
| r15 = 8.280 | d15 = 3.123 | N9 = 1.75450 | ν9 = 51.57 |
| r16 = −24.676 | d16 = 0.100 | | |
| r17* = 68.278 | d17 = 1.200 | N10 = 1.84666 | ν10 = 23.82 |
| r18* = 6.577 | d18 = 0.100 | | |
| r19 = 6.360 | d19 = 5.645 | N11 = 1.57545 | ν11 = 56.48 |
| r20 = −56.054 | d20 = 1.095~3.078~4.814 | | |
| r21 = ∞ | d21 = 3.400 | N12 = 1.51680 | ν12 = 64.20 |
| r22 = ∞ | | | |

Aspherical Coefficients of 6th Surface (r6)

$\epsilon = 0.10000 \times 10$
$A4 = 0.35660 \times 10^{-3}$
$A6 = -0.48752 \times 10^{-5}$
$A8 = 0.32922 \times 10^{-7}$ Aspherical Coefficients of 7th Surface (r7)

$\epsilon = 0.10000 \times 10$
$A4 = 0.17663 \times 10^{-3}$
$A6 = 0.46973 \times 10^{-5}$
$A8 = -0.33901 \times 10^{-6}$ Aspherical Coefficients of 14th Surface (r14)

$\epsilon = 0.10000 \times 10$
$A4 = 0.44879 \times 10^{-3}$
$A6 = 0.14888 \times 10^{-4}$
$A8 = -0.85281 \times 10^{-6}$
$A10 = 0.57505 \times 10^{-7}$ Aspherical Coefficients of 17th Surface (r17)

$\epsilon = 0.10000 \times 10$
$A4 = 0.62336 \times 10^{-4}$
$A6 = -0.24680 \times 10^{-4}$
$A8 = 0.43821 \times 10^{-6}$ Aspherical Coefficients of 18th Surface (r18)

$\epsilon = 0.10000 \times 10$
$A4 = 0.70776 \times 10^{-3}$
$A6 = -0.20433 \times 10^{-4}$
$A8 = 0.80230 \times 10^{-6}$

TABLE 17

Construction Data of Example 8 (for the second frame-format)
f = 6.1 mm~16.3 mm~25.5 mm (Focal Length of the Entire Optical System)
FN0 = 2.28~2.66~2.88 (F-Numbers)

| Radius of Curvature | Axial Distance | Refractive Index (Nd) | Abbe Number(vd) |
|---|---|---|---|
| r1 = 39.393 | d1 = 1.100 | N1 = 1.83350 | ν1 = 21.00 |
| r2 = 23.154 | d2 = 3.848 | N2 = 1.48749 | ν2 = 70.44 |
| r3 = −365.665 | d3 = 0.100 | | |
| r4 = 17.689 | d4 = 2.663 | N3 = 1.75450 | ν3 = 51.57 |
| r5 = 50.349 | d5 = 0.835~8.235~10.806 | | |
| r6* = −125.878 | d6 = 1.200 | N4 = 1.77250 | ν4 = 49.77 |
| r7* = 8.661 | d7 = 5.379 | | |
| r8 = −6.344 | d8 = 0.743 | N5 = 1.77250 | ν5 = 49.77 |
| r9 = 170.925 | d9 = 1.109 | N6 = 1.83350 | ν6 = 21.00 |
| r10 = −13.808 | d10 = 6.897~2.615~0.500 | | |
| r11 = ∞(Aperture Stop) | d11 = 0.500 | | |
| r12 = 6.833 | d12 = 1.797 | N7 = 1.84910 | ν7 = 33.85 |
| r13 = 19.895 | d13 = 1.000 | N8 = 1.84666 | ν8 = 23.82 |
| r14* = 7.569 | d14 = 2.918~1.023~0.200 | | |
| r15 = 8.280 | d15 = 3.123 | N9 = 1.75450 | ν9 = 51.57 |

TABLE 17-continued

Construction Data of Example 8 (for the second frame-format)
f = 6.1 mm~16.3 mm~25.5 mm (Focal Length of the Entire Optical System)
FN0 = 2.28~2.66~2.88 (F-Numbers)

| Radius of Curvature | Axial Distance | Refractive Index (Nd) | Abbe Number(vd) |
|---|---|---|---|
| r16 = −24.676 | d16 = 0.100 | | |
| r17* = 68.278 | d17 = 1.200 | N10 = 1.84666 | ν10 = 23.82 |
| r18* = 6.577 | d18 = 0.100 | | |
| r19 = 6.360 | d19 = 5.645 | N11 = 1.57545 | ν11 = 56.48 |
| r20 = −56.054 | d20 = 2.096~3.991~4.814 | | |
| r21 = ∞ | d21 = 3.400 | N12 = 1.51680 | ν12 = 64.20 |
| r22 = ∞ | | | |

Aspherical Coefficients of 6th Surface (r6)

$\epsilon = 0.10000 \times 10$
$A4 = 0.35660 \times 10^{-3}$
$A6 = -0.48752 \times 10^{-5}$
$A8 = 0.32922 \times 10^{-7}$ Aspherical Coefficients of 7th Surface (r7)

$\epsilon = 0.10000 \times 10$
$A4 = 0.17663 \times 10^{-3}$
$A6 = 0.46973 \times 10^{-5}$
$A8 = -0.33901 \times 10^{-6}$ Aspherical Coefficients of 14th Surface (r14)

$\epsilon = 0.1000 \times 10$
$A4 = 0.44879 \times 10^{-3}$
$A6 = 0.14888 \times 10^{-4}$
$A8 = -0.85281 \times 10^{-6}$
$A10 = 0.57505 \times 10^{-7}$ Aspherical Coefficients of 17th Surface (r17)

$\epsilon = 0.10000 \times 10$
$A4 = 0.62336 \times 10^{-4}$
$A6 = -0.24680 \times 10^{-4}$
$A8 = 0.43821 \times 10^{-6}$ Aspherical Coefficients of 18th Surface (r18)

$\epsilon = 0.10000 \times 10$
$A4 = 0.70776 \times 10^{-3}$
$A6 = -0.20433 \times 10^{-4}$
$A8 = 0.80230 \times 10^{-6}$

TABLE 18

Values Corresponding to Conditions (5) to (8)

| | f1b/f1s | Zb/Zs | |f2|/fws | Ys/Yb |
|---|---|---|---|---|
| Example 6 | 0.89 | 0.67 | 1.22 | 0.78 |
| Example 7 | 0.88 | 0.67 | 1.07 | 0.78 |
| Example 8 | 0.87 | 0.67 | 1.15 | 0.78 |

What is claimed is:

1. A method of converting a frame-format in a taking optical system, comprising steps of:

arranging a plurality of lens units constituting the taking optical system except for a lens unit disposed at an object-side end or at an image-side end; and determining a configuration of the lens unit disposed at the object-side end or at the image-side end based on the desired frame-format, wherein the taking optical system is larger for a larger desired frame-format than for a smaller desired frame-format after said configuration determining step.

2. A taking optical system comprising:

a main optical system that can form an object image on its own; and a conversion optical system that can be removably disposed at an image-side end of the main optical system,
wherein, when the object image is taken as an image of a first frame-format, the main optical system alone is used, and, when the object image is taken as an image of a second frame-format that is different from the first frame-format, the main optical system is used with the conversion optical system disposed at the image-side end thereof, and
wherein the first frame-format is smaller than the second frame-format.

3. A taking optical system as claimed in claim 2,
wherein the following condition is fulfilled:

$$2.5<|fc/Yb|<11.0$$

wherein
fc represents a focal length of the conversion optical system; and
Yb represents a maximum image height of the second frame-format.

4. A taking optical system as claimed in claim 2,
wherein the following condition is fulfilled:

$$1.1<\beta c<1.9$$

wherein
$\beta c$ represents a lateral magnification of the conversion optical system.

5. A taking optical system as claimed in claim 2,
wherein the object image is formed on a light-sensing surface of an image sensing device.

6. An image taking apparatus comprising:
a taking optical system as claimed in claim 2,
wherein the image taking apparatus is designed for the first frame-format.

7. An image taking apparatus comprising:
a taking optical system as claimed in claim 2,
wherein the image taking apparatus is designed for the second frame-format.

8. A taking optical system as claimed in claim 2, wherein the following condition is fulfilled:

$$0.7<(Yb/Ys)/\beta c<1.3$$

wherein
Y represents the maximum image height of the second frame-format,
Ys represents the maximum image height of the first frame-format, and
$\beta c$ represents the lateral magnification of the conversion optical system.

9. A taking optical system as claimed in claim 2, wherein the following condition is fulfilled:

$$1.0<|f2|/fws<1.8$$

wherein
f2 represents the focal length of the second lens unit, and
fws represents the focal length of the entire taking optical system when configured for the first frame-format as observed at a wide-angle end.

10. A taking optical system comprising:
a main optical system that can form an object image on its own;
a conversion optical system that can be removably disposed at an image-side end of the main optical system,
wherein, when the object image is taken as an image of a first frame-format, the main optical system alone is used, and, when the object image is taken as an image of a second frame-format that is different from the first frame-format, the main optical system is used with the conversion optical system disposed at the image-side end thereof; and
an optical low-pass filter disposed somewhere in an optical path leading from the main optical system to an image plane when configured in at least the smaller desired frame-format after said configuration determining step.

11. A method of converting a frame-format in a taking optical system comprising:
a step of designing the taking optical system to have a main optical system that can form an object image on its own and a conversion optical system that can be removably disposed at an image-side end of the main optical system; and
a step of using the main optical system alone when the object image is taken as an image of a first frame-format and using the main optical system with the conversion optical system disposed at the image-side end thereof when the object image is taken as an image of a second frame-format that is different from the first frame-format,
wherein the first frame-format is smaller than the second frame-format.

12. A method of converting a frame-format in a taking optical system as claimed in claim 11,
wherein the following condition is fulfilled:

$$2.5<|fc/Yb|<11.0$$

wherein
fc represents a focal length of the conversion optical system; and
Yb represents a maximum image height of the second frame-format.

13. A method of converting a frame-format in a taking optical system as claimed in claim 11,
wherein the following condition is fulfilled:

$$1.1<\beta c<1.9$$

wherein
$\beta c$ represents a lateral magnification of the conversion optical system.

14. A method of converting a frame-format in a taking optical system as claimed in claim 11,
wherein the taking optical system has an optical low-pass filter disposed somewhere in an optical path leading from the main optical system to an image plane.

15. A method of converting a frame-format in a taking optical system as claimed in claim 11,
wherein the taking optical system forms the object image on a light-sensing surface of an image sensing device.

16. A taking optical system comprising, in order from an object side, an object-side lens unit and a plurality of lens units disposed behind the object-side lens unit, the taking optical system performing zooming by moving, of the object-side lens unit and the lens units disposed behind it, at least two lens units along an optical axis,
wherein, when an object image is taken as an image of a first frame-format, as the object-side lens unit, a first object-side lens unit is used, and, when the object image is taken as an image of a second frame-format that is larger than the first frame-format, as the object-side lens unit, a second object-side lens unit is used that is differently configured from the first object-side lens unit, wherein the following condition is fulfilled:

$$0.65 < f1b/f1s < 0.95$$

wherein f1s represents a focal length of the first object-side lens unit; and f1b represents a focal length of the second object-side lens unit.

17. A taking optical system comprising, in order from an object side, an object-side lens unit and a plurality of lens units disposed behind the object-side lens unit, the taking optical system performing zooming by moving, of the object-side lens unit and the lens units disposed behind it, at least two lens units along an optical axis, wherein, when an object image is taken as an image of a first frame-format, as the object-side lens unit, a first object-side lens unit is used, and, when the object image is taken as an image of a second frame-format that is different from the first frame-format, in a zoom range between a middle-focal-length position and a telephoto end of the taking optical system as determined using the first object-side lens unit, as the object-side lens unit, a second object-side lens unit is used that is differently configured from the first object-side lens unit.

18. A taking optical system comprising, in order from an object side, a positively-powered object-side lens unit, a negatively-powered second lens unit, and lens units disposed behind them, the taking optical system performing zooming by moving, of these lens units, at least two lens units along an optical axis, wherein, when an object image is taken as an image of a first frame-format, as the positively-powered object-side lens unit, a first positively-powered object-side lens unit is used, and, when the object image is taken as an image of a second frame-format that is larger than the first frame-format, as the positively-powered object-side lens unit, a second positively-powered object-side lens unit is used that is differently configured from the first object-side lens unit.

19. An image taking apparatus comprising:
a taking optical system as claimed in claim 16,
wherein the image taking apparatus is designed for the first frame-format.

20. An image taking apparatus comprising:
a taking optical system as claimed in claim 16,
wherein the image taking apparatus is designed for the second frame-format.

21. A taking optical system as claimed in claim 16, further comprising:
an optical low-pass filter disposed somewhere in an optical path leading from the object-side end to an image plane.

22. A taking optical system as claimed in claim 16,
wherein the object image is formed on a light-sensing surface of an image sensing device.

23. A method of converting a frame-format in a taking optical system, comprising:
a step of designing the taking optical system to have, from an object side, an object-side lens unit and a plurality of lens units disposed behind it and to perform zooming by moving, of the object-side lens unit and the lens units disposed behind it, at least two lens units along an optical axis, a step of using, as the object-side lens unit, a first object-side lens unit when an object image is taken as an image of a first frame-format and using, as the object-side lens unit, a second object-side lens unit that is differently configured from the first object-side lens unit when the object image is taken as an image of a second frame-format that is larger than the first frame-format, wherein the following condition is fulfilled:

$$0.65 < f1b/f1s < 0.95$$

wherein f1s represents a focal length of the first object-side lens unit; and f1b represents a focal length of the second object-side lens unit.

24. A method of converting a frame-format in a taking optical system, comprising:
a step of designing the taking optical system to have, from an object side, an object-side lens unit and a plurality of lens units disposed behind it and to perform zooming by moving, of the object-side lens unit and the lens units disposed behind it, at least two lens units along an optical axis, a step of using, as the object-side lens unit, a first object-side lens unit when an object image is taken as an image of a first frame-format and using, as the object-side lens unit, a second object-side lens unit that is differently configured from the first object-side lens unit when the object image is taken as an image of a second frame-format that is different from the first frame-format in a zoom range between a middle-focal-length position and a telephoto end of the taking optical system as determined using the first object-side lens unit.

25. A method of converting a frame-format in a taking optical system, comprising:
a step of designing the taking optical system to have, from an object side, a positively-powered object-side lens unit, a negatively-powered second lens unit, and lens units disposed behind them and to perform zooming by moving, of these lens units, at least two lens units along an optical axis, and a step of using, as the positively-powered object-side lens unit, a first positively-powered object-side lens unit when an object image is taken as an image of a first frame-format and using, as the positively-powered object-side lens unit, a second positively-powered object-side lens unit that is differently configured from the first positively-powered object-side lens unit when the object image is taken as an image of a second frame-format that is larger than the first frame-format.

26. A taking optical system as claimed in claim 18, wherein the following condition is fulfilled:

$$0.65 < f1b/f1s < 0.95$$

wherein f1s represents the focal length of the first object-side lens unit, and f1b represents the focal length of the second object-side lens unit.

27. A taking optical system as claimed in claim 18, wherein the following condition is fulfilled:

$$0.45 < Zb/Zs < 0.85$$

wherein

Zb represents the zoom ratio of the taking optical system, when configured for the second frame-format; and Zs represents the zoom ratio of the taking optical system, when configured for the first frame-format.

28. A taking optical system as claimed in claim 18, wherein the following condition is fulfilled:

$$0.85 < |f2|/fws < 1.55$$

wherein f2 represents the focal length of the second lens unit; and fws represents the focal length of the entire taking optical system when configured for the first frame-format as observed at the wide-angle end.

29. A taking optical system as claimed in claim 18, wherein the following condition is fulfilled:

$$0.5 < Ys/Yb < 0.95$$

wherein

Ys represents the maximum image height of the first frame-format; and

Yb represents the maximum image height of the second frame-format.

\* \* \* \* \*